(12) United States Patent
Dehkordi et al.

(10) Patent No.: US 12,026,420 B1
(45) Date of Patent: Jul. 2, 2024

(54) METHODS AND SYSTEMS FOR INTERACTIVE DISPLAYS WITH INTELLIGENT GENERATIVE CONTENT AND TANDEM COMPUTING

(71) Applicant: Brelyon, Inc., San Mateo, CA (US)

(72) Inventors: Barmak Heshmat Dehkordi, San Mateo, CA (US); Christopher Barsi, Lee, NH (US); Albert Redo Sanchez, San Mateo, CA (US)

(73) Assignee: BRELYON, INC., San Mateo, CA (US)

( * ) Notice: Subject to any disclaimer, the term of this patent is extended or adjusted under 35 U.S.C. 154(b) by 0 days.

(21) Appl. No.: 18/296,060

(22) Filed: Apr. 5, 2023

Related U.S. Application Data

(63) Continuation of application No. 18/193,329, filed on Mar. 30, 2023, now Pat. No. 11,868,672.

(51) Int. Cl.
G06F 3/14 (2006.01)
G06F 3/01 (2006.01)
G06F 3/04815 (2022.01)

(52) U.S. Cl.
CPC ............ *G06F 3/1446* (2013.01); *G06F 3/012* (2013.01); *G06F 3/013* (2013.01); *G06F 3/04815* (2013.01)

(58) Field of Classification Search
CPC ....... C07C 69/76; C07C 69/78; C08G 59/182; C08G 59/4223; C08G 59/423; C08G 59/621; C08G 8/32; C08J 2363/00; C08J 5/18; C09D 163/00; H01L 21/568; H01L 2224/2919; H01L 2224/2929; H01L 2224/29387; H01L 2224/29388; H01L 23/293; H01L 23/295; H01L 23/3121; H01L 24/29; H01L 2924/05442; H01L 2924/062; H01L 2924/0665; H01L 2924/095; H05K 1/03; H05K 1/0326; H05K 1/034; H05K 1/0373; H05K 2201/0209; H05K 3/46
See application file for complete search history.

(56) References Cited

U.S. PATENT DOCUMENTS

| | | | |
|---|---|---|---|
| 10,768,442 | B1 | 9/2020 | Dehkordi |
| 11,067,825 | B2 | 7/2021 | Dehkordi |
| 11,196,976 | B2 | 12/2021 | Dehkordi |
| 11,320,668 | B2 | 5/2022 | Khorasaninejad et al. |
| 11,592,684 | B2 | 2/2023 | Dehkordi |

(Continued)

*Primary Examiner* — Chun-Nan Lin
(74) *Attorney, Agent, or Firm* — Hsuanyeh Law Group, PC

(57) ABSTRACT

Systems and methods are described for improving the utilization of an extended display system. Some aspects relate to an extended display generator having an input stream module to generate or receive input streams. Input streams may be generated locally (e.g., by a game engine) or remotely (e.g., from the internet). A function module of the generator provides functions that modify or extract information from the input streams. Then extended display generator applies a template to the input streams and function outputs, defining how such display content is presented to a user. A graphical user interface is used to specify which input streams, functions, and visual template should be used. The extended display shows the selected input stream(s) and the functional output(s) in a format defined by the visual template.

27 Claims, 28 Drawing Sheets

(56) References Cited

U.S. PATENT DOCUMENTS

| | | | |
|---|---|---|---|
| 11,645,032 B1* | 5/2023 | Lin | G06F 3/013 345/1.3 |
| 2020/0301166 A1* | 9/2020 | Dehkordi | H04N 13/366 |
| 2020/0363650 A1* | 11/2020 | Dehkordi | G02B 30/26 |
| 2021/0006763 A1* | 1/2021 | Heshmat Dehkordi | H04N 13/307 |
| 2021/0294118 A1* | 9/2021 | Dehkordi | H04N 13/366 |
| 2023/0176805 A1* | 6/2023 | Dudovitch | G06F 3/04842 715/757 |

* cited by examiner

 1 Generic user
 2 Collaborative user
 3 Data stream
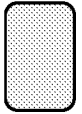 4 Generic source
 5 Local source
 6 Remote source
 7 Display system
 8 Local source with display system
 9 Display image
 10 Remotely sourced image
 11 Multilayered display images
 12 Generic user input
 13 Generic sensor
 14 Camera
 15 Generic function
 16 Widget function block
 17 Generic annotation
 18 Generic AI module
 19 Generic geometric warping function
 20 User-defined action

FIG. 1

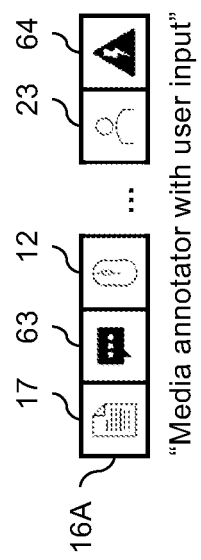
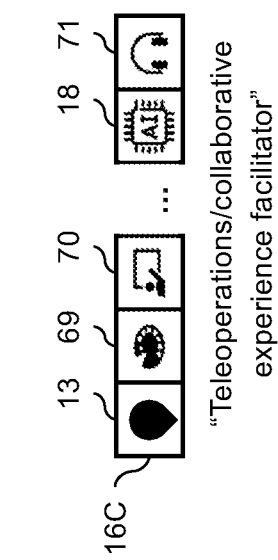
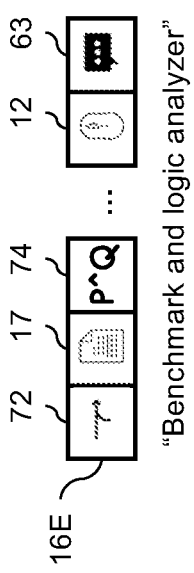
FIG. 5A "Media annotator with user input"
FIG. 5B "E-commerce smart recommender/advertiser"
FIG. 5C "Teleoperations/collaborative experience facilitator"
FIG. 5D "Multi-source/-content generator and merger"
FIG. 5E "Benchmark and logic analyzer"

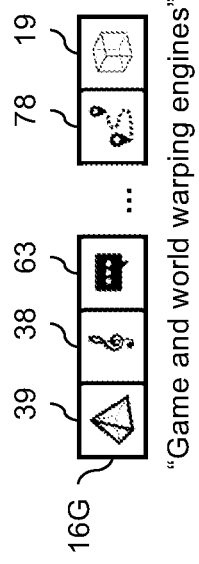
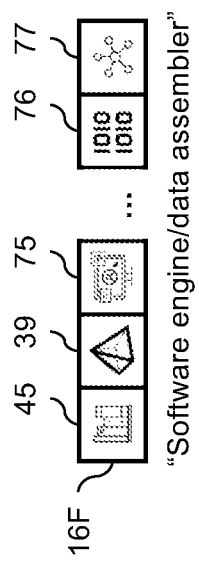

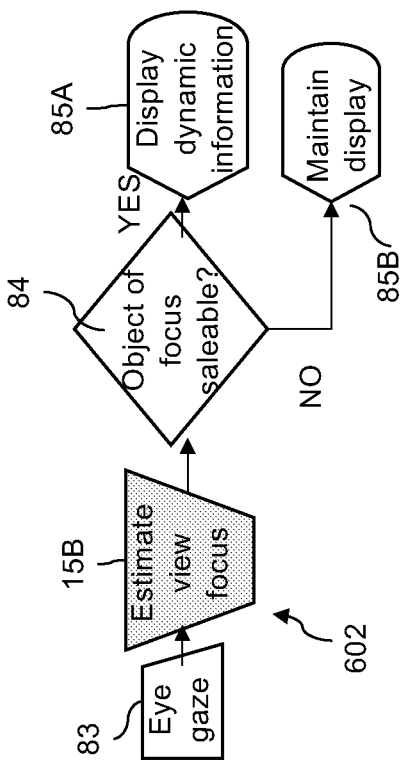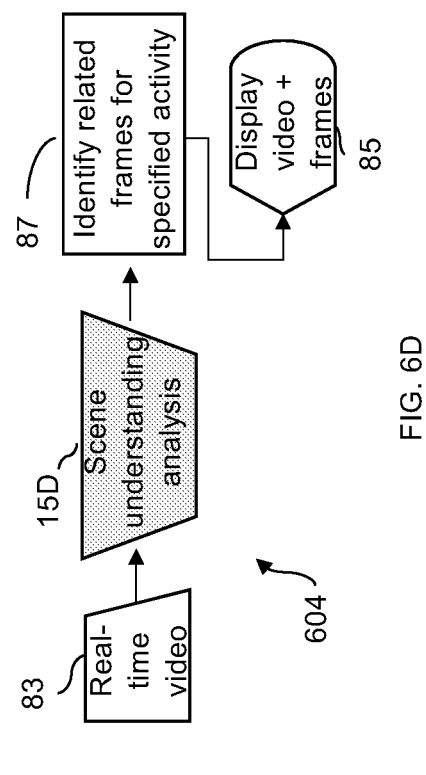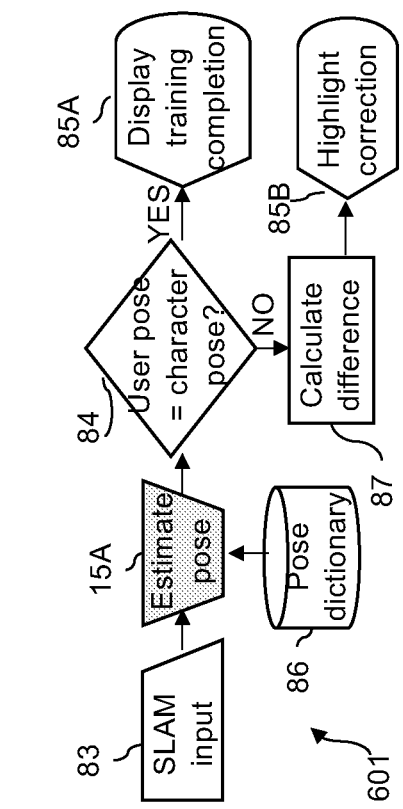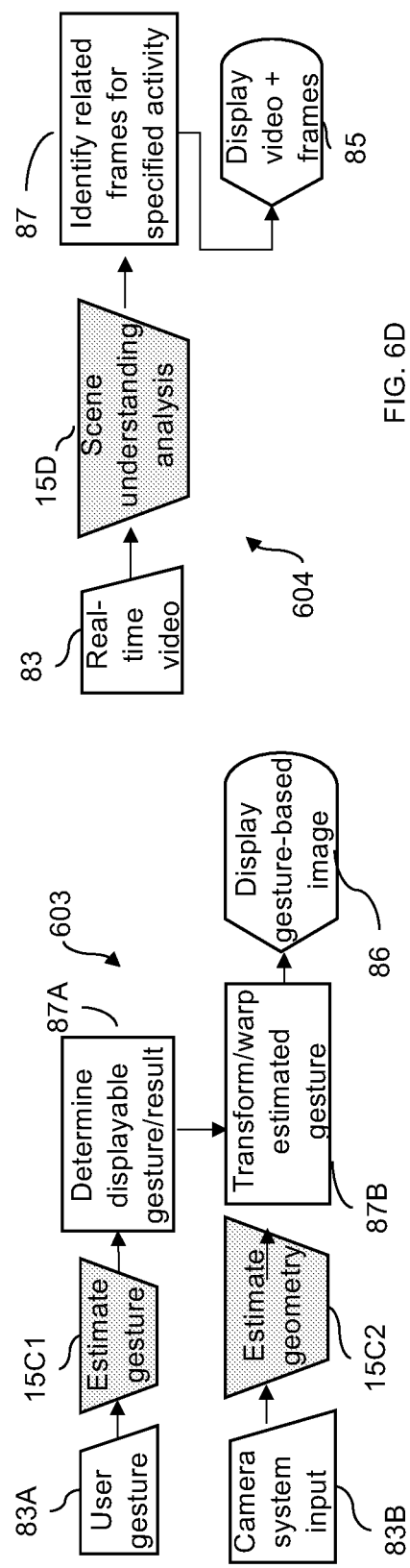

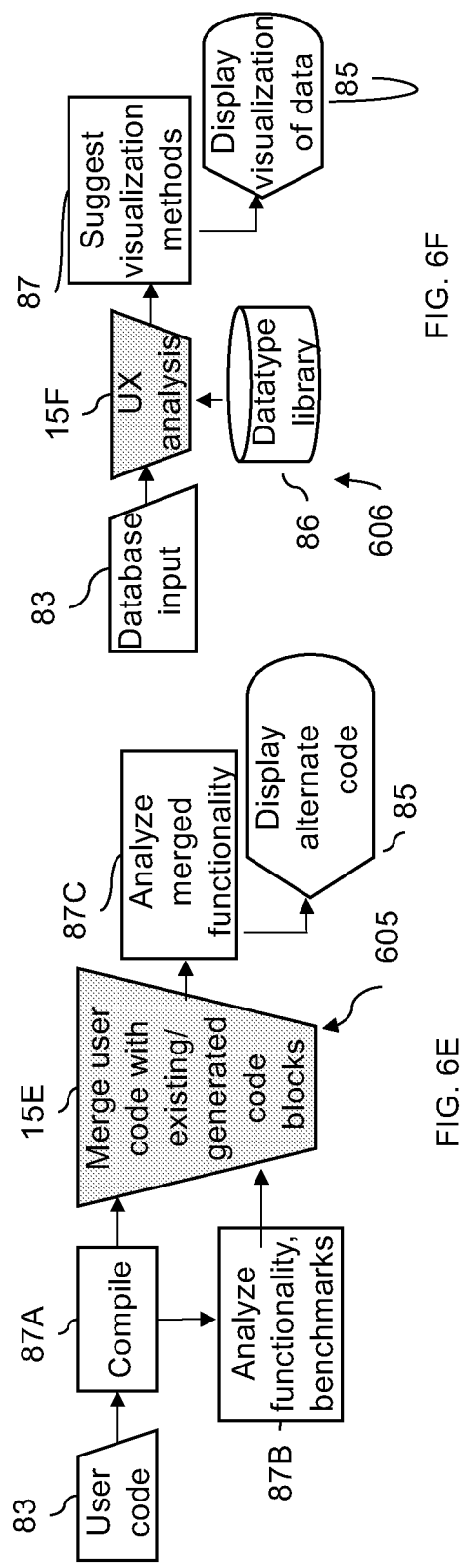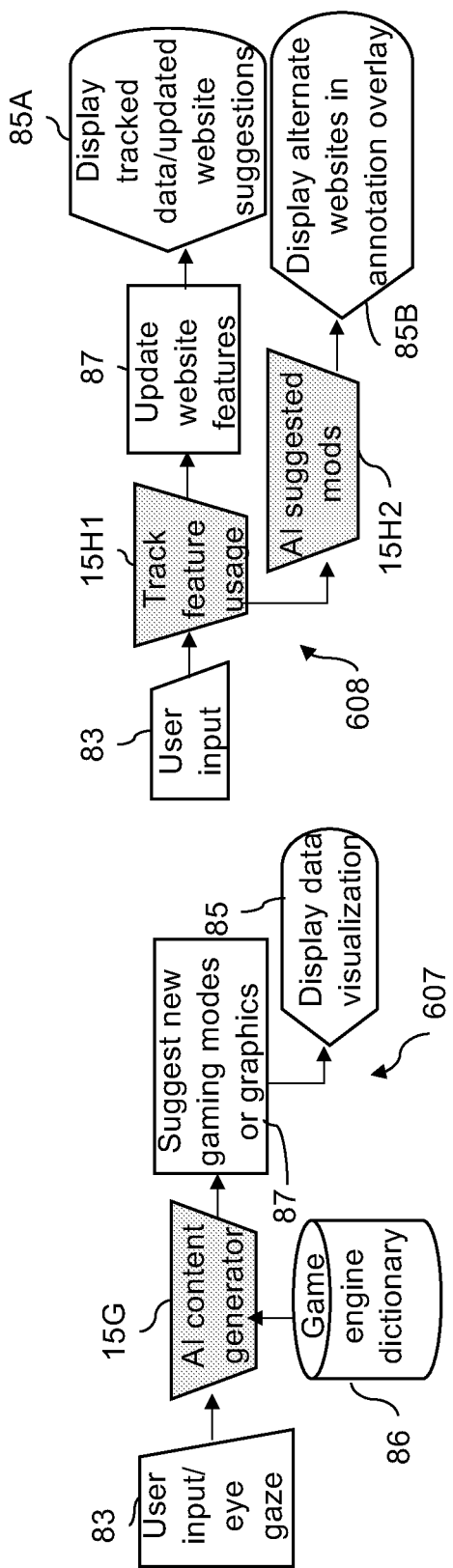

"Funnel expander"

"Probabilistic predictor"

"Dynamic prioritizer"

"Parallel search recommender"

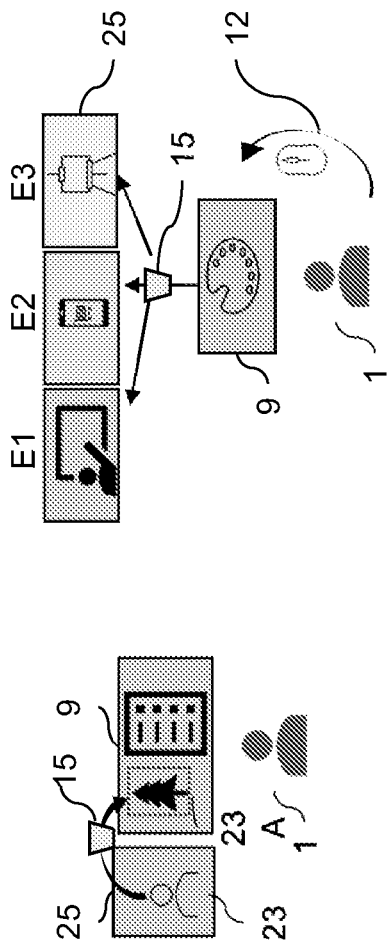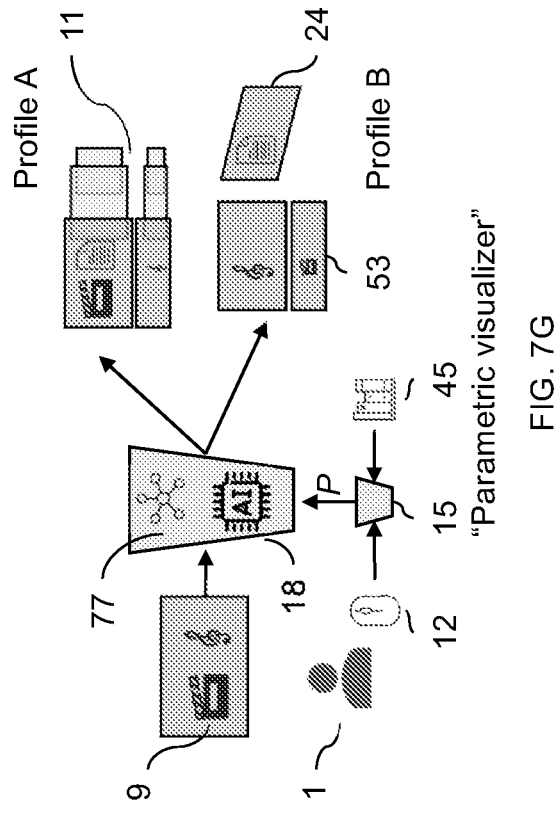

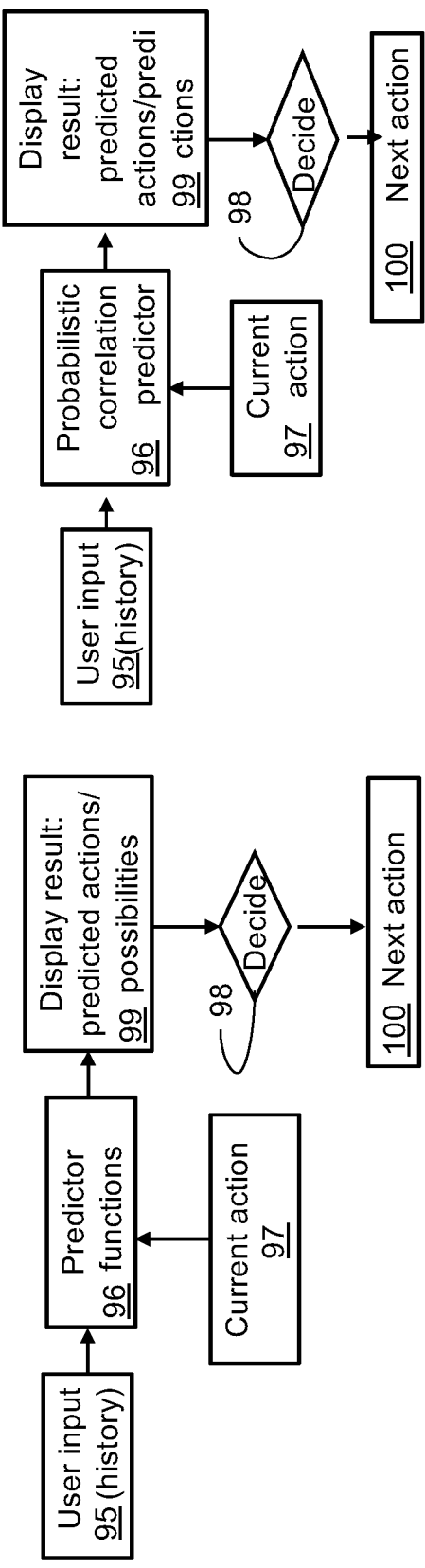
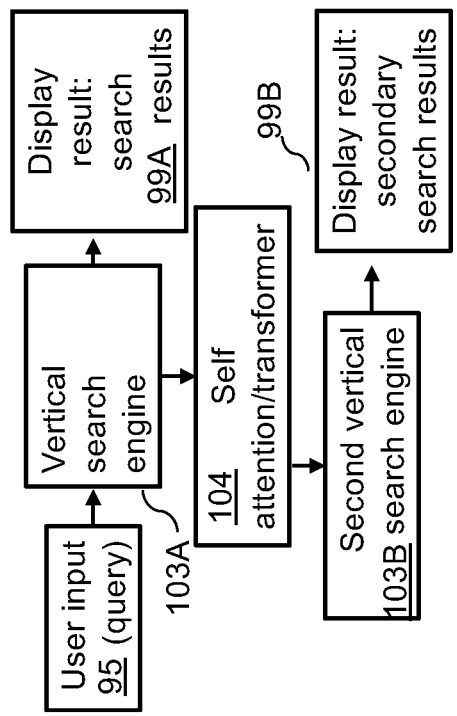
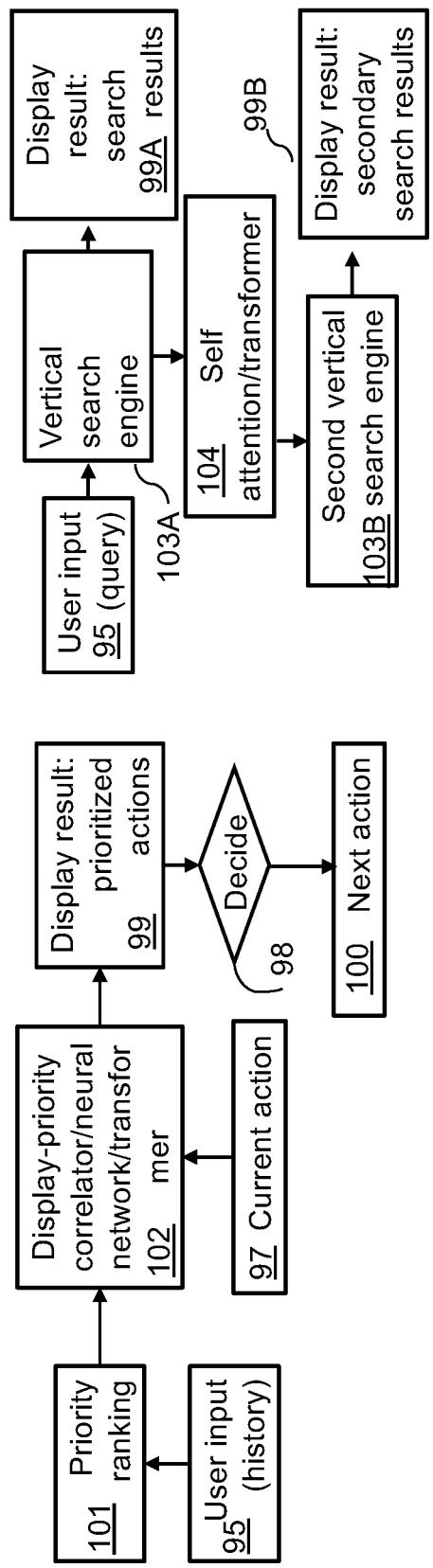

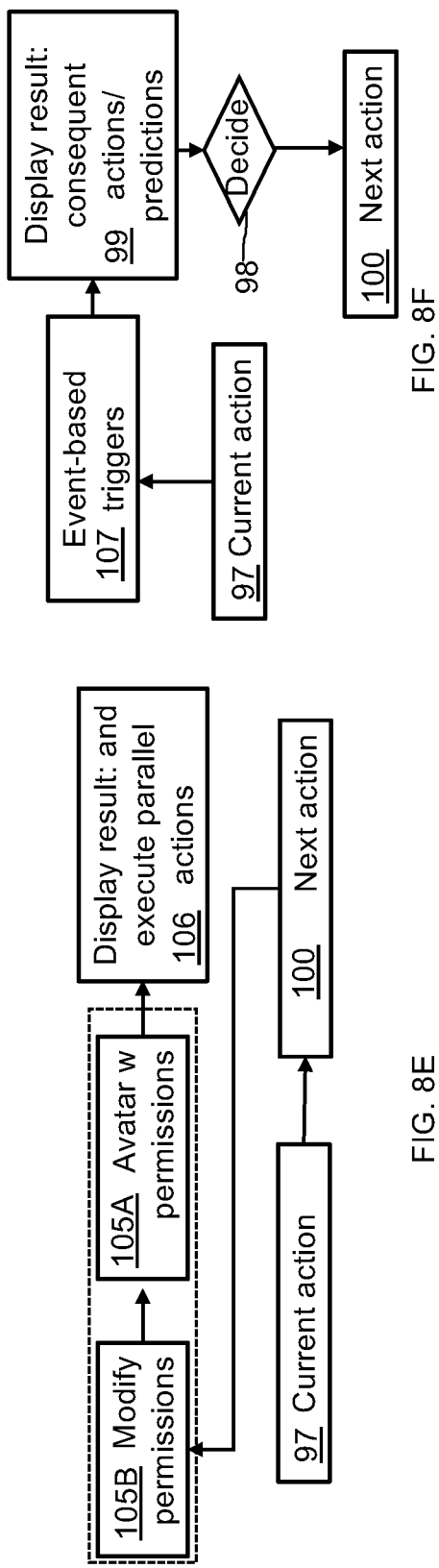
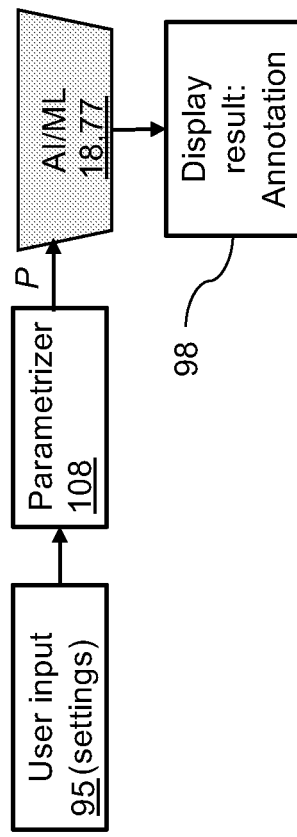
FIG. 8F
FIG. 8E
FIG. 8G

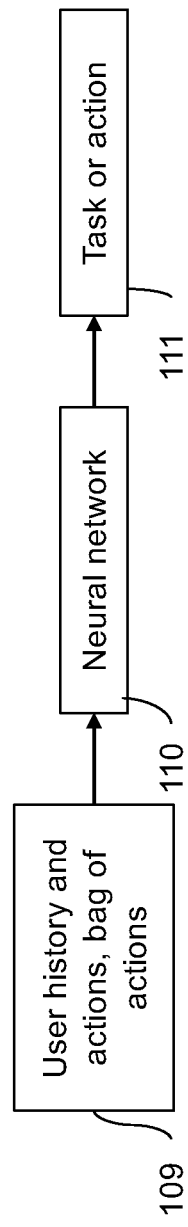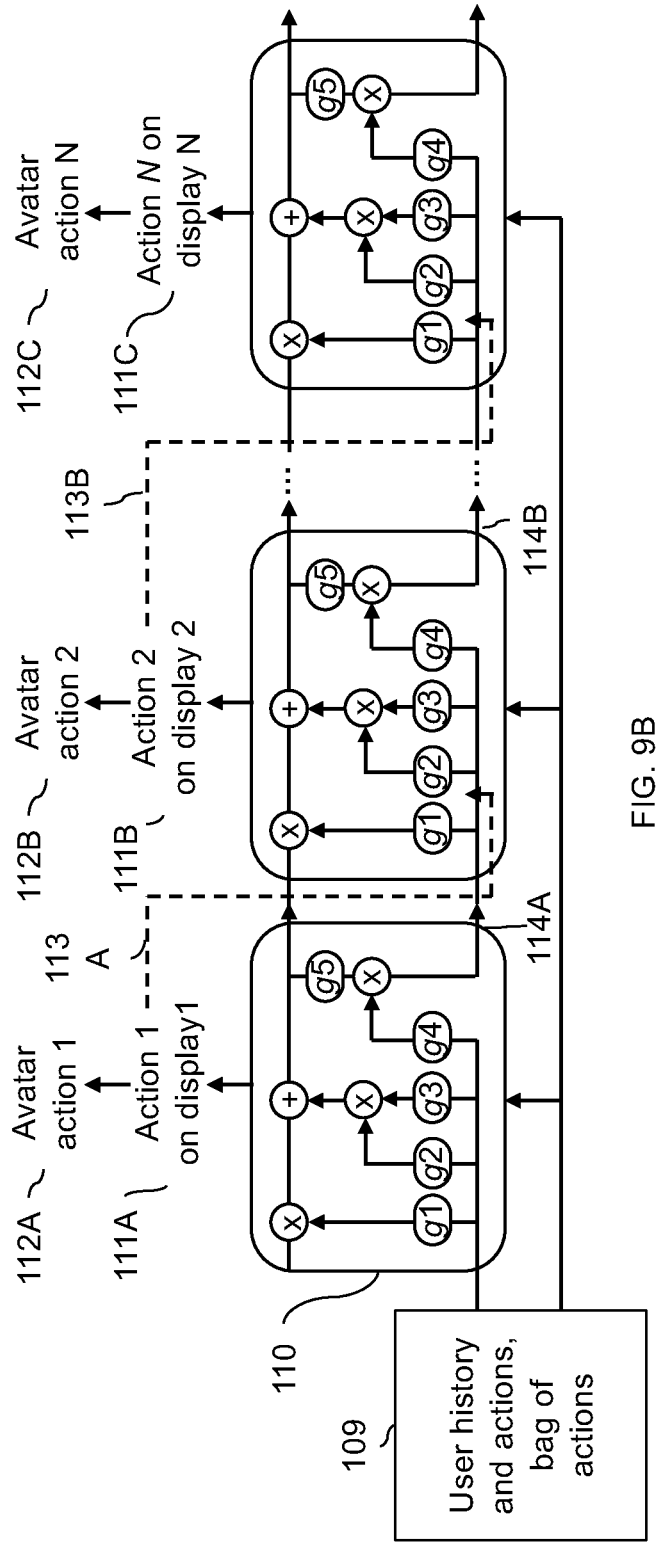
FIG. 9A
FIG. 9B

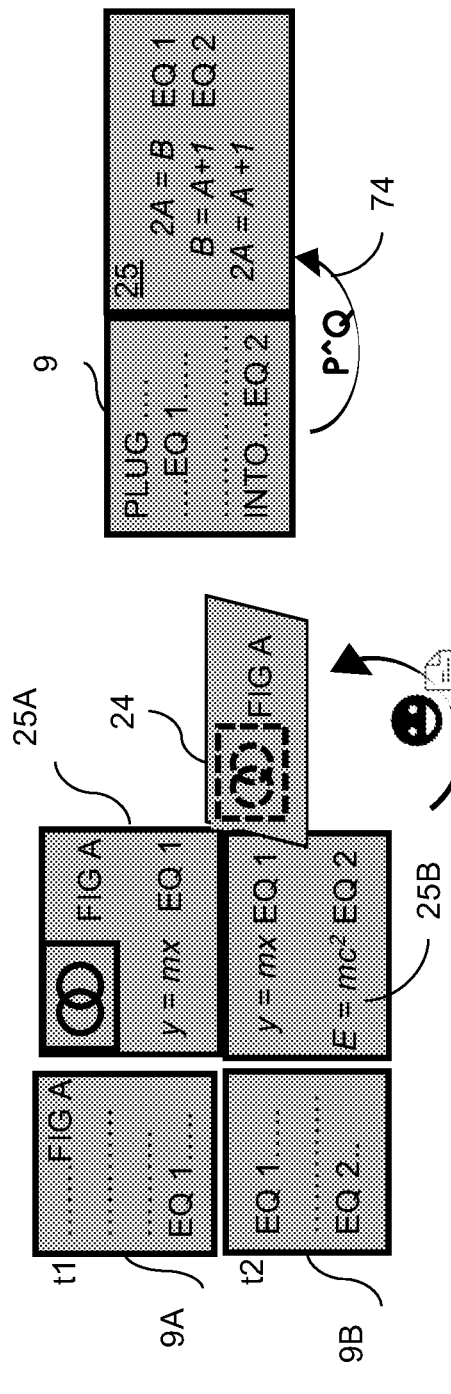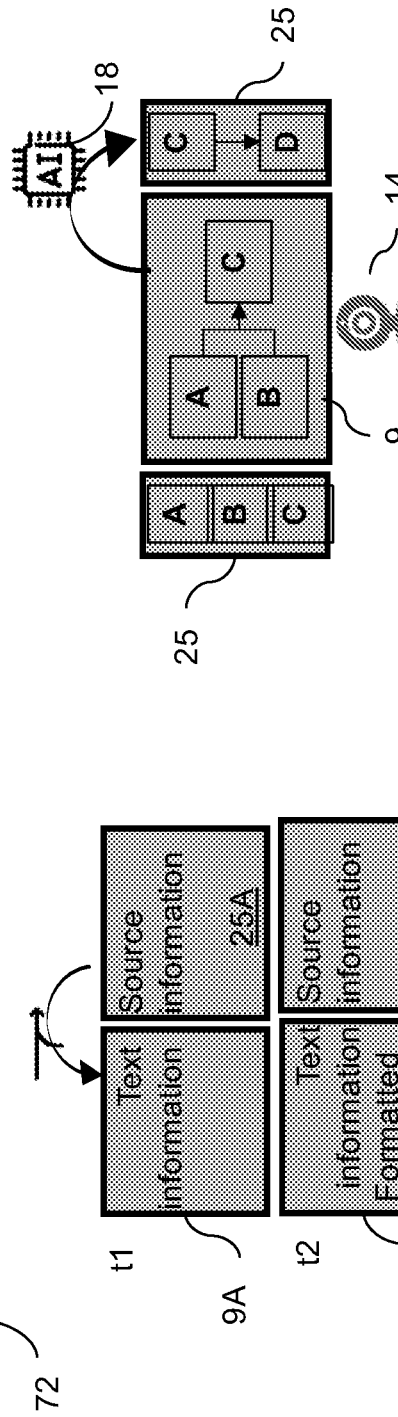

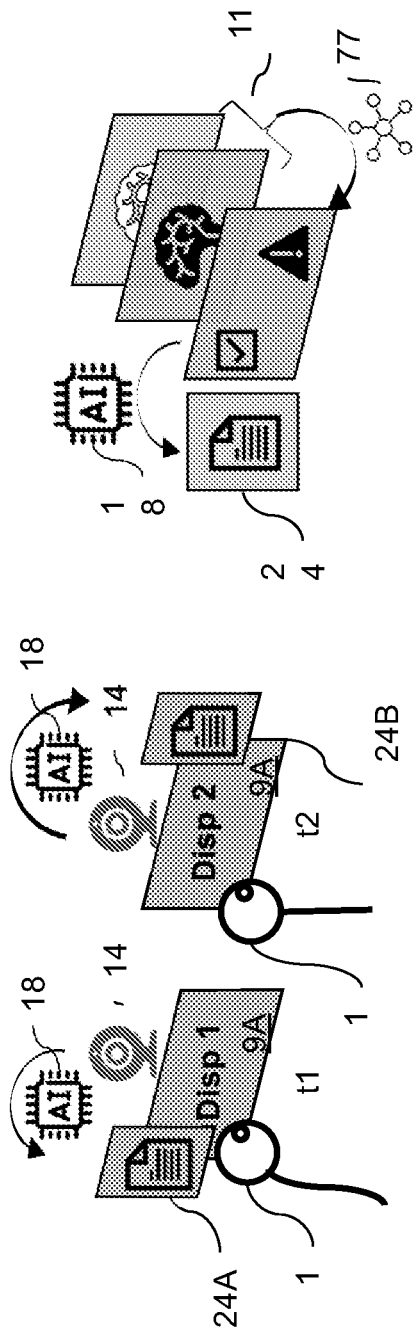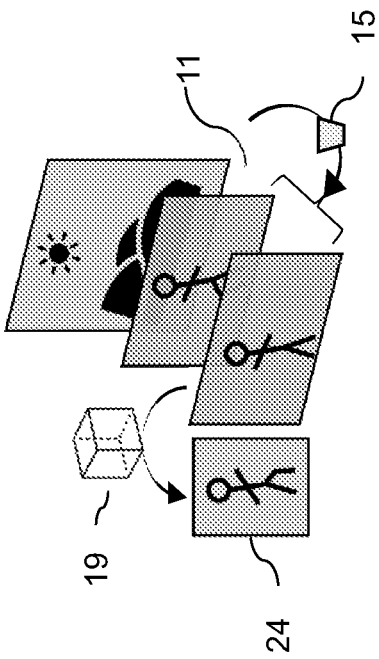

"AI sensory network integrator"

"Multifocal intelligent simulator"

"Tandem-expanded display system"

"Multilayer smart teleconferencer"

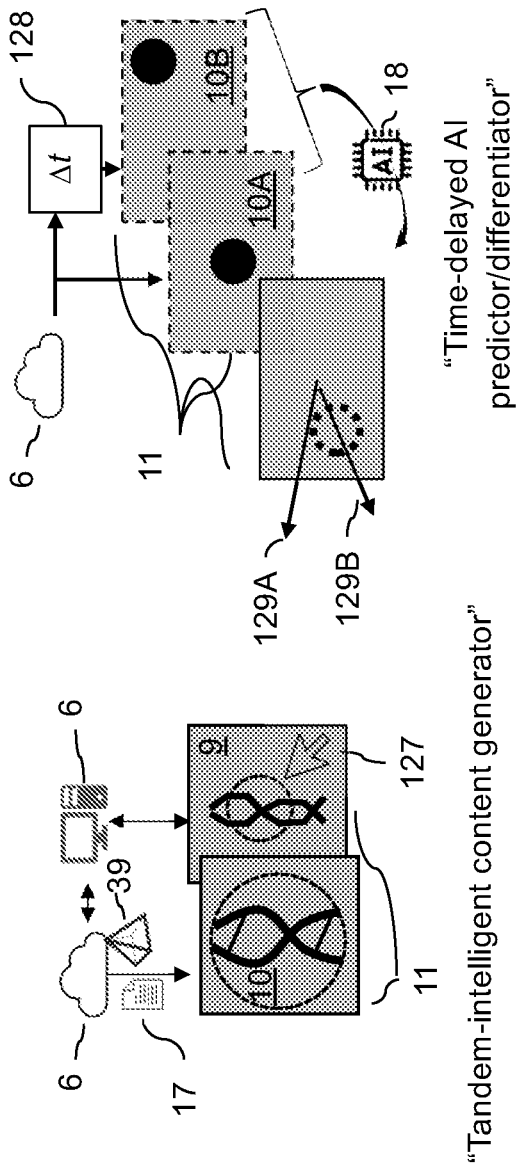
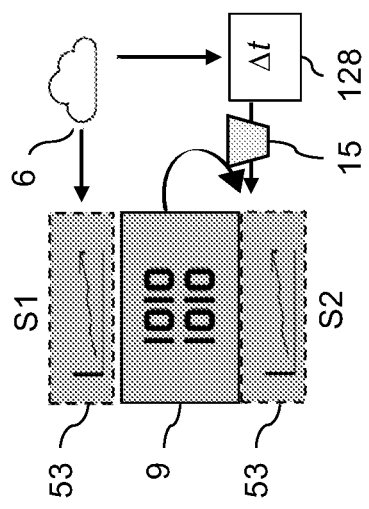
FIG. 13E "Tandem-intelligent content generator"
FIG. 13F "Time-delayed AI predictor/differentiator"
FIG. 13G "Realtime programmable update predictor"

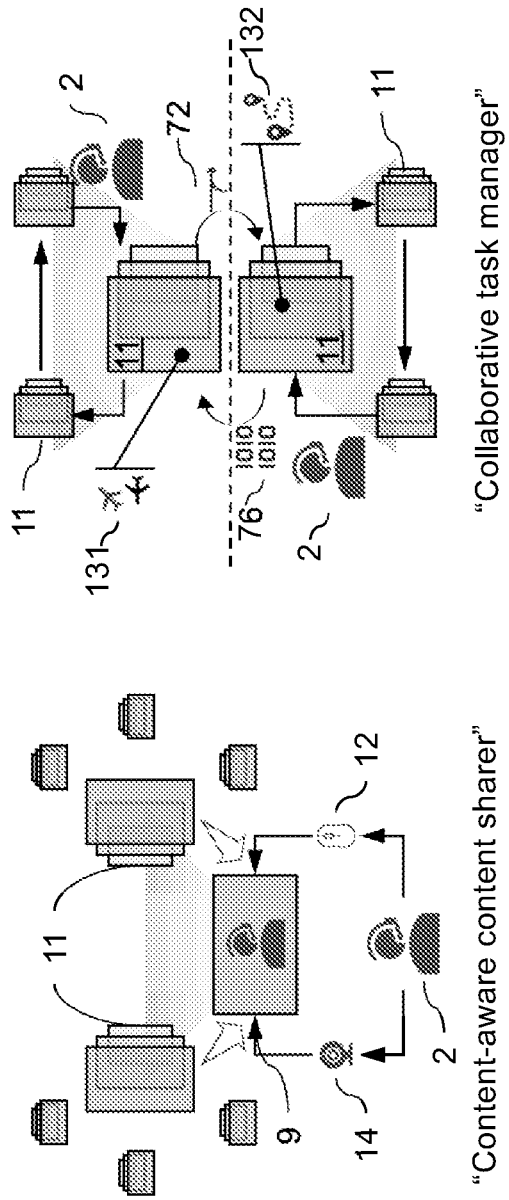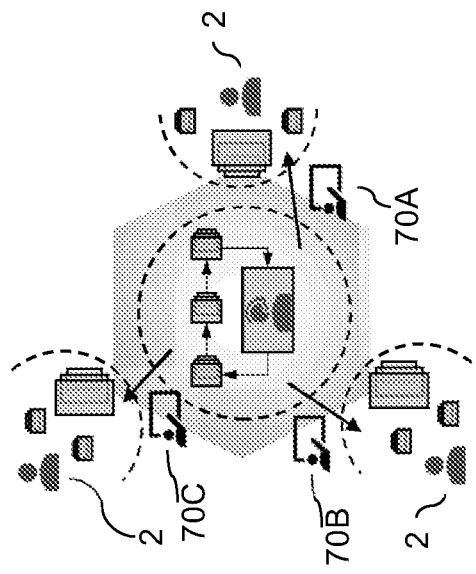

"Collaborative content-merger"

"Generative content multi-user mixer"

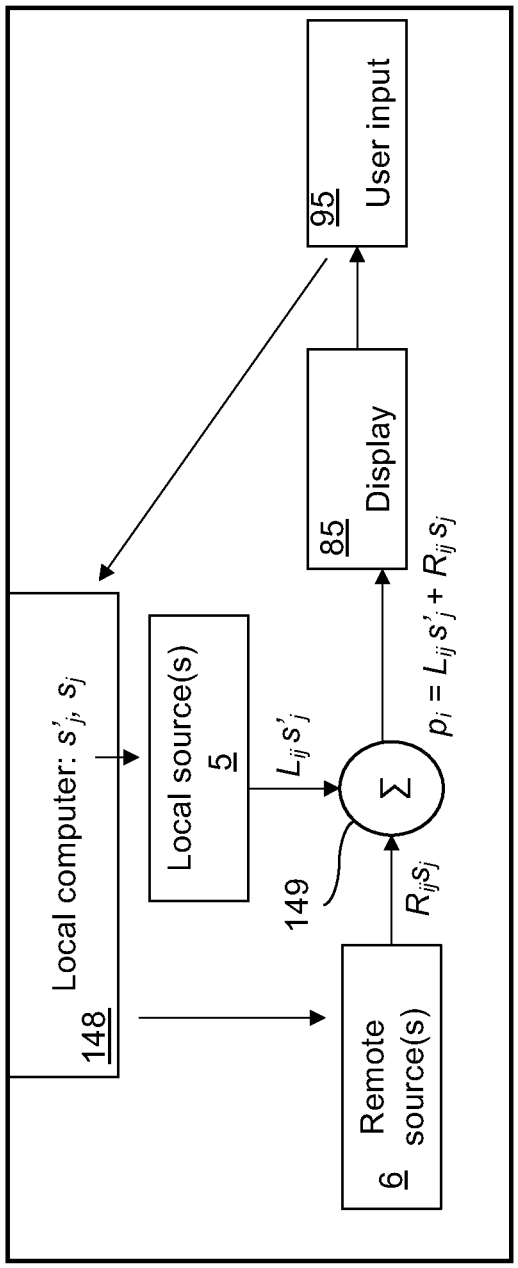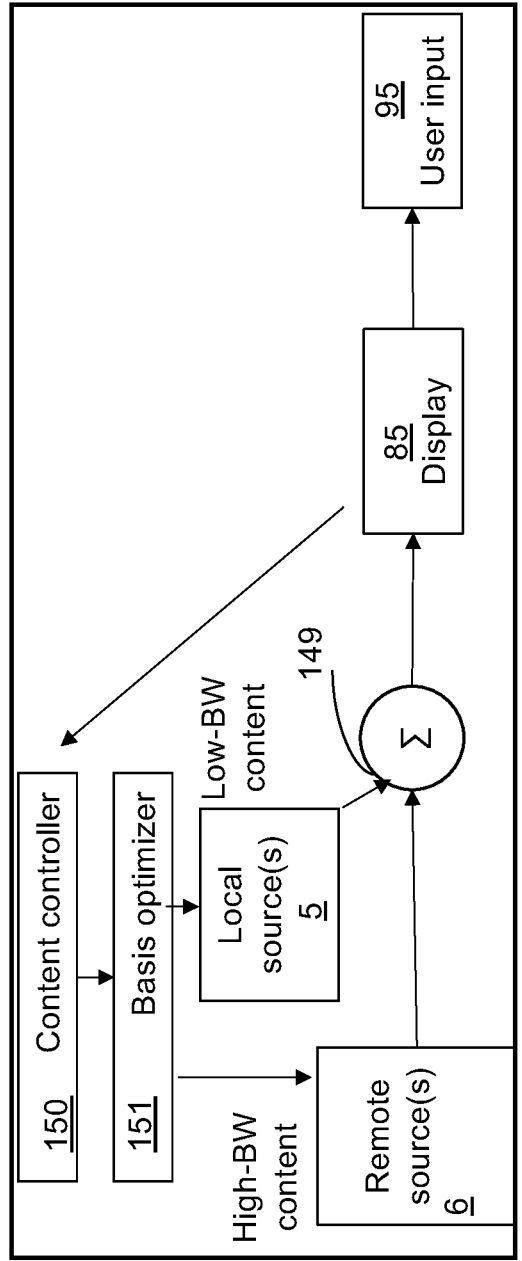

METHODS AND SYSTEMS FOR INTERACTIVE DISPLAYS WITH INTELLIGENT GENERATIVE CONTENT AND TANDEM COMPUTING

RELATED APPLICATION

This is a continuation of U.S. application Ser. No. 18/193,329, filed Mar. 30, 2023, the entire contents of which are incorporated herein by reference for all purposes.

TECHNICAL FIELD

The present disclosure relates to software-layer experiences of varieties of display systems with predictive and generative elements, and more specifically to new user and multi-user software experiences involving extended display systems with tandem computers and generative content engines.

BACKGROUND

In today's society, there has been increased development in multi-tasking applications for increased productivity, as well as machine-learning-based or generative artificial intelligence (AI) content and applications either for predictive modeling or content creation.

Virtual display systems are designed and implemented with various specifications. For example, in Patent Nos. U.S. Pat. Nos. 11,067,825 B2 and 11,768,825 B1, Dehkordi described a virtual display system providing monocular and binocular depth cues to achieve realistic depth perception effects. In Patent No. U.S. Pat. No. 11,592,684 B2, Dehkordi disclosed an optical component called a field evolving cavity, which folds light back and forth for multiple round trips with the cavity, to make the light source appear farther from the viewer compared to the distance to the physical display system. In Patent No. U.S. Pat. No. 11,196,976 B2, Dehkordi further disclosed a virtual display system directed to tessellating a light field into a size or depth that is extended beyond the pupil size of a display system. Last, in Patent No. U.S. Pat. No. 11,320,668 B2, Dehkordi et al disclosed a method of modifying the optical quality or the properties of a display system using optical fusion, which combines computational methods with optical architectures to remove visual artifacts from the images produced by the display system.

SUMMARY

Some aspects relate to an extended display generator having an input stream module to generate or receive a plurality of input streams; a function module implementing a plurality of functions, each function of the plurality of functions configured to operate on at least one input stream of the plurality of input streams; a plurality of visual templates, each template of the plurality of visual templates configured to format an output from the plurality of functions; a graphical user interface configured to generate a graphical representation of the plurality of functions, inputs streams, and visual templates; and wherein a user selection of at least one of the plurality of functions, inputs streams, and visual templates through the graphical user interface causes the generator to generate display content, the display content including a corresponding output for a selected function presented among the plurality of functions using a visual template from the plurality of visual templates.

In some embodiments, the extended display generator further comprises an extended display system to receive and display the display content.

In some embodiments of the extended display generator the plurality of input streams includes a first input stream and a second input stream, the extended display system comprises at least one main section and at least one extended section, and the extended display system shows a first display content based on the first input stream on the main section and a second display content on the extended section, the second display content being output from a function among the plurality of functions configured to operate on the first display content and the second input stream.

In some embodiments of the extended display generator the extended display system is a virtual display system, the main section is configured to be shown at a first depth on the virtual display system and the at least one extended section is among a plurality of extended sections that are configured to be shown at a plurality of different depths on the virtual display system.

In some embodiments, the extended display generator further comprises an input device from a set consisting of an eye tracker, a headtracker, and localization devices.

In some embodiments of the extended display generator a plurality of extended portions of the extended display system communicate wirelessly.

In some embodiments of the extended display generator the extended display system is a virtual display system, and a template from the plurality of visual templates formats a plurality of virtual images each at a respective depth, the respective depths comprising at least two or more unique depths.

In some embodiments of the extended display generator the extended display system is configured to display a plurality of objects in the display content at a plurality of focal planes, and wherein a depth of one of the pluralities of focal planes is calculated by an algorithm that optimizes a depth perception of a user.

In some embodiments of the extended display generator a function among the plurality of functions is configured to operate on a first input stream among the plurality of input streams and to output an annotation based on a detection of a plurality of features of the first input stream, and the extended display system is a virtual display system configured to display the annotation in a first focal plane and a content of the first input stream in a second focal plane different from the first focal plane.

In some embodiments of the extended display generator the input stream module comprises a sensor configured to generate a first input stream among the plurality of input streams based on information about a user or an environment captured by the sensor, and a function among the plurality of functions operates on the first input stream to modify the display content produced by the extended display system.

In some embodiments of the extended display generator one of the plurality of input streams is a video game, and one of the plurality of functions is configured to extract a depth map from the video game and display the depth map on the extended display system.

In some embodiments of the extended display generator the extended display system is integrated into a phone, watch, tablet, headset, viewer, viewfinder, television, or vehicle instrument cluster.

In some embodiments of the extended display generator a visual template from the plurality of templates is configured to expand the field of view using a plurality of virtual images tiled along a direction substantially perpendicular to a user's line of sight.

In some embodiments of the extended display generator a template from the plurality of visual templates is user-defined. In some embodiments, a function from the plurality of functions is a user-defined function.

In some embodiments of the extended display generator the input stream module generates or receives at least one of the plurality of input streams using or from a set comprising the internet, a game, a game engine, an existing application, a website, a simulation, a training video, a camera video, a camera image, a user input, a sensor input, and a dataset.

In some embodiments of the extended display generator one of the plurality of input streams is a video game, and one of the plurality of functions is configured for geometrically transforming a shape in a display content of the video game.

In some embodiments of the extended display generator at least one function from the plurality of functions is an AI function configured to generate at least a portion of the display content based on a user input.

Another aspect relates to an experience station having a virtual display system with a main portion and an extended portion; and a module implementing a generative function configured to (i) receive a plurality of input streams, at least one of the input streams providing a display content for the main portion of the virtual display system, (ii) capture a sequence of actions by a user, and (iii) cause the virtual display system to display on the extended portion a plurality of future possible actions on the plurality of input streams by a user.

In some embodiments of the experience station the generative function is configured to use a time factor to determine the plurality of future possible actions on the extended part of the virtual display system.

In some embodiments of the experience station the generative function comprises an event-based action trigger that, if triggered, causes the generation of content on the extended part of virtual display system. In some embodiment of the experience station the event-based action trigger is configured to be triggered by a user input.

In some embodiments of the experience station the generative function is further configured to automatically suggest and execute a predicted task based on permission levels granted by the user in parallel with an action of the user.

In some embodiments of the experience station the plurality of input streams comprises at least one of the internet, a game, an existing application, a website, a video, an image, and data visualizer.

In some embodiments of the experience station the generative function is configured to determine the plurality of future possible actions based at least in part on a probabilistic analysis of a plurality of historical actions of the user.

In some embodiments of the experience station the generative function is configured to cause the virtual display system to output the plurality of future possible actions as an annotation layer.

In some embodiments of the experience station the generative function is configured to cause the virtual display system to display the plurality of future possible actions on a respective plurality of virtual depths.

In some embodiments, the experience station further comprises a sensor to detect an eye gaze of the user and output an eye gaze location as an input stream among the plurality of input streams, wherein the generative function is configured to change dynamically the display of the plurality of future possible actions based on the eye gaze location.

Another aspect relates to a generative extended display station. The generative extended display station comprises an extended display system having a main portion and an extended part, and configured to display a first display content from an input stream among a plurality of input streams; and a computational module configured to operate on at least one of the plurality of input streams and output a second display content to the extended part of the extended display system.

In some embodiments of the generative extended display station at least a part of the extended display system is configured to show a virtual image to produce a visual environment.

In some embodiments of the generative extended display station the extended display system is a virtual display system, such that a multilayer display displays an image from the plurality of input streams on a first layer, and the computational module produces an annotation layer.

In some embodiments, the generative extended display station has a sensor for capturing information from a user, wherein the information is an input stream among the plurality of input streams input into the computational module and wherein the computational module is further configured to modify the first or second display content based on the information.

In some embodiments, the generative extended display station has an AI module configured to take as an input a query of a user, such that the second display content is a plurality of vertical search engine recommendations, wherein a first vertical search engine recommendation is determined by the query, and a second vertical search engine recommendation is determined at least in part by a result of the first vertical search engine recommendation.

In some embodiments of the generative extended display station the second display content is impacted by a setting of a user or a user history.

In some embodiments of the generative extended display station the computational module is an AI module comprising a neural network or a transformer. The AI module may be configured to compare at least two of the plurality of input streams and merge them into a single display content on the extended display system.

Another aspect relates to an extended display experience station comprising an extended display system having a main part and an extended part for displaying content, the main part configured to be fed directly by an input stream among a plurality of input streams, the input stream having a local source; at least one processor operably connected to the virtual display system; and a non-transitory, computer-readable storage medium having encoded thereon instructions executable by the at least one processor, the instructions including (i) a plurality of functions configured to take as input an input stream from among a plurality of input streams, and (ii) a software application configured to generate a second display content for display on the extended part of the extended display system using a selected function from the plurality of functions, such that that a first display content on the main part of the extended display system interacts with the second display content on the extended part.

In some embodiments, the extended display experience station further comprises at least one sensor configured to capture information about a user and to input the information into the selected function, the selected function outputting a dynamic modification of the at least one of the first and second display content on the extended display system.

In some embodiments of the extended display experience station an extended portion of the extended display system is shown at a virtual depth different from a virtual depth of the main part.

In some embodiments of the extended display experience station at least part of the at least one processor is part of a remote source in communication with the extended display system, the remote source configured to run the software application.

In some embodiments of the extended display experience station at least part of the at least one processor is part of the extended display system and is configured to at least partially run thereon.

In some embodiments of the extended display experience station the software application is further configured to communicate with a remote source and to receive therefrom assistance with the second display content shown in the extended part of the extended display system.

In some embodiments of the extended display experience station an input device configured to capture information from a user, and wherein the software application is configured for a training experience, such that the plurality of functions provides a plurality interactive auxiliary image portions.

In some embodiments of the extended display experience station the software application is configured to update the training experience for a second user based on usage of a first user.

In some embodiments of the extended display experience station the software application is a video application, and wherein a feature of the video is impacted by an AI module.

In some embodiments, the extended display experience station further comprises a user input device, wherein the video application is a clickable video and based on an input to the user input device the AI function generates one of (i) information about an object in the clickable video, (ii) new frames of the clickable video, and (iii) additional content related to the clickable video.

In some embodiments of the extended display experience station the video application is a real-time video or a remote environment, and the AI module is configured to detect a person or an action of the person in the real-time video and to display a sequence of the actions simultaneously with a display of the real-time video.

In some embodiments of the extended display experience station one of the plurality of functions is a computer-vision function configured to detect a feature of one of the plurality of input streams and output a visually modified feature on the extended display system.

In some embodiments of the extended display experience station the computer-vision function is configured to detect a content of a first image displayed on the main part of the extended display system and generate a second content to display on the extended part of the extended display system, the second content being identified by reference in the first content.

In some embodiments, the extended display experience station is configured for use in a collaborative application where a plurality of users interact with a plurality of extended display systems, each of the extended display systems displaying a portion of a visually shared environment.

In some embodiments of the extended display experience station the extended display system is communicatively coupled to a portion of the extended display experience station on a mobile device, tablet, smartphone, smartwatch, or headset.

Another aspect relates to another extended display experience station having an extended display system and a module implementing a geometric transformation function configure to receive an image and output a modified geometry of at least a part of the image.

In some embodiments of the extended display experience station the image is among a plurality of images in a video and the geometric transformation function is applied to the video.

In some embodiments of the extended display experience station the video is a video game, wherein the geometric transformation function operates on the video game to provide at least one of a pose warping, stride warping, perspective warping, orientation warping, and motion warping.

In some embodiments, the extended display experience station further comprises a camera for capturing the image and a teleconferencing application, wherein the image is of at least a user and an environment of the user, the module generates a second image with the modified geometry using the geometric transformation function, and the image and second image are combined in a shared visual environment.

In some embodiments, the extended display experience station further comprises a camera configured to capture a gesture of a user, wherein the modified geometry of at least a part of the image output by the geometric transformation function is so modified based on the gesture.

In some embodiments, the extended display experience station further comprises a camera configured to capture the image, the image being of an environment of a user, the geometric transformation function configured to act on a portion of the image such that the portion is displayed in a virtual reality environment.

Another aspect relates to a generative display experience station comprising an extended display system configured to output a multilayer display; and a plurality of computational modules each configured to take as input a content from each of a plurality of focal planes of the multilayer display and to output a generative content, the generative content modifying the content in the multilayer display.

In some embodiments of the generative display experience station at least one computational module of the plurality of computational modules is an AI module. In some embodiments of the generative display experience station the content comprises a text source and the AI module outputs a logical deduction derived from the text source.

In some embodiments of the generative display experience station a first depth of the multilayer display is an annotation layer, and a second depth displays a computer simulation or a training simulation. In some embodiments the second depth displays a training simulation, and the annotation layer displays an image of an instructor.

In some embodiments, the generative display experience station further comprises a sensor to detect an eye gaze of a user; and a user interface configured to display a menu on one of the plurality of focal planes of the multilayer display and to modify the menu based on the detected eye gaze.

In some embodiments of the generative display experience station a subset of depth layers of the multilayer display shows a plurality of images from at least one input stream, and another layer of the multilayer display shows the generative content, the generative content being a difference between the plurality of images. In some embodiments, the at least one input stream is a video and the difference is based on a time delay between the frames of the video.

In some embodiments, the generative display experience station further comprises at least one sensor for capturing information from a user, wherein the information is an input stream among the plurality of input streams input into one of the plurality of computational modules, and wherein the computational module is further configured to modify the first or second display content based on the information. In some embodiments the sensor is a user input device.

In some embodiments of the generative display experience station the plurality of computational modules is a plurality of AI modules that are probabilistically coupled to each other such that the generative display content is a combination of the possible outputs of each of the plurality of AI modules.

Another aspect relates to a tandem computing system comprising an input stream module to generate or receive a plurality of input streams, the plurality of input streams including a first input stream, wherein the input stream module is configured to receive the first input stream from a remote source; a function module implementing a plurality of functions configured to operate on the plurality of input streams, the plurality of functions including a first function; and an extended display system to display content output from the first function.

In some embodiments of the tandem computing system the remote source is at least one of a cloud source, internet, distributed network, sensor, and local area network. In some embodiments, the remote source is the distributed network, and the first input stream from the distributed network is input to the first function and the display content output from the first function is a cohesive image formed from information from the distributed network.

In some embodiments of the tandem computing system a portion of the display content is generated by information from only the remote source.

In some embodiments of the tandem computing system the plurality of input streams further includes a second input stream, the input stream module is configured to receive the second input stream from a local source, and the first function outputs a portion of the display content that is generated by a superposition of information from at least the first input stream and the second input stream.

In some embodiments of the tandem computing system the display content is partitioned into a low-bandwidth component and a high-bandwidth component, and the remote source relays information about one of the components to the extended display system to modify the display content at a later time.

In some embodiments, the tandem computing system further comprises at least one sensor configured to collect an input from a user, wherein output from at least one of the plurality of functions is dependent upon said input.

In some embodiments of the tandem computing system one of the functions is a time delay function configured to calculate and display a difference between a two input streams among the plurality of input streams.

In some embodiments of the tandem computing system the remote source is part of a shared visual environment configured for teleconferencing, the first function is an AI module configured to detect features of a conversation during the teleconferencing, and the display content on the extended display system comprises information about the features.

In some embodiments of the tandem computing system the extended display system is a multilayer display including a first layer and a second layer, the plurality of input streams further includes a second input stream, the input stream module is configured to receive the second input stream from a local source, the plurality of functions further includes a second function configured to receive the second input stream as input and to output second display content based on the second input stream, the display content is first display content based on the remote source and is displayed on the first layer, and the second display content based on the local source is displayed on the second layer.

In some embodiments, the tandem computing system further comprises a camera array coupled to a remotely controlled vehicle for a teleoperations application. In some embodiments, a sensor array configured to collect data from a user, said data comprising at least one of headtracking, SLAM, and eye gaze from the user, wherein the at least one of the plurality of functions receives said data as input and outputs angle-accurate dynamic perspectives of a visual environment.

In some embodiments of the tandem computing system the plurality of input streams include at least a sub-plurality of input streams each comprising information about a respective remote user engaged in a collaborate application. In some embodiments, the extended display system is configured to display a shared visual environment, and wherein at least one function among the plurality of functions is configured to dynamically translate a content shared by a first user into a different form for a second user, the different form determined by at least one of a second user profile and a history.

In some embodiments of the tandem computing system the extended display system displays a shared visual environment in a multilayer display, configured for use by a plurality of users, and wherein a first layer is generated by the remote source, the first layer viewable in common by the plurality of users, and further configured to be impacted by a respective second layer of each of the plurality of users. In some embodiments an input sensor is configured to detect a geometry or a user, and wherein the respective second layer of each of each user acts as a window to the first layer, the window determined by the geometry.

In some embodiments of the tandem computing system a user input of the first user is input into a function that outputs a modified content of one of the respective second layers.

Another aspect relates to a generative display system comprising an input stream module to generate or receive a plurality of input streams; a function module for implementing an AI function configured to receive at least one input stream of the plurality of input streams as input and to output generative visual information that is an annotation of a virtual image derived from the at least one of the plurality of input streams; and an extended display system configured to display the generative visual information.

In some embodiments, the generative display system further comprises a user input device configured to detect a user input, wherein the AI function is configured to continuously update the generative visual information based on at least one of the plurality of input streams, and the AI function is further configured to receive the user input from the user input device and to alter the generative visual information based on the user input.

In some embodiments of the generative display system the AI function takes as input at least one focal plane image, and outputs an annotation as an extended field of view display image.

In some embodiments of the generative display system the at least one of the plurality of input streams comes from a remote source.

In some embodiments of the generative display system the generative visual content is modified by a user profile or a user history.

BRIEF DESCRIPTION OF THE DRAWINGS

FIG. 1 illustrates a set of elements that are common features in the example embodiments in this disclosure.

FIGS. 5A through 5J illustrate a set of example functional blocks that may be used in the software-generating mechanism to produce various software experiences. These blocks may be chosen by the user or be decided based on prompts or inputs in the system at a given time.

FIGS. 6A through 6J illustrate a set of flowcharts or block diagrams corresponding to the example embodiments described in FIGS. 5A through 5J.

FIGS. 7A through 7G show a set of embodiments of generated software experiences, configured to display alternative actions that may be executed with the display system and that are correlated with the current usage.

FIGS. 8A through 8G illustrate a set of flow charts demonstrating example mechanisms for displaying alternative actions for some of the embodiments in FIGS. 7A through 7G.

FIGS. 9A and 9B depict neural network block diagrams that can be used to implement predictive features of the software described in this disclosure.

FIGS. 11A through 11G depict a set of embodiments of software applications for extended, virtual, or multilayer display systems.

FIGS. 13A through 13I depict a set of embodiments of generative software applications for extended, virtual, or multilayer display systems for which the content is derived from local or remote sources.

FIGS. 14A through 14E depict a set of embodiments of generative software applications for extended, virtual, or multilayer display systems for multi-user applications.

FIGS. 16A through 16C depict a set of flow charts that describe the partitioning of extended display systems into remotely sourced and locally sourced subsections.

DETAILED DESCRIPTION

Figure 2B:
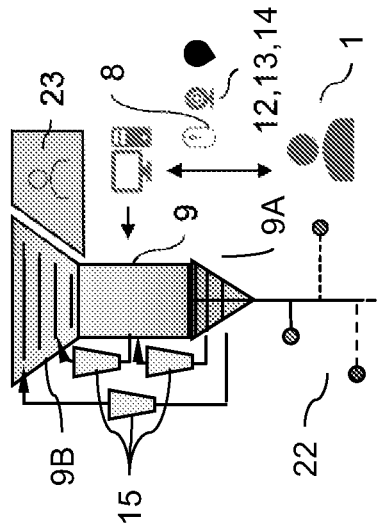
FIGS. 2A through 2D describe a set of software applications that use extended, virtual, or multilayer display systems with or without remote computing sources.

Modern display devices offer new channels of bandwidth sharing, content creation, and user interaction. Immersive content and hardware, such as augmented reality (AR), virtual reality (VR), extended reality (XR), mixed reality (MR), headsets, and free-standing virtual display systems, are all modalities that offer unexplored methods and software applications to enhance human productivity and entertainment. Coupled with machine learning (ML), artificial intelligence (AI) algorithms, and other software architectures and algorithms, predictive and generative visual content can be displayed in new and unique ways to amplify or enrich the user experience. The inventors have recognized and appreciated that the visual experience of the user may be enriched by leveraging computer power that is running in tandem to extend and expand the set of possibilities that are offered to the user's field of view (FoV). For example, software mechanisms that incorporate such content into varieties of display systems that include, but are not limited to, three-dimensional displays, virtual and multilayer displays, or even multi-monitor setups. In some embodiments, the display images are just 2D images extended to side panels and monitors. In some other embodiments, the display provides images with monocular depth, wherein a viewer experiences accommodation depth cues to at least one image plane. In some embodiments, the display images are stereoscopic images. In some embodiments, both stereoscopic and monocular depth cues are provided. A user of the disclosed technology may experience enhanced productivity, entertainment value, or generative suggestions for an arbitrary application.

In this disclosure, new software methods and software applications are discussed. Some embodiments described herein disclose such methods and applications configured for use in extended display systems, and they include methods for generating software applications, integration of predictive visual software, collaborative and single-user applications, and software applications and displays that involve a plurality of sources, including remote sources. New ways are described for generating visual bandwidth for user productivity, training, video conferencing, telepresence, or entertainment.

Nomenclature

A "display system" or "display" is any device that produces images. Physical sources of display images can be standard 2D images or video, as produced by a display panel or a plurality of display panels, such as a liquid crystal display (LCD), light emitting diode (LED) display, micro-LED display, organic light emitting diode (OLED) display, polymer light emitting diode (POLED) display, active-matrix organic light emitting diode (AMOLED) display, MOLED, and the like. Such display technologies, or a plurality of them, may also be incorporated into other display systems. In some embodiments, spatial light modulators (SLMs) are used. In some display systems, light sources may be coupled with masks or patterned elements to make the light source segmented and addressable. Other sources may be generic light sources, such as one or several LEDs, backlights, or laser beams, configured for use, for example, in projection-based display systems.

Further, a display system may be a headset, a handheld device, or a free-standing system, where the term "free-standing" means that the device housing can rest on a structure, such as a table. In some embodiments, the display system is configured to be attached to a structure by a mechanical arm.

In this disclosure, an "extended display" or "extended display system" is any display system that has part of an image or visualization allocated, extended, or dedicated to extended content, which is not the main content fed to the display. This includes a multi-monitor setup; a monitor-projection system hybrid setup; virtual display systems; AR, VR, and XR headsets with extended headtracking views;

multi-projection systems; lightfield display systems; multi-focal display systems; volumetric displays systems; tiled video walls; or any display systems that are connected portions of the same environments. In some embodiments, the extended display system has one part on a monitor and another part on a cellphone, tablet, laptop screen, touch screen, advertisement screen, or AR/VR/XR/MR device. An extended display system can be divided into any collection of displays on any screen devices in any application. An extended display system may be considered as a collection of displays or pixels on one or a plurality of devices, such that there is a main input set of pixels and an extended set of pixels. The extended set of pixels may also be called an "extended portion" or "extended part" of the display content. An extended display system may be described as having a main part, for which the content is generated by a primary computer system (a "local source"), and it may have a secondary part (i.e., an extended part) that may be generated by auxiliary or indirect computer systems or sources (a "remote source").

A "virtual display system," is an extended display system that produces images at two or more perceived depths, or a perceived depth that is the different from the depth of the display panel that generates the image. Such images may rely on monocular depth; they may be stereoscopic, autostereoscopic, or (auto)multi-scopic. A virtual display system may be a free-standing system, like a computer monitor or television set. It may be part of a cellphone, tablet, headset, smart watch, or any portable device. It may be for a single user or multiple users in any application. Virtual display systems may be volumetric or lightfield displays. In some embodiments, the virtual display system is a holographic display, which relies on the wave nature of light to produce images based on manipulating interference the light.

The term "display content" is used to describe the source information or the final image information that is perceived by a viewer. In some embodiments, the virtual display system produces an eyebox whose volume is big enough to encompass both eyes of a viewer simultaneously. In another embodiment, the virtual display system produces a left eyebox and a right eyebox, configured for simultaneous viewing by the left and the right eye, respectively. The size and number of eyeboxes depends on the specific nature and design of the display.

Extended display systems, including virtual display systems, may incorporate any hardware, including liquid crystals or other polarization-dependent elements to impact properties of the display; any type of mirror or lens to redirect the light path, influence the size in any dimension, modify the focal depth, or correct for aberrations and distortions; any surface coatings, active elements; spectral or spatial filters to assist in image quality; optical cavities; or any type of element or coating to serve as a shield layer or antireflection layer to reduce unwanted, stray, or ambient light from reaching a viewer. In some embodiments, display systems comprise metamaterials and metasurfaces, nonlinear optical elements, photonic crystals, graded-index materials, anisotropic or bi-anisotropic elements, orelectro-optic elements. In some embodiments, extended display systems are optical virtual display systems. However, extended display systems can be of any modality, including radiofrequency or acoustic display systems, configured for consumption by a person's human auditory system. The displays, or elements of the display may be curved in some embodiments.

In some embodiments, a field evolving cavity is included as a component in the extended display system. A "field evolving cavity," "FE cavity," or "FEC," is an optical cavity in which light may substantially fold back on itself. An FEC assists in providing depth cues for three-dimensional perception for a user. In some embodiments, a depth cue is a monocular depth cue. An example of an FEC comprises a first semi-reflective element, a gap of air or dielectric material, and a second semi-reflective element. Light travels through the first semi-reflective element, through the gap, is reflected by the second semi-reflective element, travels back through the gap, is reflected by the first semi-reflective element, travels forward through the gap again, and then is transmitted by the semi-reflective element to a viewer. The result is that the effective distance traveled by the light in this case is three times bigger than the gap distance itself. The number of round trips is arbitrary. For example, there may be 0, 1, 2, or 3 round trips. In some embodiments, polarization—dependent and polarization impact elements-such as polarizers, wave plates, and polarizing beam splitters—may be used to increase the efficiency or modify the number of round trips. If, for example, the source of light is a pixel, which is approximately a point source, the FEC causes the spherical wavefront of the pixel to be flatter than it would be if the light traveled once through the gap.

In an FEC, the number of round trips determines the focal plane of the image and, therefore, the monocular depth cue for a viewer. In some embodiments, different light rays travel different total distances to produce multiple focal planes, or a multi-focal image, which has a plurality of image depths. In some embodiments, an image depth is dynamic or tunable via, e.g., electro-optic structures that modify the number of round trips.

A "lightfield" is a mathematical model of light propagation that relies on geometric ray approximation. Some lightfield models incorporate wave-based effects like diffraction. A lightfield display is a three-dimensional display that is designed to produce 3D effects for a user using lightfield modeling. A concentric lightfield display is a light field display in which for any two pixels of the display at a fixed radius from the viewer, the chief ray of the first pixel's light cone intersects with that of the second pixel's light cone. A concentric light field display produces an image that is focusable to the eye at all points.

A display system can produce images, overlay annotations on existing images, feed one set of display content back into another set for an interactive environment, or adjust to environmental surroundings. Users may have VR, AR, XR experiences, video-see through effects, monitor remote systems and receive simultaneous predictive suggestions, provide an avatar with permissions to make imprints on digital content or online resources, or use AI for generative content creation. In some embodiments, a subsection of the display content is input into an algorithm to impact another subsection.

A "subsection" of display content is a partitioning of the display content produced by the display system. In some embodiments, a subsection is a pixel or set of pixels. The set of pixels may be disjoint or contiguous. In some embodiments, a subsection corresponds to a feature type of the display content. For example, a subsection of an image of a person may be a head or an arm, and another subsection may be a hand or an eye. In some embodiments, a subsection may be an entire layer or part of a layer or focal plane of a display that produces multiple focal planes. In some embodiments, a subsection is a part of the spectral content of an image or a portion of the image in an arbitrary mathematical basis. Subsections may also be partitioned differently at various times.

Display content may be manipulated by a user or interactive with a user through various input devices. Input devices are types of sensors that take in a user input, usually deliberately rather than automatically. Input devices, such as cameras, keyboard and mouse input, touch screens, gesture sensors, head tracking, eye tracking, VR paddles, sound input, speech detection, allow for user feedback in multiple modalities. In some embodiments, various biological or health sensors capture information—such as heart rate, posture, seating or standing orientation, blood pressure, eye gaze or focus—and use that information in an algorithm to influence or impact the displayed content.

In some embodiments, for example, eye gaze may be detected, and the locations of the eye gaze may be tracked. Eye gaze detection may measure a person's focus, i.e., where that person is looking, what that person is looking at, how that person is blinking or winking, or how that person's pupils react (e.g., changes in pupil size) to any stimuli, visual or otherwise. A sensor, such as an infrared sensor, may shine infrared light onto the eyes detect changes in reflectivity based on eye motion. In some embodiments, a camera captures images of the eyes, and a convolutional neural network (CNN) is used to estimate the eye gaze. Once the eye gaze is detected or known by the display system, the display content may change based on the eye gaze. For example, the eye gaze might be such that a user is looking at a particular display content that corresponds to an action that the user may take, such as displaying a menu. In another example, a first layer may display a wide-field image of a scene or a user's location on a map, and eye tracking feedback zooms into a particular region or displays annotations about the region that is the focus of the eye gaze. This example may be called telescoping functionality.

In some embodiments, user input or environmental input can be generated through other various sensors or AI mechanisms that can interface with the display system directly or indirectly. Sensors include any type of camera, pressure or haptic sensors, sensors detect health biological information about a person or the environments, clocks and other timing sensors, temperature sensors, audio sensors (including any type of microphone), chemical sensors, or metrology sensors for scientific and engineering purposes.

Sources of display content may be local or remote. Sources include local workstations, laptops, computers, edge devices, distributed sensors, the internet, cloud sources, servers or server farms, or any electronic device that can communicate data. Sources can include microcontrollers, field programmable gate arrays (FPGAs), cloud computers or servers, edge devices, distributed networks, the internet of things (IoT). Sources may operate on the data before transmitting it to the display system, and sources may receive data from the display system to operate on.

Remote sources include, but are not limited to, cloud servers, the internet, distributed networks or sensors, edge devices, systems connected over wireless networks, or the IoT. Remote sources are not necessarily located far away and may include processing units (CPUs, GPUs, or neural processing units (NPUs)) that are operating on a station other than a local source. The local source is hardwired to the user interface system and acts as the main workstation for the main display portion of an extended displays.

A "communication channel" refers to a link between at least two systems or users that allows the transmission of information and data, for example, between a source and a display. It may be hardwired or wireless. Communication channels include ethernet, USB, wireless networks, any short-range wireless technology (such as Bluetooth), fiber optic systems, digital subscriber line (DSL), radiofrequency (RF) channels, such as coaxial cable.

An "input stream" refers to data or information from an either local or remote data storage system or source from which data can be retrieved. The data can be transmitted in real-time. It can include metadata about the physical source itself or about other content. An input stream may be graphical data meant directly for display on a display system. In some embodiments, an input stream may refer to one or more input streams directed to a subsection of a display system. In some embodiments an input stream is generated by a user action in one subsection of a display and shown on another subsection.

Latency is the delay between the instant information begins transmission along a communication channel and the instant it is received at the end of the channel. Typically, there is a tradeoff between latency and content bandwidth. For remote sources, latency of data communication is a parameter that can be integrated into designing software applications. Latency in remotely generated content can be incorporated into ML weights and linear layers of various neural networks.

In some embodiments, various AI and ML algorithms can be incorporated into visual predictive services. Existing learning algorithms such as generative pre-trained transformers and bidirectional encoder representations from transformers may be generalized, as described herein, for user actions and incorporated into the extended display system to command part or the entire extended display.

Applications include, but are not limited to, graphical predictive assistants and virtual assistants, quality control, teleoperations, flight simulations and defense, medical and diagnostic imaging, e-sports and gaming, financial trading. In these use cases, multidimensional datasets must be displayed in intuitive ways, so that a user may make an informed decision. In some embodiments, predictive analyses can be computed. In some embodiments, virtual avatars, or AI systems with user-granted permissions act on these predictive analyses. Examples of AI generative content include text-to-image, image-to-text, image- or text-to-task, text-to-code, text-to-reasoning, image- or text-to-recommendation, or any other combination An AI function or module may be assisted in content generation by probabilistic analysis to combine different models or training data.

The terms "user" or "viewer" refer to a person interacting with a system using a sense, which could be visual, auditory, tactile, or olfactory. In some embodiments, the system is a display system or an extended display system. A user may also be a future user, who will use a system at a different time, to allow for asynchronous applications. A "user interface," or "UI," corresponds to the set of interactive tools (such as toggle buttons, radio buttons, scroll bars, or drop-down menus) and screens that a user can interact with. Similarly, a "user experience," or "UX", defines a summative experience of a user as determined by a UI.

A "3D image" is an image that triggers any depth cue in a viewer, who consequently perceives display content at variable depths, or different parts of the display content at various depths relative to each other or display content that appears at a different depth than the physical display system. In some embodiments, parallax effects are produced. In some embodiments, 3D effects are triggered stereoscopically by sending different images to each eye. In some embodiments, 3D effects are triggered using "monocular depth" cues, wherein each eye focuses or accommodate to the appropriate focal plane. A virtual image is an image displayed on a virtual display system. Virtual images may be multifocal, varifocal, lightfield images, holographic, stereoscopic, autostereoscopic, or (auto)multi-scopic. The virtual depth of a virtual image may be dynamically adjustable via a control in the display system, a user or sensor input, or a pre-programmed routine.

The depth at which content is located is called a "virtual depth," of "focal plane." A display that produces display content viewable at different virtual depths is called a "multilayer display system" or "multilayer display." For example, a multilayer display system is one in which display content is shown in such a way that a viewer must accommodate his eyes to different depths to see different display content. Multilayer displays comprise transparent displays in some embodiments. Display content at a given virtual depth is called a "layer," "depth layer," or "virtual layer."

An "annotation layer" is display content that provides context, more information, or descriptions of other content in the display system. For example, an annotation layer might be a layer or focal plane in a multilayer display. An annotation layer provides graphics or text annotations about the content in the other layers. Other formats of extended displays may also include annotations. An annotation may be displayed on hovering graphics, on extended FoV displays, or overlaid on top of the associated display content in a single image.

In some embodiments, other properties of interest of the display content include, but are not limited to, resolution, refresh rate, brightness, FoV, viewable zone, monocular depth, or accommodation, vergence, eye box or headbox.

A "visual template" refers to a predetermined way to computationally organize and display data and information in a virtual display system. A visual template example is a set of layers produced by a multilayer display.

Generally, a "visual environment" is a collection of display content or virtual images, which may be able to interact with each other. The display content may have as its source camera images or computationally rendered images, such as computer graphics. The visual environment can be a virtual reality environment, in which all the content is virtual display content; it can be an augmented or mixed reality environment, in which virtual images are super-imposed a physical environment; or in can be a conventional image content from a display panel like an LCD panel. In some embodiments, the visual environment comprises only one virtual image. Visual environments may be used by a single user in the kinematic rig, or they may be shared or displayed by a plurality of display systems that are in communication with each other through, for example, the internet, or any type of wired or wireless network. A "shared visual environment" is a visual environment that may be used for any collaborative activity, including telework applications, teleconferencing, web conferencing, online teaching, or collaborative or multi-player gaming. In a visual environment or a shared visual environment, different users may view the display content from different perspectives, and in some embodiments the shared visual environment is immersive, such that two users each using a display in a separate location but in the same shared visual environment perceive that they are physically next to each other, or such that a user perceives being in a location other than the physical location of the display system, for example, by navigating in visual environment, or having collaborative users in the peripheral area of a virtual panorama.

Extended display systems and virtual display systems are useful for varied applications, including video games, game engines, teleoperations, simulation training, teleconferencing, and computer simulations.

A video game is an electronic game involving interaction with one or more players through a user interface and utilizes audio and visual feedback to create an immersive and interactive gaming experience. Video games may be designed for a variety of platforms, including consoles, personal computers, mobile devices, and virtual reality systems, and may incorporate various game genres, such as action, adventure, role-playing, simulation, sports, puzzle, and strategy games. The game mechanics and rules may vary depending on the game, but they usually involve an objective that the player(s) must achieve within the game's environment. A game engine is a platform for generating video games.

Teleoperations is a method of controlling a remote device or system that enables a human operator to perform tasks on the remote device or system in real-time. The teleoperation system typically includes sensors and actuators for the operator to perceive and manipulate the remote environment, as well as a user interface that provides feedback and controls for the operator. The remote device or system may be located in a hazardous or difficult-to-reach location, or it may require specialized skills or expertise to operate, making teleoperations a useful tool in a variety of industries, including manufacturing, construction, exploration, and remote-controlled vehicle use. The teleoperation system may also incorporate artificial intelligence and machine learning algorithms to enhance the operator's abilities and automate certain aspects of the remote operation Teleconferencing is a technology that enables remote participants to communicate and collaborate in real-time conferences over a communication channel, such as the internet. The teleconferencing system usually includes both hardware and software components that allow participants to connect to the conference and interact with each other, such as a camera, microphone, speaker, display screen, and user interface. The system may also incorporate features such as screen sharing, file sharing, virtual whiteboards, and chat messaging to enhance the collaboration experience. Teleconferencing is commonly to facilitate remote meetings, presentations, training sessions, and consultations, allowing participants to communicate and work together without the need for physical travel.

Simulation training is a technology that replicates the experience of a task in a simulated environment, typically using computer software and specialized hardware. An example is a flight simulation technology, which simulates the task of flying an aircraft. The flight simulation system typically includes a cockpit simulator or control interface that mimics the controls and instruments of a real aircraft, as well as a visual display system that provides a realistic representation of the simulated environment. The simulator may also incorporate motion and sound effects to enhance the immersive experience. Flight simulations can be used for a variety of purposes, such as pilot training, aircraft design and testing, and entertainment. The simulation may be based on real-world data and physics models to accurately replicate the behavior of the aircraft and its environment, and it may also incorporate scenarios and events to simulate various flight conditions and emergencies. User inputs to a flight simulation training application include a yoke and throttle, physical panels, or touch screens.

A computer simulation is a digital model of a real-world system or process that is designed to mimic the behavior and interactions of the system or process under different conditions. Computer simulations usually use mathematical algorithms, computer programs, and data inputs to create a visual environment in which the behavior of the system can be explored and analyzed. The simulated system may be a physical object or phenomenon, such as a weather system, a chemical reaction, an electromagnetic phenomenon, or a mechanical device, or it may be an abstract concept, such as a market or a social network. Computer simulations can be used for a variety of purposes, such as scientific research, engineering design and testing, and training and education. The accuracy and complexity of computer simulations can vary widely, depending on the level of detail and fidelity required for the particular application. Often the computer simulation allows a user to interact with the details of the simulated system by changing the modeling parameters or computational parameters.

In any embodiment, any sensor can be used to provide information about a user, an environment, or other external conditions and scenarios to the display system. In some embodiments, for example, a camera is used to capture information about a user or a user's environment. Multiple cameras, or a camera array, or a camera system can be used. In some embodiments, depth cameras capture information about depth or sense gestures and poses and they can be of any type. In this disclosure, a "depth camera," "depth sensor," or "RBGD camera" is an imaging device that records the distance between the camera and the distance to an object point. It can be actively illuminated or passively illuminated, and it can include multiple cameras. Light detection and ranging (LIDAR), and time-of-flight cameras are examples of active depth cameras. A depth camera can also use optical coherence tomography sensing (i.e., autocorrelation). It can use infrared (IR) illumination to extract depth from structure or shading. Depth cameras can incorporate gesture recognition or facial recognition features. Depth can also be estimated from conventional cameras or a plurality of conventional cameras through, for example, stereo imaging. The camera array or camera system can include any combination of these cameras.

A "gesture" is a motion, facial expression, or posture orientation of a user, which are normally interpreted by a person or by a computer to indicate a certain desired change, emotion, or physical state. They are typically on a time scale observable by a human being. Micro-gestures are motions, expressions, or orientations that occur within a fraction of a second. They are usually involuntary and indicate similar features as gestures. They can include brief shifts in eye gaze, finger tapping, or other involuntary actions. Gestures may be captured by a camera and identified or classified by a deep learning algorithm or convolutional neural network.

Generally, the "geometry" of a person, user, object, display image, or other virtual or physical object is a term that includes both the position and the orientation of the item. In some embodiments, the geometry of an object may correspond to the shape, i.e., by how much an object is distorted, stretched, skewed, or generally deformed. For example, a camera and algorithm together may be used to identify the location of a physical object in space.

In this document, the terms "machine readable medium," "computer readable medium," and similar terms are used to refer to non-transitory mediums, volatile or non-volatile, that store data and/or instructions that cause a machine to operate in a specific fashion. Common forms of machine-readable media include, for example, a hard disk, solid state drive (SSD), magnetic tape, or any other magnetic data storage medium, an optical disc or any other optical data storage medium, any physical medium with patterns of holes, a random access memory (RAM), a programmable read-only memory (PROM), erasable programmable read-only memory (EPROM), a FLASH-EPROM, non-volatile random access memory (NVRAM), any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

A "processing device" may be implemented as a single processor that performs processing operations or a combination of specialized and/or general-purpose processors that perform processing operations. A processing device may include a central processing unit (CPU), graphics processor unit (GPU), accelerated processing unit (APU), digital signal processor (DSP), field programmable gate array (FPGA), application specific integrated circuit (ASIC), system on a chip (SOC), and/or other processing circuitry.

AI is any intelligent operation produced by a machine. Intelligent operations include perception, detection, scene understanding, generating, or perceiving information, or making inferences. The terms "neural network," "artificial neural network," or "neural net" refer to a computational software architecture that are example implementations of AI and that is capable of learning patterns from several data sources and types and making predictions on data that it has not seen before. The types, algorithms, or architectures, of neural networks include feedforward neural networks, recurrent neural networks (RNN), residual neural networks, generative adversarial networks (GANs), modular neural networks, or convolutional neural networks (CNN) (used for object detection and recognition). Neural networks can comprise combinations of different types of neural network architectures. The parameters of a neural network may be determined or trained using training data. Neural networks can be supervised or unsupervised. The learning can be completed through optimization of a cost function. In some embodiments, the neural network architecture is a radial basis network, multi-layer perceptron architecture, long-short term memory (LSTM), Hopfield network, or a Boltzmann machine. Neural network architectures can be one-to-one, one-to-many, many-to-one, many-to-many. Any of the AI algorithms can be used in the AI-based embodiments in this disclosure. For example, a GAN may use an optimization by stochastic gradient descent to minimize a loss function. An LSTM or RNN may use a gradient descent algorithm with backpropagation.

A "transformer" is a machine learning model in deep learning that relies on self-attention to weigh input data in diverse ways. Transformers are often used in computer vision and natural language processing (NLP). They differ from RNNs in that the input data is processed at once, rather than sequentially. Generative pre-trained transformers and bidirectional encoder representations from transformers are examples of transformer systems. Applications include video or image understanding, document summarization or generation, language translation, and the like.

Learning algorithms may be supervised or unsurprised. Some supervised learning algorithms used to implement the embodiments disclosed herein include decision trees or random forest, support vector machines, Bayesian algorithms, and logistic or linear regression. Unsupervised learning gains information by understanding patterns and trends in untagged data. Some algorithms include clustering, K-means clustering, and Gaussian mixture models. In some embodiments, non-neural network computational methods are used to generate display content. In some embodiments, neural networks are combined with other computational methods or algorithms. Other computational methods include optimization algorithms, brute force algorithms, randomized algorithms, and recursive algorithms. Algorithms can implement any mathematical operation or physical phenomena.

An "avatar" is a computer program or program interface that may include a character or a representation of a user in a digital or a visual environment. The avatar may be a visual likeness of a person, but it may also take on a default form. In some embodiments, the avatar does not have a visual likeness at all or uses text or audio modes to communicate with a user. In some embodiments, the avatar serves as a user interface for making suggestions to a user, making predictions, or assisting in executing tasks. In some embodiments, the avatar has permissions to execute tasks without direct influence from a user. The avatar may be AI-based. An avatar may use a neural network or other deep learning mechanism.

"Tandem computing" is a method by which a display system shows display content from a plurality of sources, at least one of which is a remote source that displays content on an extended part of an extended display system. The display content is of any variety and may interact with each other.

To "interact," in the context of two display contents interacting with each other, means that the display content of one portion of the display system is input into a function whose output dynamically impacts the display content of a second portion, and vice versa, i.e., that the display content of the second portion is input into a function (which may be the same function) whose output dynamically impacts the display content on the first portion.

"Render parallelization" refers to the capability of breaking up renderings tasks so that they can be distributed among different local and non-local computational resources. Graphics may be rendered in a variety of ways, including computer graphical techniques and radiance equations, leveraging content from volumetric video, neural rendering, or neural radiance fields.

A "graphical user interface," or "GUI," refers to any interface displayed on a display system that allows a user to interact with the system and information in a graphical and visual manner. A GUI may include different ways for a user to input information, such as radio buttons, toggle switches, drop down menus, or scroll bars. The GUI allows the user to interact with or generate software, or to interact with electronic devices.

A "function" is a mapping that takes in a piece of content to produce a different piece of content, or to annotate or modify the original content. A Function may be an algorithm to implement a mapping or operation. A function may take in multiple pieces of content and output multiple pieces of content. The functions may be low-level, for example, mathematical operations or image processing functions. The functions can be mid-level, for example, take in an image and detect a feature, such as an edge, within a scene. A function may be a computer-vision-assisted function. Or the function can enhance the property of the content. The function can be high-level, for example, and generate content or detect a class of objects or make predictions about future possible actions taken by a viewer observing the input content. In some embodiments, functions are predefined. In some embodiments, functions are user-defined. Functions may be enacted through AI, including neural networks, encoder/decoder systems, transformers, or combinations of these examples. Functions may also include various methods to optimize, sort, or order various data or images. Functions may be deterministic or stochastic. They may take multiple inputs and produce multiple outputs, which may depend on time.

An example of a computational function is a simultaneous localization and mapping (SLAM) function, which constructs or updates a map of an environment and tracks users or objects in it. SLAM algorithms may involve taking as input sensory data, such as a camera, and calculating the most probable location of an object based on the sensory data. The solution may involve an expectation-maximization algorithm. Particle or Kalman filters may be used.

Another function may be used for tracking an object or a user's body part, such as in a head-tracking use case. Tracking may be implemented with a constant velocity model.

The terms "graphics intelligence," "Intelligent generative content" or "generative content" refer to functions that output content whose input is at least one input stream. The input streams may include content that is configured for a display system. An example of graphics intelligence is an AI module or function that takes as input a set of display images and outputs a second display image that has various annotations to describe the input and to suggest methods for the user to interact with those inputs. The output content may be visual data. The output content may be used as input for other functions. The graphics intelligence may also take as input sensory data of the user, the user's environment, or another environment, such as a manufacturing warehouse, automobile surroundings, or other industrial setting. A "generative function" is a function that takes as input one or more input streams and outputs new content. In some embodiments the generative function is also influenced, impacted, or parametrized by a user's input, profile, history. The user profile contains information about the user, for example, interests, goals, desired viewing content, or demographics. The user history is the historical usage made by a user of a particular application or set of applications. It may be, for example, a search history, a list of email correspondents, a list of media that the user viewed in a given time period, and the like.

A "collaborative software application" is one in which a plurality of users interacts with each other through it. The interaction can be simultaneous or asynchronous. Examples include teleconferencing or web conferencing, online courses, multi-person gaming, various applications in control centers or teleoperations situations, webinars, or other remote learning environments. Collaborative software applications may be used in a shared visual environment.

In this description, references to an "embodiment," "one embodiment" or similar words or phrases mean that the feature, function, structure, or characteristic being described is an example of the technique introduced here. Occurrences of such phrases in this specification do not necessarily all refer to the same embodiment. On the other hand, the embodiments referred to herein also are not necessarily mutually exclusive.

The various embodiments set forth herein are described in terms of exemplary block diagrams, flow charts and other illustrations. As will become apparent to one of ordinary skills in the art after reading this document, the illustrated embodiments and their various alternatives can be implemented without confinement to the illustrated examples. For example, block diagrams and their accompanying description should not be construed as mandating a particular architecture or configuration.

All illustrations, drawings, and examples in this disclosure describe selected versions of the techniques introduced here and they are not intended to limit the scope of the techniques introduced here. Additionally, throughout this disclosure, the term "arbitrarily engineered" refers to being of any shape, size, material, feature, type or kind, orientation, location, quantity, components, and arrangements of components with a one or more components that would allow the present disclosure or component of the present disclosure to fulfill the objectives and intents of the present disclosure or of that specific component within the disclosure.

All such components and software can be arbitrarily engineered to deliver the desired profile. As used herein, "arbitrary parameter variation" refers to variations, changes, modulations, programing, benchmarking, optimizing, and/or control of parameters, which can include one or a plurality of the following variations: bandwidth, channel capacity, brightness, focal plane depth, parallax, permission level, sensor or camera sensitivity, frequency range, polarization, data rate, geometry or orientation, sequence or timing arrangement, runtime, or other physical or computational properties.

Some capabilities described herein such as functions, visual templates, graphical user interfaces, input stream reception, and input stream generation, may be implemented in one or more modules. A module comprises the hardware and/or software, to implement the capability. For example, such a capability may be implemented through a module having one or more processors executing computer code stored on one or more non-transitory computer-readable storage medium. In some embodiments, a capability is implemented at least in part through a module having dedicated hardware (e.g., an ASIC, an FPGA). In some embodiments modules may share components. For example, a first function module and a second function module may both utilize a common processor (e.g., through time-share or multithreading) or have computer executable code stored on a common computer storage medium (e.g., at different memory locations).

In some instances, a module may be identified as a hardware module or a software module. A hardware module includes or shares the hardware for implementing the capability of the module. A hardware module may include software, that is, it may include a software module. A software module comprises information that may be stored, for example, on a non-transitory computer-readable storage medium. In some embodiments, the information may comprise instructions executable by one or more processors. In some embodiments, the information may be used at least in part to configure a hardware such as an FPGA. In some embodiments, the information for implementing capabilities such as functions, visual templates, graphical user interfaces, input stream reception, and input stream generation may be recorded as a software module. The capability may be implemented, for example, by reading the software module from a storage medium and executing it with one or more processors, or by reading the software module from a storage medium and using the information to configure hardware.

Each of the processes, methods, and algorithms described in the preceding sections may be embodied in, and fully or partially automated by, code components executed by one or more computer systems or computer processors comprising computer hardware. The processes and algorithms may be implemented partially or wholly in application-specific circuitry. The various features and processes described above may be used independently of one another or may be combined in numerous ways. Different combinations and sub-combinations are intended to fall within the scope of this disclosure, and certain method or process blocks may be omitted in some implementations. Additionally, unless the context dictates otherwise, the methods and processes described herein are also not limited to any sequence, and the blocks or states relating thereto can be performed in other sequences that are appropriate, or may be performed in parallel, or in some other manner. Blocks or states may be added to or removed from the disclosed example embodiments. The performance of certain operations or processes may be distributed among computer systems or computers processors, not only residing within a single machine but deployed across several machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

FIG. 1 depicts icons representing elements that are used throughout all the disclosure figures and serve as dictionary elements or glossary elements. In FIG. 1, Icon 1 depicts a generic user of the display systems described in this disclosure. The term "user" is defined above. Icon 2 depicts a user that is engaged in a collaborative with other users. Collaborative software applications include teleconferencing, online education platforms, multi-user gaming or entertainment, simultaneous streaming. Collaborative users may interact with each other in a shared visual environment. They may also interact in visual environments asynchronously, at various times.

Icon 3 depicts input streams pulled a source. Input streams may be any content, such as visual content, metadata, programming code, text data, database information, mathematical quantities, audio data, or numerical data. Further, the format of a data stream is arbitrary and can include, e.g., compressed, or compressed formats, vector, or bitmap formats.

Icon 4 depicts a generic source, which can be remote or local. A source can provide data to display or metadata. A source also can operate on data or metadata. A generic source, local source, or remote source may also operate on data before transmitting data to a display system. Icon 5 depicts a local source. Local sources include workstations, laptops, and desktop computers; and microcontrollers and microcontroller arrays that are physically connected to and generate content for the main part of an extended display. Icon 6 depicts a remote source. Remote sources include the internet, the IoT, remote servers, other computers on extended networks, distributed networks, or edge devices. Remote sources may also be called "indirect sources," i.e., remote sources provide tangential or extended information or display content on extended portions on an extended display. A remote source also includes computational modules, not directly connected to a local source, that take as input the display content on the main part of an extended display system, operate on that display content with a function, and output the results of the function, such that the output impacts or is part of the display content of the extended part of the extended display system. That is, a remote source may use the display content of the main part of an extended display to impact the display content on the extended part without having information about how the display content of the main part is produced by the local source.

Icon 7 depicts a generic display system. In the embodiments described herein, display systems are extended display systems, but those skilled in the art can adapt and execute this description for use in any display system. In some embodiments, the display system purely receives data for display as content. In some embodiments, it may also process the data. A display system may include audio systems, such as microphones or speakers, that are synchronized to impact the display content. They may be integrated into the display system. Icon 8 depicts a local source paired with a display system. An example is a workstation with a computer monitor.

Icon 9 depicts a generic image or display content being displayed. Icon 10 depicts a generic image or display content that has been generated from a remote source. The image could be an independent display content, or it can be a subsection of a larger display content, the rest of which is pulled from another source. Icon 11 depicts a set of layers or multi-layered graphical information in which at least a portion of one display content overlaps with at least a portion of second display content. The number of layers can be arbitrary, for example, 2 layers, 3 layers, 6 layers, 8 layers, and the like. In some embodiments, the layer properties, such as the focal depth, are tunable.

Icon 12 depicts a generic input device. Icon 13 depicts a generic sensor that captures information about a person, a user, or an environment and communicates that information. The generic sensor may include a camera. Icon 14 depicts a generic camera or camera system.

Icon 15 depicts a block diagram icon describing a function acting on at least one data stream. Icon 16 depicts a series of connected function or widget blocks that will produce desired outputs based on specified inputs. Icon 17 depicts a generic annotation. This includes, for example, text or graphics that appear in a multilayer display, or it may be used as a specific function that produces an annotation. Icon 18 depicts a generic AI module. Example AI modules may include a neural network, a transformer, or other deep learning or ML algorithms. An AI module may comprise several AI modules that interact with each other, for example, by each feeding its own output content into the input of the others. In some embodiments, an AI module comprises several AI modules performing interrelated tasks, for example, composing a movie, such that one module produces audio content and another visual content, with the audio content affecting the video content and vice versa. In some embodiments, multiple AI modules are configured to individual tasks in parallel. Generally, a "computational module" is a device configured to process an input in a specified way. Computational modules tend to have specific functions and are usually different from generic processors in, e.g., a computer.

Icon 19 depicts a generic geometric transformation function. An example of a geometric transformation algorithm is a pose warping algorithm. Pose or motion warping may involve comparing the time series of the positions of points on an object and using a dynamic time series (which may also be used for, e.g., speech recognition) algorithm to optimize those distances. Transformation functions may also be spline-based to transform various parameter curves. Such transformation functions or algorithms may also be used for stride warping, perspective warping, orientation warping, deformation warping, or motion warping. The geometric transformation function may act on synthetic data, such as data about characters in a video game, or it may act on real data, such as an image of a user captured by a camera and segmented from the environment based on a machine learning algorithm.

In this disclosure, geometric transformation is any kind of geometric transformation, including shifts, rotations, affine transformations, homograph transformations. Geometric transformation also includes computational remapping. For example, depth remapping is an example in which a user's distance to a camera is processed to render a virtual image that maintains the correct physical or geometric proportions. Depth remapping may use isomorphism or homography to assess the remapping. Geometric transformation also includes dewarping, which is used to remove distortions that may be caused by an optical system, including fisheye distortion or barrel/pincushion distortion.

Icon 20 depicts a user-defined action or user-defined model/template. Any component of the software techniques here may be user-defined.

FIGS. 2A through 2D illustrate embodiments of software applications that include software generation, predictive applications, single-user and collaborative applications, and software applications that incorporate both local and remote sources, configured for use in a virtual display system.

Figure 2D:
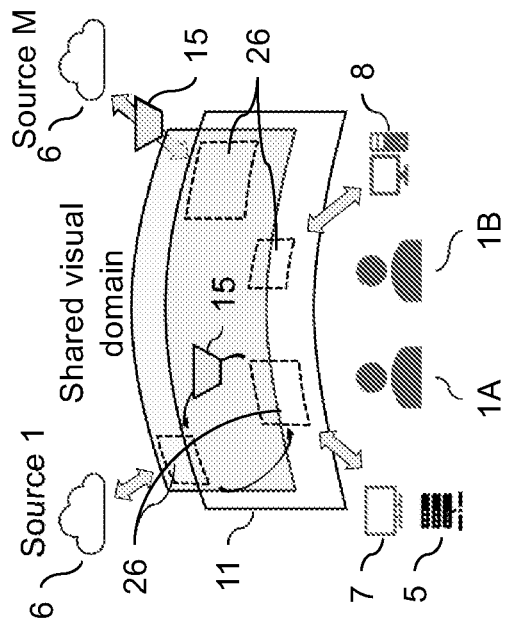
Figure 2A:
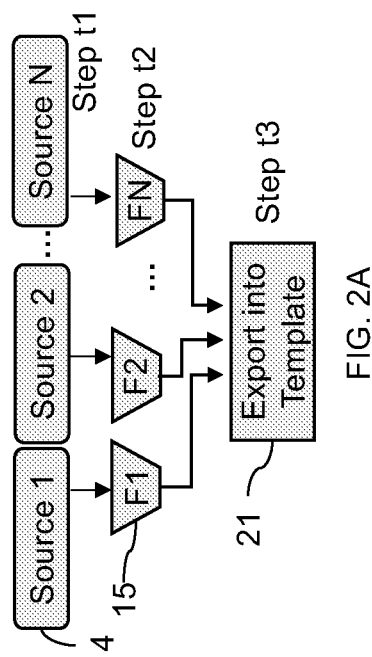

FIG. 2A depicts a software generation application, referred herein as a "stream weaver," (STW) for generating visual content configured for use in an extended display system. It includes a sequence of steps involved in collecting and compiling data from various sources 4, operating on said data using functions 15, and displaying said data to users according to template 21. Step t1 describes a set of N sources 4 from which data is pulled. The sources 4 may be remote, local, or any suitable combination of the two types. A source may be a video input stream, a camera input stream, a game input stream, an application, or any code or device connection. Step t2 describes a set of functions 15 that process the data pulled from the sources. The functions can act on the input streams from sources, including the metadata of the sources. Step t3 describes the process that shows the display content generated by the functions in step t2, configured for a chosen visual template 21. The exported visual template 21 may be a built-in choice or be user-defined. Various visual template options and features include display type or graphics specifications, arrangement of focal planes or virtual images, resolution, brightness, and depth resolution. In some embodiments, functions 15 are chosen after choosing the visual template or simultaneously. Error correction blocks may be added to correct, modify, or improve the information created in step t2.

Functions and sources do not need to be configured in sequence, and the number of sources does not need to be equal to the number of functions used. In some embodiments, functions take multiple sources as input. For example, a function "F4" may take as inputs input streams from "Source 1," "Source 2," and "Source 3." Functions may also act compositely. For example, function "F8" may take as input the output of function "F7." Some input streams may be integrated into the export template without any function operating on it at all. In some embodiments, there are no functions, and all the sources are directly integrated into the visual template. In some embodiments, a function has a feedback loop, for which the output of the function may be fed into the function as an input. This may be the case, for example, if feedback is desired for stability, recurrence functions, oscillation, or nonlinear dynamics.

Functions themselves include basic or extended mathematical operations and computational or graphic operations. Other functions include ML architectures, such as self-attention transformers or neural networks. In some embodiments, neural networks include a dictionary and training data. Functions are also generally time-dependent and depend on user input at the time of operation or on the history of user actions on the display system.

In some embodiments, the full set of functions may be decided by a generative neural network based on prompts that are input into the system. This allows a computer to choose how things can be reformed and shown to the user visually, based on those prompts. For example, one prompt may be "Give me a bird's eye view of one thousand video results that relate to my search and highlight the most popular ones." In such a prompt, the computer defines N=1000 and collectively and cohesively sends it through all the functions and starts showing annotations in different depth layers.

In another, much simpler example, a user may have only a main content source, say, a game stream, and the user navigates through a UI and chooses how she would like to choose other streams (or generate other streams) to interact with this one. For example, she can choose that for each frame of the main, center monitor, two side monitors show an out-painting frame of the center image, a median color, average color, a replica with a two-second time delay or inverted or geometrically transformed versions of the main game stream. As noted in this case, the two other monitors are dependent on the content shown in the center monitor. The streams are not necessarily video streams but may be interactive interfaces. This is a notable difference between video mixing done in video editing software and multiple interactive streams mixed together here. More categories and family trees of these functions will be described in FIGS. 4A through 4B, 5A through 5J, and 6A through 6J.

It should be appreciated that functions, visual templates, graphical user interfaces, AI, and other algorithms described throughout this specification and referenced in the drawings may be implemented in software, hardware, or any suitable combination thereof. Software may consist of machine-readable code stored in a memory (e.g., a non-transitory computer readable storage medium) that when executed by a processing device yield the described results either in the processing device itself or in hardware operably connected to the processing device (e.g., memory, extended display system).

FIG. 2B depicts a predictive software application "funnel expander," or "event," in which a local source with display system 8 functions by inputting past and present events or actions by a user 1, who is viewing a central display 9, into functions 15 to show content to the user corresponding to potential actions that the user may take. In some embodiments, multiple remote or local sources are used. The past actions may be shown in a narrowing or less obtrusive display 9A, and the potential actions shown as a more expansive display 9B, such that the past and present actions assist in displaying an expansion or funnel of future possibilities.

Current inputs and feedback by the user captured by generic input devices 12, a camera 13, or sensors 14, and are processed. The display content may also include some infographic 22 that indicates user history in a meaningful way. User history includes what applications were used, what features of applications were used, how long applications were used for, which applications were used in sequence, the actions that were taken, the display content viewed, their duration and time stamps, and their importance when measured against some metric, such as productivity. Functions 15 may produce as output a set of predicted actions that the user is most probably to engage in. In some embodiments, the suggested content is formulated by a different method than a probabilistic analysis. The method may be event-based, priority-based, based on time of day, based on settings pre-selected by a user, or any other suitable method.

In some embodiments, a user interacts with an avatar 23, which can assist in user input or be given permissions to be able to execute predicted actions. In this way, the user can multi-task in multiple parallel processes. The avatar may be a visualization, a set of text instructions, or a subroutine that is not visible to a user.

In some embodiments, the functions are probabilistic, such that actions that happen most frequently or are most correlated with the current action or display content are weighed more heavily than others. In some embodiments, the functions are based on a time factor, such that actions from the recent past are weighed more heavily than those in the distant past. In some embodiments, neural networks or transformers are used to help determine or refine the predictive behavior of the software.

The predictive features in some embodiments include estimates on the success of the user's current action, or how long it will take a user to complete the current action and how the user's schedule or calendar might be affected. Using a calendar as an input, the predictive feature may suggest alternative times to complete various tasks.

This embodiment allows for four-dimensional scrolling, in both time and space, using the extended display screens as infinite scroll with cursor or user inputs. In some embodiments, the user may be able to see parallel possibilities at multiple parts or depths of the extended display system and simply choose the desired option with a gamified mechanics. Which parallel possibilities are shown depend on the current user action and therefore can change dynamically in real time. This embodiment helps the user see as vast a set of possibilities generated by the computer as possible while getting to almost real-time interactions (back-and-forth "ping-pong-like" feedback) with computer as it crafts the data stream. For example, today, to write a word document, one must write it line by line or, if text is generated by a computer, the user must read a single variation at a time, edit it line by line, or ask for a different variation. In an embodiment described here, an expanded set of variations are shown in different parts of extended display, such that while reading, the user is also choosing in real-time what variations are being woven into the text.

Another example is a rolling screen embodiment. Today, a user is limited by vertical resolution of a screen when scrolling on a website, computer code, or vertically long data. In the case of a three-monitor setup, this arrangement does not help in seeing more of that vertical data. With a funnel expander, a user has side monitors or front depth layers as the continuation of those vertical data. Funnel expanders may also suggest varieties of possibilities or parallel possibilities inside monitors, other depth layers, or in a peripheral FoV. For example, in a VR headset, when reading a vertical article, a user may see several other parallel articles appearing next to the main article that can be seen in the periphery. More details of funnel expanders will be given in FIGS. 7A through 7G.

Figure 2C:
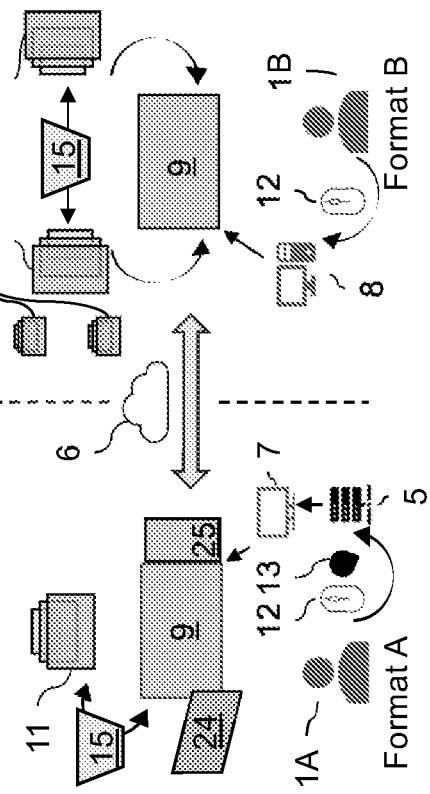

FIG. 2C depicts the use of a software application in an environment in which one or more users interact with the software generated by the embodiments in FIG. 2A or 2B. The users may interact with the same content in different ways, i.e., the content may show up on a first user 1A in a different format, Format A, or visualization compared to that for a second user 1B, Format B.

First user 1A uses a display system that produces multi-layer display images 11, hovering graphics 24, and a 2D extension 25, in addition to a central display 9. The user inputs information through any means, such as generic input 12 or sensor 13. Based on the user input, or on the functions that determine the display content, the display content in each of the multilayer display images 11 may be pushed forward or backward to the forefront of the user's viewable region via a function 15. Display 7 maybe be connected to a local source 5.

In some embodiments, multiple display systems are connected through a remote source 6, for example, the internet. A second user 1B interacts with a local source and display system 8 that shows similar content to the first user 1A. The display content for Format B may be presented using a different template than is a different user. For example, in some embodiments the visual template may consist of a first image 9 and a plurality of sets of multilayer images 11A and 11B, configured to interact with each through various functions.

For example, a user 1B may use a generic input 12 such as a mouse to scroll through a video game environment, and as the video game character moves about in the environment, different layers, each corresponding to a different depth in the environment, come closer or move farther from the user 1B. The first user 1A may be a teammate in the game and use the hovering graphic 24 as annotations about his teammates' health.

In another example, a teleconferencing call application depicts a user on one layer and various call features, whiteboarding, shared environments, or notes on other layers. The various display content and display layers interact with each other through functions. For example, a hovering graphic 24 of a user 1A may present information based on a set of images, including a video of another user 1B, in a multilayer display configuration.

FIG. 2D highlights an embodiment in which multiple users interact with display content through remote sources and local sources. In some embodiments, there is only one user, but there may be multiple users. In FIG. 2D, a first user 1A views a pair of display images in a set of multilayer images 11. A back layer of the set of multilayer images 11 might be generated by remote sources 6 and correspond to a shared visual domain, for which multiple users have access to the same display content. The input stream from a remote source might be operated on by function 15 before being displayed. A front layer maybe be generated by a local source 5 connected to a display system 7 or by a local source with display system 8. In some embodiments subsections 26 of a given layer or image are generated based on a user's input, history, or settings. In some embodiments, the sections are not contiguous. In some embodiments the subsections are individual pixels or sets of pixels. These shared visual domain could be, for example, a shared visual environment, corresponding to a common space on a back layer, and perspectives or windows into that common space generated on the front layer.

In some embodiments, the input from the users is motion tracking, SLAM input, or orientational input to dynamically change the scenes based on the users' position or orientation relative to the display system. In some embodiments, a subsection of a display image is input into function 15 that influences the back layer. In some embodiments, the division of data sourcing depends on content-dependent bandwidth, image mode analysis. The users can be active users and manipulate windows, or they can be passive users and just experience content that is decided, as might be the case in advertising use cases, wherein display content is intended to showcase a product or service.

In some embodiments of FIG. 2D, for example, multiple users can be in different environments looking at an upscaled virtual "cloud" image from different workstations and local workstations provide different windows in their display content to the cloud image as sharable viewable zones. In some embodiments, a single user can be viewing content from multiple input sources. In some embodiments, the display system comprises a main workstation that is influenced by a mobile device, tablet, or distributed network.

Figure 3A:
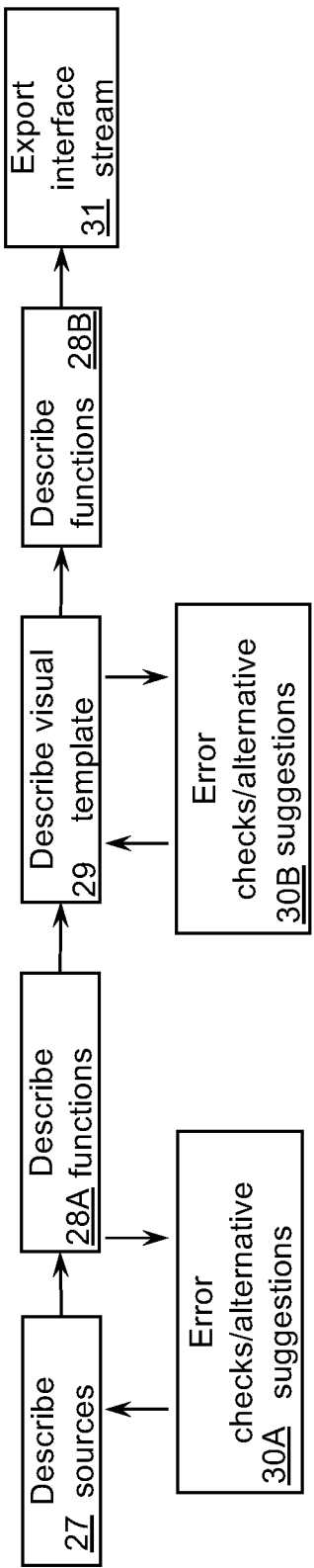
FIGS. 3A and 3B depict flow charts of a software-generating mechanism for virtual or multilayer displays.
Figure 3B:
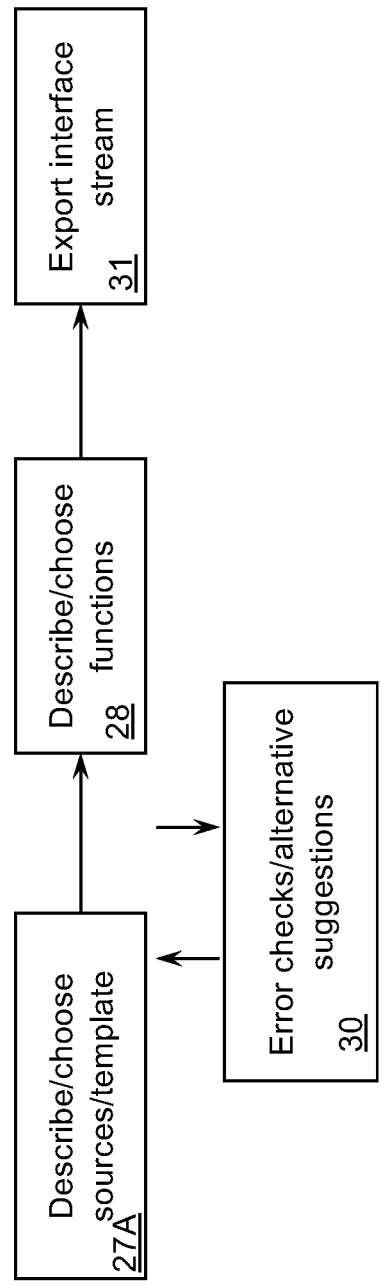

FIGS. 3A and 3B depict flowcharts for the software generation program of FIG. 2A.

The flowchart in FIG. 3A indicates at step 27 that the set of source information is first chosen or described. Then, at step 28A, the functions that act on those sources are described or chosen. In some embodiments, a function takes one or more sources as an input and produces another source as an output. Then, at step 29, the visual template is described or chosen. In some embodiments, the choice of visual template allows for further function choices at step 28B, such as the orientation of the visual template, which sources appear on which templates, and the like. In some embodiments, an error-feedback action step 30A and step 30B between the descriptions or choices checks for errors, inconsistencies, or incompatibility of choices. In some embodiments, the software generation program makes suggestions to optimize, alter, or improve the resulting software by comparing the choices of sources, functions, or template in these feedback loops. This may happen because of a prompt that is given to the software, or it may happen dynamically based on users or other sensory inputs. Finally, an export interface stream 31 is chosen by the user or the algorithm to define the form of the final interface or stream. This could be, for example, a given formatting type, compression ratio, or filename.

The flowchart in FIG. 3B represents an alternative flowchart, in which the source description and template description occur simultaneously at a step 27A, and then all the potential functions are selected in a separate function-description block at a step 28. The stream is then exported into a final export stream for an end user at step 31. Like the flowchart in FIG. 3A, in some embodiments, a feedback step 30 utilizes error-check modules to, between the choices, checks for errors, inconsistencies, or incompatibility of choices. In some embodiments, the software generation program makes suggestions to optimize, alter, or improve the resulting software by comparing the choices of sources, functions, or template.

Figure 4A:
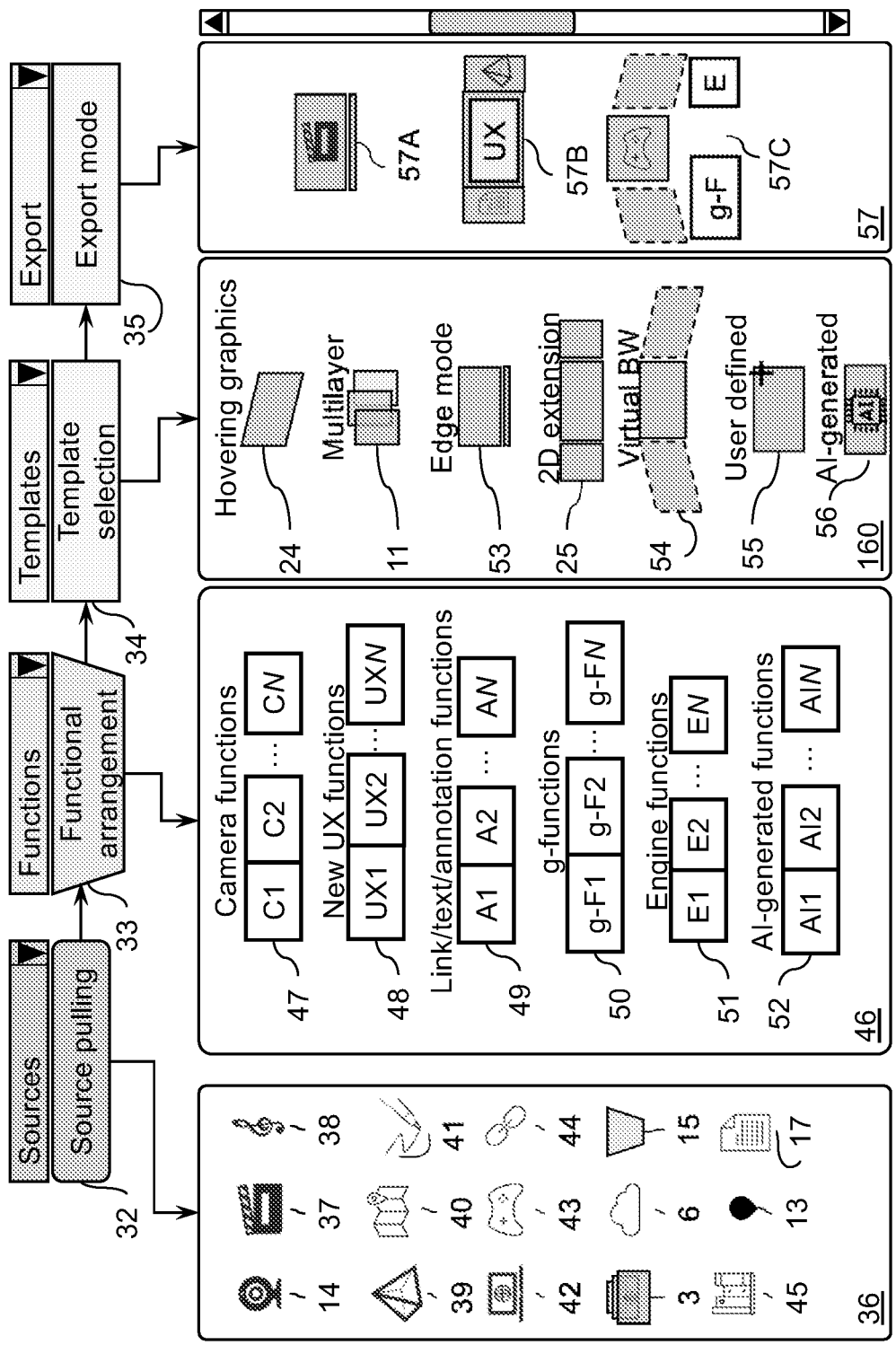
FIGS. 4A and 4B depict detailed drop-down menus of the software-generating mechanism for extended, virtual, or multilayer display systems.
Figure 4B:
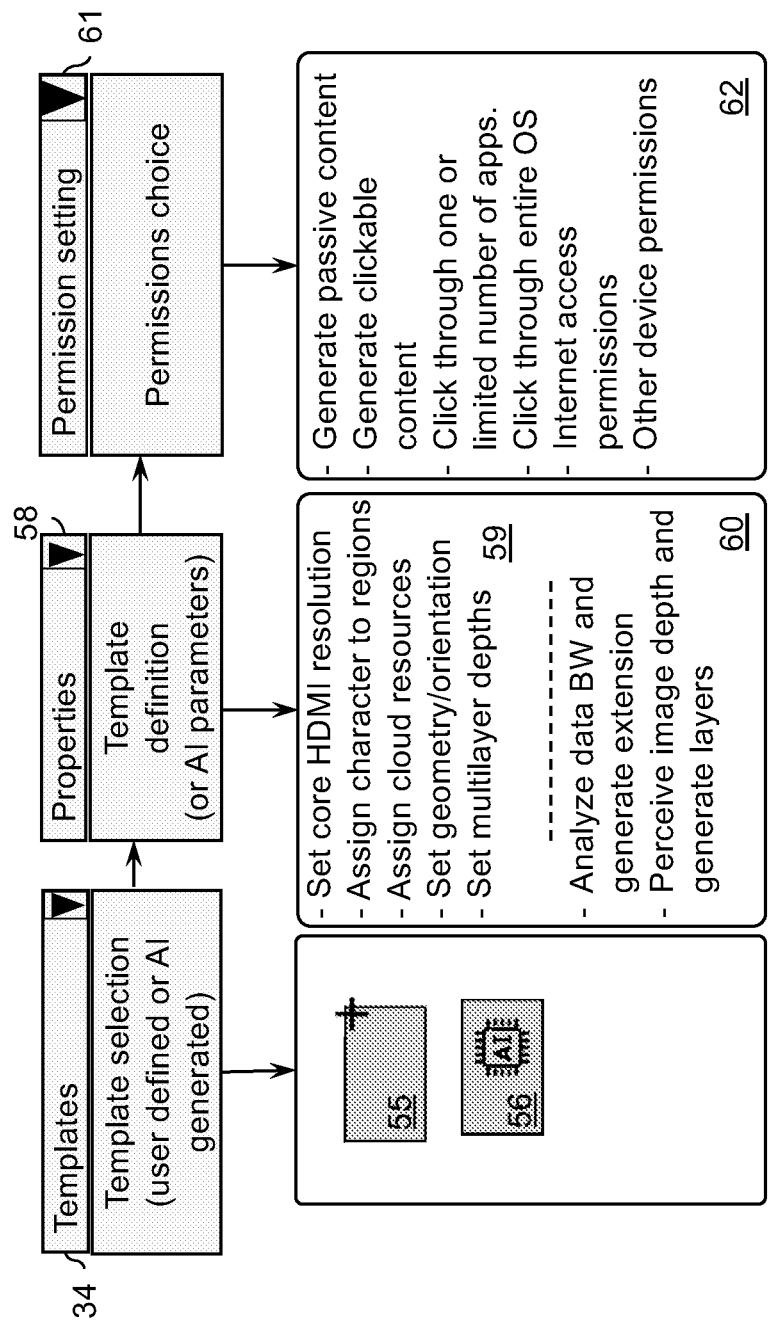

FIGS. 4A and 4B depict a pipeline at the core of the stream weaver (STW) process. This pipeline may be a series of drop-down menus in a GUI for a user to generate software applications. The GUI may be of any configuration, however, and may be configured to clearly depict information about input streams, functions, sources, and visual templates. Shown in FIG. 4A, the STW process starts with a source pulling step 32 to decide the sources from which data or input streams are retrieved. The process continues with a functional arrangement step 33, in which data and information pulled in the previous step is processed with a variety of functions. That is, in this step, functions are chosen, the inputs to the functions are chosen, and the output are chosen. The outputs may be automatically determined by the choice of function and source. The next step is template selection step 34, in which the visual template for assembling the information processed in the previous step is chosen. The last step is an export step 35 to export the information to the user or other applications.

FIG. 4A also shows example input streams, functions, visual templates, and export modes. The source set 36 includes, but is not limited to, cameras 14, videos or clips 37—the video or camera sources may be arbitrary and are not limited to, e.g., cameras capturing video of a user—music or sound recordings 38, UX environments 39, GPS or other mapping data 41 text documents 41 with or without annotations 17, websites 42, gaming applications 43, metadata or hyperlinks 44, generic data streams 3, remote sources 6 (such as cloud-based data), the output of a function 15, or a library 45, or generic sensor data 13. Functions may be individual functions, or they may be grouped into functional blocks.

The functional block set 46 includes, but is not limited to, camera-source function blocks 47, UX- or UI-source function blocks 48, Text-/annotation-source function blocks 49, generic-source function blocks 50—in which the functions may be arbitrary, or user defined—engine-source function blocks 51, and AI-generated function blocks 52. In these function blocks, the functions themselves are AI-generated based, for example, on an understanding or classification of the input stream. For example, an input stream may be a video, and an AI function first classifies the type of video as a training video or an entertainment video. Another AI function may then generate an operation based on an anticipated user's desired application.

The visual template set 160 includes, but is not limited to, templates to display information such as hovering graphics 24, multi-layer screens 11, edge mode expander mode 53, lateral 2D desktop extension 25, tandem-extended or virtual bandwidth displays 54—displays in which at least a part of the image is generated by a remote source—a user-defined template 55, and an AI-generated template 56. This template might be automatically generated based on an output of the functions in the previous step. For example, the output of a clickable training video that includes annotations may be a display with multiple hovering graphics that contain annotations and automatically shift based on the motion of the objects being annotated.

Hovering graphics 24 can show display content such that the viewer's eye accommodates to a distance closer than a distance of the physical display system. In this way, the hovering graphics appear closer to a user than the display system itself. This can be produced, for example, using phase conjugating, retroreflective, or retro-refractive (retroreflective in transmission) elements, which cause a point source of light from the display system to be focused between the user and the display system.

A multilayer image 11 shows multiple layers of display content, such that the viewer's eyes accommodate to different depths and the viewer consequently sees different display content coming into focus. This can be produced, for example, by using a field evolving cavity to circulate the light one or multiple round trips depending on the polarization of the light, including multiple display panels, or switchable elements that can modify the path length traveled.

The edge mode expander 53 and 2D extension template 25 produce virtual images that extend the FoV of the viewer. This can be achieved by starting with a plurality of display images and directing the light along paths that travel different directions before exiting the system. To form a cohesive image across the entire depth plane, the plurality of images is tiled together such the separation is less than what is visible by the human eye, for example, a separation that is smaller than what can be seen by a person with 20/20 vision, or 20/40 vision, when viewing the display content. In some embodiments, gaps may be desirable. In some embodiments, the tiling happens in multiple directions, for example, vertically and horizontally. In some embodiments, images or the data are spatially separated in an extended FoV with an arbitrary template. The tiles or spatially separated images may change their positions dynamically according to a user or sensor input or on various computational routines.

In some embodiments, the edge expander or extended FoV templates use multiple physical monitors in an extended display system. In some embodiments, they may be virtual images produced by a virtual display system.

A tandem-extended or virtual bandwidth display template 54 is a display when information about a portion of the display content is received by a remote source. The information can be the display content itself (e.g., remotely rendered display content), metadata about the display content, information about graphics settings, or data about an environment. The information can be specific to a certain application, or it can influence a plurality of applications. In some embodiments, the partition of the display content that is influenced by the remote source changes dynamically, dependent on user settings, application features, or bandwidth constraints.

The results of the export step 35 are a software application set 57 that includes, but is not limited to, new applications, which can be a predictive application, an interactive video 57A (which can be clickable), metadata, a database, a new UX 57B, a new game 57C with interactive features or dynamic game engine, and/or interactive media.

The resulting applications that are generated by the STW may be displayed on an extended display system. They may be displayed on a virtual display system.

FIG. 4B depicts a detail of the user-defined or AI-generated template options in FIG. 4A. In this process, the template dropdown menu 34 focuses on only the user-defined template 55 or the AI-generated template 56. If either of these is chosen, a new properties dropdown menu 58 appears. The user defines a new template by choosing among properties set 59.

Properties include the shape, orientation, and position of the display content; core resolution; and assignment of different sections to different sources or research. For example, in some embodiments, the user chooses the shape of the display images, and the shapes could be squares, rectangle, arbitrary quadrilaterals, triangles, circles or bubbles, or any combination. The resolution can be of any setting, such as high definition, full high definition, wide ultra-extended graphics array, quad high definition, wide quad high definition, or ultra-high definition. User defined visual templates may be combinations of the visual templates shown in FIG. 4A.

The properties dropdown menu 58 may include an AI-parameter set 60 for AI-generated templates. For example, a user may choose various AI analyses to perform on the output of the functions. A user may wish the AI-generated template first to analyze the bandwidth of the output and then generate a 2D extension whose size can display all the information. Or a user may set the AI-generated template to first perceive or estimate image depth ranges and then generate a multilayer image with depth layers that will optimize depth perception for a viewer by, for example, matching the depth layers to horopters of the human visual system.

A user-defined template may also include a permissions dropdown menu 61 to choose various permissions settings that include whether the resulting software can integrate one app, several apps, span the entire operating system of a computer, include internet access, or generate active or passive media through user interaction.

In some embodiments, the template might be a generic, dynamic 2D geometrical shape or arbitrary mask and shown in the same 2D display. For example, a display may be partitioned into a triangle to show a video, while another triangle is a camera video stream for gaming in a more attractive format. In some embodiments, when a user is reading a text file on the screen, the input from an eye tracking device may see where the user is looking and automatically may consequently dim the rest of the display content except for a highlighted area based on the location of the user's gaze. In some embodiments, the area of the gaze may be rendered in any other different way or with different properties. For example, the area of the gaze may be rendered with higher graphic fidelity, or it may track a set of tool options as the user looks around, so the toolset is more accessible to wherever the user looks in the FoV of the screen.

In some embodiments, the mask can dynamically change based on an internal algorithm or AI algorithm that has a suggestive approach and generates shapes or masks based on an analysis of the display content.

In some embodiments where there are multiple depth layers, there may be a set of tools shown on the first layer that follows a user's head and gaze location and shows to the user the most probable choice to make based on the rest of the information shown on your screen. In this case, however, the user doesn't need to move the mouse to click the button in the inherent underlying app. Instead, with the shown suggestions, an arrow key or other auxiliary key may simply be clicked to proceed; this helps reduce maneuvering a mouse-over many times.

In some embodiments, the template can be defined in a 3D environment such that the display content goes through affine translational transforms to be shown as if they are mapped or skinned to different facets of a 3D environment. For example, an advertisement is transformed into a perspective view for display in a 3D environment.

In some embodiments, the geometrical templates that are applied may change dynamically based on events or action items taken in the mainstream or auxiliary streams. For example, in a game when an event happens, such as shooting or jumping of the character, side display content may flash a certain color or show a certain image, or it may become magnified or minified.

In some embodiments, the templates include templates configured for display on multiple concurrent devices. For example, a cellphone screen or tablet screen may share a visual template with a laptop. Here, as a non-limiting example, if a game character is jumping up and down in the game, on a laptop a certain display content is shown, a second on a cell phone, and still a third on a tablet.

In another example, a user is executing financial trading transactions with a desktop screen and has chosen a cellphone or tablet screen as part of the STW-generated application. When a certain news item comes or a certain stock is updated, the related content of that stream is sent to the cellphone or tablet.

In some embodiments, the STW is used to create simulation, training, or educational applications. A user who serves as the trainer or educator may share depth layers, an auxiliary display, or part of an extended FoV to a trainee to provide training instructions that appear geometrically relevant to the training medium and material. In some embodiments, the trainer may be a chat bot or AI-based algorithm that is generating instructions by predicting user intent. In some embodiments, the AI may have permission to access the primary input stream, as opposed to only showing what the user may do. In some embodiments, the training content may be played as a video stream, step by step, in front of the user.

Training and simulation experiences may involve multiple users. For example, an instructor or trainer may be observing a user who is training on the display system. The instructor may be using his own display system, or the instructor's image may be captured by a camera and shown to the user on an extended part of the user's extended display system. The instructor may provide live feedback-based on voice, keyboard or mouse input, or sensory input—to the user, and the feedback may be presented as visual or text content as an annotation, or as changes to existing annotations, in the user's display system.

In some embodiments, multiple users may each be using a display system, but the image of a first user, captured by a camera, is shown in an extended part of a second user's display system, and vice versa, to mimic the experience of being next to each other. The respective images may be warped or unwarped to provide realistic peripheral images.

In some embodiments, the display system includes multiple display devices, such as a free-standing monitor and a headset that are communicatively coupled. For example, the free-standing monitor may display a wide-field image of a simulation or training exercise, and the user is wearing a headset that shows annotations based on the monitor's displayed content or the user's geometry or eye gaze. The communication between headset and monitor may be hardwired, e.g., through connecting cables, or wireless, e.g., through a wi-fi network or remote central source.

In some embodiments, the STW application may be configured to help edit a video, depending on permission settings and output templates. An AI program may show a user how a task is performed in a video stream that appears as part of an extended display, or the AI or the trainer takes control of the program and performs, step by step, the task at hand. At any of the steps, the trainee may interject and/or collaboratively change what the trainer is doing based on user or sensory input.

FIGS. 5A through 5J depict several examples of function blocks for various sources. These various functions are chosen by a user who is using the STW to operate on chosen input streams for eventual display organized into a visual template. The function blocks may be how the STW organizes the available functions to choose from. The final software product-which is the software-based display content that is generated by a user who is using the STW-includes general apps, videos, clickable videos, metadata, predictive apps, databases, games, and interactive media. The following embodiments describe both the function blocks of the STW and some of the resulting software applications.

In some embodiments, such as the "Media annotator with user input" in FIG. 5A, a source includes a camera source, which could be used for VR or AR applications, video see-through, teleoperations, remote controlling other devices, teleconferencing, or video content creation, and some of the possible functions appear in a camera-source function block 16A. The resulting software is used for interactive video applications. For example, the camera-source function block may comprise an annotator function 17, such that the display system produces digital content to overlay over the camera source content to highlight aspects of the video. The digital content may be positioned in the same focal plane as the camera content, or it may be located in another focal plane, as in a hovering graphic or hovering text or another layer of a multilayer template. The annotations may be pre-programmed, depending on a user profile or action, or they may be generated dynamically through an AI module. The camera-source function block may also include a comment function 63, such that the user is able to provide feedback or ask questions about the content. The user feedback may be a text-based feedback mechanism integrated with an AI module, such as a chat bot that can respond to the feedback. More generally, there may be a user-input function 12, which allows the user to provide input to the software in an arbitrary modality, including a keyboard stroke, mouse click, gesture or facial expression, or voice command. In some embodiments, the user-input function is configured to request input for specified frames of the camera source information, for use, for example, in an online quiz or training video. Another function is an avatar assistance function 23, such that the user can interact with a virtual avatar or assistant. The avatar may provide suggestions based on user content or the camera source information to guide the user during the experience. Last in this function block is a graphic function 64. The graphics include warning labels, congratulatory images for a user, or graphics to highlight features of the camera content. The graphics function may be implemented as a standard graphics function, which, for example, processes the video frames, or it may be based on the sensor input or the user input of the user. For example, the graphics function may take in the user's eye gaze and brighten the region of the display where the user is focusing.

Although specific functions in the embodiments in FIGS. 5A through 5B are associated with specific sources, those functions may be used in other embodiments. The avatar assistant 23, for example, can be used in any embodiment to assist or impact the functionality of the resulting software.

In an embodiment, the avatar assistant may be programmed to output information based on the relative importance of objects in a training video and can take in user input, such as voiced questions, and answer those based on the video content. The function may be connected to a dictionary, training data, or search engine related to the content of the video to provide extra information upon request or to provide cues to connect concepts from one part of the video to another.

In an embodiment, the graphics function may highlight an aspect on the video based on the user's progress through the video, the user's eye gaze captured from a sensor, or the user's SLAM input. For example, the video may be a training video for proper posture when performing a physical task, and the indicator function takes in as input the pose of the user and compares it with the pose of the character. The function outputs highlight in the video to show how the viewer should change his posture relative to a character in the video, by, for example, highlighting the video character's back posture or shoulder posture, in comparison with the user. A flowchart of this example is shown in FIG. 6A.

FIG. 5B shows an embodiment, an "E-commerce smart recommender/advertiser," in which the camera-source function block 16B is configured for use as a source for an online shopping platform or advertisement. For example, a multi-layer display content may include a video layer that is a commercial ad, and a second layer that comprises annotations of items based on the user's eye gaze captured by a camera. The annotations may highlight purchasable items or display further information in extended display images.

This function block may use a live video or a video recording. One of the functions includes purchase function 65, configured such that purchasable items in the video content are highlighted and may include a link to an online shopping platform. The purchasable content may be identified through an object detection algorithm and a search engine that determines salability, and the software may determine which objects to highlight based on a user input or a user profile. A flowchart of this example is shown in FIG. 6B. For example, a user who has browsed and purchased scientific equipment would see different objects highlighted than a user whose browsing history centers on home decor. The function inputs are the video frame and the user input/profile, and the output may be annotation layers with salable information, purchase options, and various alternatives. In some embodiments the details are impacted by the user's history with the display system, previous purchases, search history, or other user-unique details. Sharing function 66 allows a user to share content from the camera source with other users or potential users in a network. This function may create, for example, a quick response (QR) code for a detected object in the video, where the QR code is shared with other users, such that the QR code appears in hovering graphics for other users who watch the video. In this example, the QR code is generated based on where a user clicks with a mouse input. Another function is the comment function 63, configured such that users click on objects in the video and provide feedback-which can be user-generated text or a chosen graphic—to the creator of the video or the various vendors. The input to this function includes the annotation layers that are generated from the purchase function 65. In some embodiments, the purchase function or the feedback function takes as an input the user's body type based on a camera system connected to the display, configured, for example, to determine if a wearable item will fit properly. In these embodiments, a geometrical transform subfunction must be used to align the user's geometry with that of the salable item on the screen to create a virtual-reality image of the user wearing the item.

Similarly, inquiry function 67 allows users to gain more information about the objects in the video by viewing testimonials of previous purchases or be connected to online forums that review the product. For example, in some embodiments, the user hovers a cursor over a given object and a list about user experiences with that product is displayed in a hovering graphic or an edge-extended display.

Another function in this block is a synchronization function 68, configured such that the information about the user's navigation through the software experience in the current instance is automatically input into, for example, multiple users, the individual user's separate software accounts on various shopping platforms, or a memory bank for future user of the inquiry function 67. For example, a user may synchronize a shopping platform application that is stored on a mobile device, and the shopping cart or browsing history is input into a multilayer displayer, such that various annotations and QR codes are emphasized or de-emphasized.

In another embodiment, "Teleoperations/collaborative experience facilitator," shown in FIG. 5C, a camera-source function block 16C includes functions for various collaborative visual environments or monitoring environments, for use, for example, in online classrooms, webinars, quality control monitoring, control centers, or teleoperations. In some embodiments, the camera-source function block includes a generic sensor-integration function 13. This function allows for integration of any sensor connected on a network or other cameras—from, e.g., other users, a remote or autonomous vehicle, a security camera, or a camera observing a robotic or machining part. These inputs may be synchronized such that their content is overlayed in a multilayer display in real time. In other embodiments, the images are tiled in an extended FoV, as would be used for example, in a multi-camera vehicle navigation system, to produce a panoramic view of the vehicle's environment. Another function is an image processing function 69. This function may have separate sub-functions that manipulate the camera source, or any sensor source configured to produce visual content. For example, the inputs to this function may be the video itself and the sensory input, and the image process function is programmed to output brighter pixel regions or display content where the viewer needs to focus attention, based on a user-defined monitoring task.

Further, a whiteboarding function 70 allows a user to share a separate application or merge a separate application with the camera source, as in, for example, an online lesson for an online course. The shared content may be a conventional sharing mechanism, or it may be a dynamic mechanism, where the content is translated dynamically to adjust to the viewer's needs. For example, the input to the whiteboarding function may be a dataset of flight trajectories, and the function is configured to plot those data into visual trajectories that are overlaid on a multi-layer flight simulator.

For example, an extended display system may include one region where multiple users can interact with each other through virtual images of themselves captured by cameras. The region is produced by the whiteboarding function 70. A second region, which may be a second layer in a multilayer display or an extended field of view, may be a virtual whiteboard space, which is manipulated by users through eye gaze or gesture sensing. For example, the sensor integration function 13 may take as input a gesture captured a gesture sensor or camera system and then determine an action to display on the virtual whiteboard space, such as a handwriting text. This example is further described in FIG. 6C.

For displays in which the content includes an image of the user or the user's body part, a projection mapping or geometric transformation may be a type of image processing function to be used to impact the display image. The geometric distortion may include removing distortion of the optical system. Generally, geometric distortion may be removed or compensated in an arbitrary way. For example, polynomial distortion algorithms may be used to remove lens or fisheye distortion. Camera calibration may also be used to remove distortion from a camera.

Image processing functions 69 also include brightness adjustment, foveated viewing, edge enhancement, blurring features, video or image filters, background blurring, computational remapping, and the like. This function may operate on an entire source, or it may operate on a partition of the source, determined by a user, or based on sensor inputs. The function may require other routines to assist in the image processing. In an autonomous or teleoperated vehicle, a panoramic view is displayed, and one of these image processing functions is configured to identify an object, estimate its speed, and then highlight it if its speed crosses a threshold value. Another function is an AI module 18, which is configured to analyze all the visual content together and suggest generative ways to act on those contents.

Further, an audio function 71 for modifying sounds, music, and other audio effects. The audio source can be a microphone connected to the display system, or it can be a remote source. The function can also be configured to output audio through any speaker or other audio transducer. For example, an audio signal may be configured, through holographic or beamforming methods, to sound as if it comes from a first layer or a second layer in a multilayer display, such that when a user hears a sound, the user recognizes a distance associated with the source. This could be, for instance, audio effects related to a whiteboard space or speech sounds made by multiple users in a virtual classroom. The beamforming is produced by using an array of speakers, each emitting individual sound waves, such that the sum sound waves produce a wavefront that approximates a sound source from a desired depth. The individual sound waves are determined by an optimization algorithm that outputs the relative phases of the individual sound waves based on how accurate the approximation is.

FIG. 5D shows an embodiment, "Multi-source/-content generator and merger," of a camera-source function block 16D, wherein the camera source is a generic image source. The functional blocks include image processing functions 69 and an annotation layer function 17, such that various descriptions or visualizations of the camera content can be overlayed or displayed near the camera content. The embodiments also have a merge function 72, which allows a user to combine other video or camera sources with the original content. For example, this function block may be used in an embodiment involving teleoperations or research methods, wherein a camera or photodetector is recording optical information about a setup, and other sensors are monitoring the equipment used, such that the merge function combines the sensor data overlayed with the camera. The merge function may first be analyzed automatically through a user-selected or user-defined function, and side windows of an extended display show alternative results that might have occurred with the equipment settings shifted by incremental amounts. The alternative results may be calculated through numerical simulation of the underlying physical laws, or through a deep learning algorithm.

In some embodiments, the merging function might be based on an AI neural network that compares data for various correlations and trends. In this example, the original images may be merged with AI-generated image content based on user specifications that may include touch-up features, automatic encryption of visual data, or content generation for video media.

In an embodiment, the video may be a live feed of a workplace, such as a construction site or warehouse, for monitoring personnel. In this example, a central display may show the live feed, and extended display images may show snapshots or frames of the live feed. In this case, the merge function 72 is programmed to merge the historical frames of the video with the live frame in an extended display. A subroutine in the merge function may first analyze the frames to identify important or correlated personnel actions, such as incorrect procedural actions, productivity levels, or interaction with coworkers. This subroutine may use a CNN to detect similar objects or poses. Another subroutine may add annotations for the user to focus on when these frames are displayed. For example, the output of the CNN detects and displays all the frames in which personnel in a warehouse are lifting a heavy box and identifies the frames in which too few people are present, adding an annotation warning to the user to intervene. This embodiment is described further in FIG. 6D.

In some embodiments, the video source is used in a video editing environment. In some embodiments, the merged content is not visual content but some other type of information to generally impact or enhance the camera content. The merging function may depend on the specific layer in a multilayer display or a subsection of a layer of interest. An audio function 71 allows a user to edit, add, or emit audio signals. Finally, upload function 73 allows the user to send the content or a portion of the content to another device or network. The upload function may also include its own merge or synchronize subroutine that collects the content from multiple users or adds the content in a database or a training library for machine-learning algorithms.

Another embodiment is shown in FIG. 5E, "Benchmark and logic analyzer," where the source is a text-based source, and the set of functions is a text-source function block 16E. The text source may be a document, a spreadsheet, an online address book, a journal or publication, an e-book, computer code, or a presentation. The function block includes a merging function 72, such that multiple text sources can be merged. For example, a user may wish to combine two versions of computer code. This function may be configured with several options. The first option is to update an existing line of code with updated code written in a separate file. A second option is to compare two versions of a computer code and produce an updated version that is optimized based on the two inputs. In some embodiments, the user's original code may be automatically compiled, executed, and benchmarked, and a set of adjustments or alternative algorithms are proposed in different display content, arranged in such a way that a user can compare the various performances. This example is discussed further in FIG. 6E. An annotation function 17 can add descriptive, graphical, or other visualizations on the original text in a hovering graphic or multilayer display. In some embodiments, the text or annotations can be made to depend on events or to be anchored by an object, for example, through clicking a QR code. In some embodiments, SLAM input or eye gaze input influence annotations. In some embodiments, the annotate function might involve a subroutine that is configured to read the text for tone, consistency, logical soundness, or emotion, annotate locations in the text that need revising, or to suggest alternative paragraphs or images in extended display images.

Another function in this block is a logical analyzer function 74, which is produced by logical programming, for example by mapping axiomatic statements to programming commands. The user may specify the method of proof and set the function to prove by induction, prove by contradiction, or another suitable method of proof. Alternately, the function may use an AI generative approach and collect various proofs and theorems available online to generate new proofs. This function parses the text or code into statements whose truth value is analyzed based on the structure of the document. The output of the logical analyzer function 74 may be a classifier that ranks the strength of a verbal argument, or it may point out logical flaws. In some embodiments, the output may include suggestions to correct any logical errors. The logic may be formal verbal logic, based on Aristotelian logic rules, or it may be formalized as mathematical logic, as would be used, for example, in axiomatic set theory or geometric proofs.

User-input function 12 allows the user to interact with the text using, for example, gestures. In some embodiments, the input is the same as in the source, for example, typing new next in an existing document. The user input could also be new methods or modes of input, such as a speech-to-text function, or a speech-to-computation function. Last in this embodiment is a comment function 63, which allows users to annotate or view the document's metadata or other properties without directly editing or modifying the text.

FIG. 5F shows an embodiment of a user-defined source function block 16F, configured as a method of designing a software engine, i.e., this embodiment is a "Software engine/data assembler." The source that this function block acts on may be an arbitrary data type. For example, it may be a database, a point cloud, a look-up table or dictionary, online repositories, the internet, or libraries of code blocks. The type of engine that is generated is arbitrary. In may be a database engine, graphics engine, physics engine, search engine, plotting engine, web browsing engine, or game engine. The STW may have multiple functional blocks to create multiple engines. The engines can assist in content processing, scene understanding, or image processing. In some embodiments, the engine is a recommendation engine, configured as a real-time engine, or an app-specific recommendation engine.

In this function block, a library function 45 may be used to sort through various engine libraries or to design or implement new libraries. In some embodiments, the library may have at its input a user query or desired task, and the library is generated based on an AI-module. For example, a user may input the library function, "Provide all subroutines for graphing three-dimensional data," and the library function either searches the source data or generates data itself to output methods of graphical display of data. Or the library function may take in the input data and identify libraries based on the structure or size of the input data. For example, the input data may correspond to a genome sequence or a set of proteins, and the library function is an AI-based function that first identifies the data as a genome sequence or set of proteins, searches the internet for all such similar datasets, and builds a library of the datasets in the same format as the input data.

A graphics function 39 may allow customized graphics settings, such as resolution, frame rate, or intensity variation, for use in visual applications, physics-based graphics renderings or engines. In some embodiments the graphics function may have subfunctions that implement various physical or dynamical laws to render graphics. The input data for this function may be a point cloud used for a video game or scientific images for research purposes. This function may also be a subroutine for a more specific game-engine function block.

UI/UX function 75 acts on the sources and displays them in a way that is useful or appealing. For example, the UI/UX function 75 may include subfunctions that (1) take in numerical data and classifies the data set based on an AI-module, (2) optimize a best mode of presentation based on the classification and the data size, and (3) arrange in graphically and generate annotations/labels for user interaction. This embodiment is further described in FIG. 6F. Another subfunction includes a predictive function—which can be a probabilistic function, a time-dependent function, or a neural network or other deep learning function—wherein the function takes as input both the sources as well as the history of user inputs and produces new graphics that suggest possible future actions of the user. For example, an AI-based UI/UX function may classify the data as weather data in a region over a certain period, and a toolbar is generated that allows a user to average the data, extrapolate the data into the future, or search the internet for data from different time intervals.

In some embodiments, for example, the desired engine is a database engine, and the display panel is configured as a multilayer display, where the depth layers correspond to another dimension of the data to produce, e.g., a three-dimensional database, which can be used to manipulate volumetric information, such as a point cloud of an image. The UX function takes in the data from the database and analyzes the structure of the data, possibly comparing it against a library of datatypes, to present it in a visually appealing manner, such as an infographic or multi-dimensional graph.

Code-block 76 allows users of the generated engine to produce new code to modify or enhance the engine. Neural network function 77 allows the engine to incorporate a neural network for any application. For example, in a game engine, a CNN may be used to detect objects in a scene captured by a video camera and incorporate them into the video game environment. In some embodiments, an API function additionally allows a user to configure the source information to interact with local hardware or hardware distributed on a network. For example, the data may be pulled in real time from a set of camera images or from usage details of an appliance or machine.

In the embodiment shown in FIG. 5G, "Game and world warping engines," the source is an existing game or game engine, and the function block is a game-function block 16G. The functional block includes graphics functions (such as resolution effects or enhancement) 39, audio functions 38, a comment function 63 to add comments (e.g., in a multi-player game), a computational remapping function 78 for 3D remapping effects and mesh creation, and a geometric transformation function 19 for various warping effects of game characters or graphics within a game. In some embodiments, an annotation function is included.

In some embodiments, the existing game is a first-person perspective game, and different items in the scene are shown at different depths on a multilayer display. In some embodiments, one of the layers may be an annotation layer to provide hints based on the user's eye gaze or character motions. In another embodiment, a user may be playing a game where the character is an image of the user captured by a camera system, and a geometrical transformation is used with the geometric transformation function 19 to dynamically optimize the character's shape and size in the game. In some embodiments, the game is a beta version of a game, and an AI component suggests different viewpoints or interactions inside windows of an extended delay as the user evaluates the game. This example is described further in FIG. 6G.

In some embodiments, as shown in FIG. 5H, "Dynamic UI creator," a UI function block 16H has for its source an arbitrary UI. A UI can be a website landing page with certain features, buttons, links, icons, visual elements, or audio elements. The UI-functional block includes graphics functions 39 and the ability to set various graphics qualities, to accept user input through an input function 12, to detect or upload information local or remote sources through an upload function 73, or to receive instructions through a download function 80. In some embodiments a user-defined function 20 allows a user to manipulate the input source(s) arbitrarily. The user-defined function can be an image processing subfunction block; a terminal window for writing, compiling, and executing code; or any function described in this disclosure. For example, in some embodiments this function block is used for website testing, and the user is testing a website with various input requests, such as check-boxes or radio buttons. As the user navigates the website, the eye gaze and interactions are recorded and then by an annotation overlay, and parts that are not used are high-lighted or made brighter, such that the designer can have graphical feedback about the website. Or the website features may dynamically adjust based on the historical usage of the tester. This example embodiment is described in FIG. 6H.

In FIG. 5I, the embodiment "Media feature recognizer and annotator" shown has display content as its source; this may include generic display content that is output from a previous functional block. For example, the input here may be a clickable training video after it is operated on by the functions in FIG. 5A. The composite function block 16I includes a detection function 81 to detect features in a source image. The feature detection may be low-level (e.g., edge detection), mid-level (e.g., gaze or face tracking), or high-level (emotional detection of display content involving people). In some embodiments, the detection is object detection, or it may be feature detection that is related to environment and not the user. Another function is a user-defined function 94, which is an arbitrary function determined by a user. In some embodiments, a user-defined function 20 is included and may be a mathematical operator. In some embodiments, this function inputs the source to other pre-selected functions or machine learning pipelines (as either training data or input data or encoding data). Further functions include an annotation function 17 for adding annotations and annotation layers to the source, a code-block function 76 for generating and compiling custom code to act on the source, and an image processing function 69 for processing source images or video with existing image processing functions.

The code-block function 76 may be assisted by generative AI, such that code blocks are automatically generated and merged with the source data based on training data. In some embodiments, the code block function may display a terminal in a side window or side display, and the user can modify or impact the AI-generated code in real time through feedback.

For example, in a remote exploration of an environment or a search-and-rescue operation, a camera may capture an image for display for the user to investigate a scene. A primary display layer shows the scene, and a second layer in a multilayer display highlight is programmed by a user-defined function to detect people or faces. Further, a subroutine of the user-defined function or parallel function allows for higher-level scene understands quantifies the level of danger that a person is in for a rescue team to prioritize rescue. In some embodiments, the video is a training video based on a simulation, and the user is asked to decide danger levels and rescue tactics. This example is discussed further in FIG. 6I.

In some embodiments, various ML/AI engines are separate functions to operate on the input. For example, in a clickable training video, a user may be asked to select a component of an image based on various other data within the display content. The AI engine predicts possible outcomes based on the possible selections or based on the eye gaze of a user. The difficulty, time response, and future unfolding of the training can adjust dynamically based on the user actions and the AI training.

In FIG. 5J, "Visual environment/UX immerser," the input source can be a source configured for generation of visual environments. Such visual environments may be for immersive teleconferencing, or online classroom, such that a virtual immersion function block 16J is used. Teleconferencing is an example of a collaborative software application. This function block may also be used for some of the embodiments described in FIG. 5C. The function block here includes a whiteboard function 70 to share a virtual whiteboard space, which can be overlaid onto other video sources using a multilayer function 82, configured, for example, to make see-through modifications in multilayer applications or to optimize 2D or 3D content for display on a multilayer display. This function may take in visual content and optimize the virtual depths to present the data. The optimization minimizes the focal depth information compared to the depth perception of a human viewer.

Further, an annotation function 17 overlays annotations, a geometric transformation function 19 adjusts various captured images and map them into a visual environment, and an image processing function 69 performs image processing on the various layers of the display content. For example, one of the image processing functions may be a distortion-compensation function, programmed for executing geometric transformation on the images of a user to compensation for barrel or pincushion distortion, for depth remapping, or for automatic scene blurring/deblurring. In another example, a shared whiteboard space may be projected onto a first focal plane, and users projected onto a second focal plane to create a realistic virtual classroom. The geometric transformation function 19 automatically resizes objects based on which focal plane the content is in and based on the physical position of users relative to a webcam.

In some embodiments, the webcam may be part of a camera system video that captures the environment, such that the captured content is displayed on the display system as part of a visual environment, such as a virtual classroom or workspace. An object detection function may recognize and segment important objects in the scene, such as a physical object or a physical whiteboard, which are merged into the visual environment. The image processing function 69 and geometric transformation function 19 may act on the environment scene and geometrically warp objects in the scene to overlay into the visual environment. Based on an eye gaze detected by another camera pointing at a user, the display system may use a neural radiance field (NeRF) to adjust the viewpoint of the see-through components in the visual environment. This example is described further in FIG. 6J.

As another example, a whiteboarding function 70 allows a user to share a separate application or merge a separate application with a camera source, as in, for example, an online lesson for an online course. The shared content may be a conventional sharing mechanism, or it may be a dynamic mechanism, where the content is translated dynamically to adjust to the viewer's needs. For example, the input to the whiteboarding function may be a dataset of flight trajectories, and the function is configured to plot those data into visual trajectories that are overlaid on a multi-layer flight simulator.

Although certain input sources were described in these embodiments, any digital content could be input as a source. In some embodiments, sources include other existing apps, existing websites, groups of websites. For example, an input to the Virtual environment/UX immerser function block 16J may be a teleconferencing call from an existing commercial software. Another example is that the Game and world warping engine's function block 16G, or the Software engine/data assembler function block 16F may take as input an existing game engine environment.

FIGS. 6A through 6J each depict a flowchart for the example embodiments of FIGS. 5A through 5J.

FIG. 6A depicts a flowchart 601 corresponding to the function block of FIG. 5A, configured to produce an interactive training video. The user's SLAM data are input at step 83 into a pose estimation function 15A, which may have a dictionary 86 of poses also as an input. The output is a classification of the user's pose. The software determines at step 84 whether the user pose sufficiently matches the character pose. If it does, then at step 85A the system outputs a first display content that shows the training video as complete, or letting it continue. If not, at step 87 the difference is calculated in a calculation block, and at step 85B a second display content is output showing a highlighted portion of the video for the user to correct himself. The pose estimator may be produced by a feedforward neural network, and the difference between user and character may be calculated by using an encoder to classify the poses in a vector space and calculating the difference between them.

FIG. 6B depicts a flowchart 602 for an interactive video, as described in FIG. 5B. In this flowchart, the user's eye gaze is an input 83 into an estimate view focus function 15B to estimate view focus. The output is the gaze location on the display system. The software then makes a decision at step 84. If the object of focus is salable, then extra information about the object as a first display content 85A. If not, then the display shows a second display content 85B, which maintains the same video until the gaze changes.

FIG. 6C depicts a flowchart 603 highlighting the application from FIG. 5C. User gestures are a first input 83A into a gesture estimation function 15C1, which outputs the identified gestures to a first calculation block 87A that that may show displayable gestures. In parallel, a camera system inputs captured images as a second input 83B into a geometry estimation function 15C2, which outputs the information to a second calculation block 87B that may combine the outputs of the two functions into a display content 86 comprising displayable gestures. The estimated geometry and displayable gestures are combined to transform or warp the gesture before being displayed.

FIG. 6D depicts a flowchart 604 the scene analysis example or action reporter of FIG. 5D. A real-time video is an input 83 into the scene understanding analysis function 15D. The function compares frames of the video and correlates them. The correlation may be feature-based. The output identifies in a calculation block 87 which frames are related to a specified activity that the user may determine beforehand. The output is displayed as a display content 85 consisting of a set of frames along with the original real-time video. The scene understanding analysis may be complete through a CNN or region-based CNN (R-CNN), or through a tree search.

FIG. 6E depicts a flowchart 605 for the example embodiments discussed in FIG. 5E. User code is an input 83 to a first calculation block 87A that compiles the code and inputs the result a merge function 15E. The compiled code is also analyzed independently for functionality or benchmark test in a second calculate block 87B, the results of which are also input into the merge function 15E. The merge function compares the user code and benchmarks with existing code blocks, which may be saved in a library, or it may use an AI module to generate new code using generative pre-trained transformers. One more new code is then output as a merged code, which is then analyzed for functionality in a third calculation block 87C. The resulting merged code and analysis is displayed as display content 85 along with the original code, for a user to compare.

FIG. 6F depicts a flowchart 606 describing the functionality of the embodiment from FIG. 5F. A database is input 83 into a UX analysis function 15F, which may have a dictionary 86 that is a datatype library. The datatype library may contain information about various forms of data, file formats, and applications, as well as a best mode of presentation. The UX analysis outputs to a calculation block 87 a suggested visualization of the database data, which is then displayed as display content 85 on the display system.

FIG. 6G depicts a flowchart 607 related to the embodiment described in FIG. 5G, configured for a game engine or testing. The user inputs information or the user's eye gaze as input 83 into an AI content generator function 15G. The AI content generator may have a game engine dictionary 86 that includes information about game styles, genres, characters, or game environments. The AI content generator outputs new gaming modes or graphics to a calculate block 87, which is then displayed visually on the display system as display content 85.

FIG. 6H depicts a flowchart 608 for the embodiment in FIG. 5H, configured for use as a website testing software. A user input 83 is input into a track feature usage function 15H1, which automatically updates the website features based on the historical usage and displays the result of its calculation block 87 in an extended display as a first display content 85A. For example, this function may simply track the location of the cursor coordinates as a time sequence and then identify the locations where the cursor spends the most time. The updated feature website may be a feature from a set of features which is then placed at the most probable cursor locations. The extended display content of the modified website may be next to the original website for a user to compare the changes. The output of the tracking function may also be input into an AI function 15H2 that suggests modifications, which are displayed as a second display content 85B as an annotation layer over the original website display.

Figure 6I:
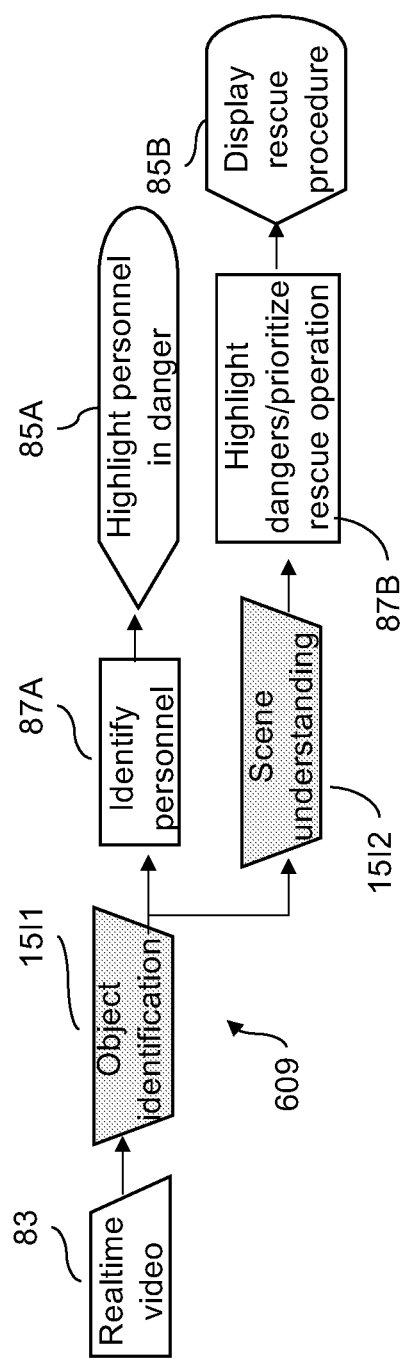

FIG. 6I depicts a flowchart 609 for the example embodiment of FIG. 5I for search and rescue operations. Realtime video is input 83 into an object identification function 15I1. This function may be a CNN or R-CNN. The output of the function identifies personnel in danger in a first calculation block 87A and displays that information on the display system as a first display content 85A. The method of display could be, for example, brightening the images of the personnel or annotating their positions. The output of the object identification function is input into a scene understanding function 15I2, which analyzes the scene for specific dangers, for example, where a fire or electrical hazard may be most dangerous. The output is the identification of those hazards in a second calculation block 87B, which is then displayed on the display system as a second display content 85B. The output could include a procedure or ordering of which personnel to rescue.

Figure 6J:
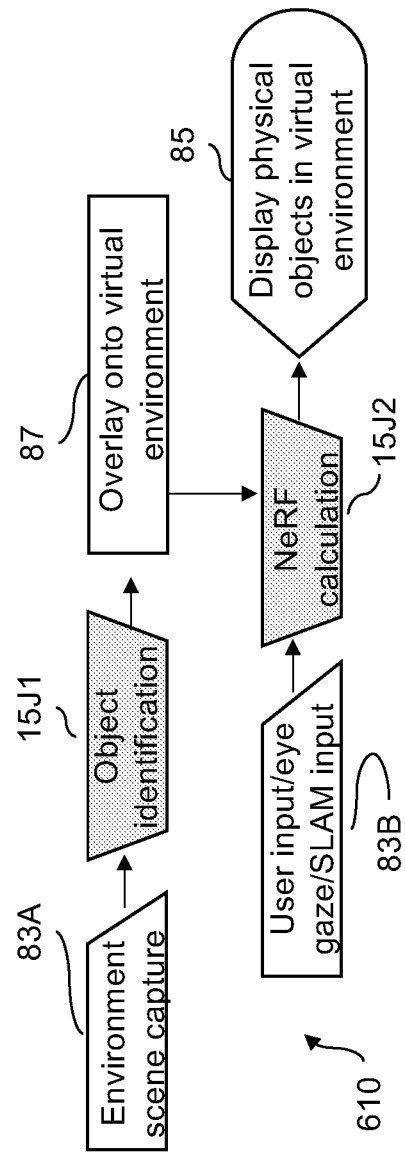

FIG. 6J depicts a flowchart 610 for the example embodiment of FIG. 5J of teleconferencing or ARVR applications. A camera system captures the environment, which may include the user. That information is input as a first input 83A into the object identification function 15J1, which identifies important or relevant objects in the environment. (It may be a different object identification function compared to that in FIG. 6I in that it uses a CNN with a different set of weights.) The identification may be related to a dictionary or look-up table, or the important objects may be specified ahead of time. The output is an overlay of the images of the environment into a visual environment, as shown in a calculation block 87. A user's input, eye gaze, or SLAM data may be input as second input with the virtual environment input 83B into a NeRF function 15J2, which may be implemented as a fully connected deep neural network, and which computes different perspectives of the visual environment. The result is then displayed as display content 85 on the display system.

FIGS. 7A through 7G describe different embodiments of FIG. 2B, which depict various software applications that use predictive features to assist or influence the user experience. In some embodiments, the software applications described presently are created using the methods of FIG. 2A and FIGS. 5A through 5J, as well as the STW interface discussed in FIGS. 4A and 4B.

Figure 7A:
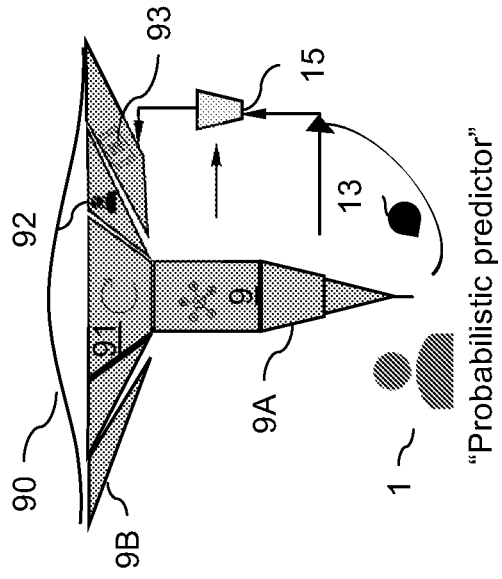

FIG. 7A describes an embodiment, a generic "Funnel expander," in which past actions and events are processed along with user inputs to generate predictions of different future actions and possibilities. In this embodiment, a user 1 is viewing a central display image 9, which further comprises a past-content display image 9A, which depicts content or information about past usage, and a future-content display image 9B, which depicts content or information about future usage. The user may be viewing content through a local source paired with a display system 8. Generic functions 15A, 15B, as well as an AI module 18 may take past and present content as input, as well as user input 12, to generate an expanded visualization of future action possibilities 89. An infographic 22 may display the past content in a useful way.

The inputs to the functions can be present uses and past uses of any duration. In some embodiments, the functions are recommendation engines, wherein a user or a user's history or profile determine the settings actions. Other functions are probabilistic or time dependent. Functions that include neural networks take as input user input into the system or sensor input. The history of past actions is shown as an infographic in some embodiments. In some embodiments the infographic is an expandable tree graph where each branch is an aggregate of a set of common actions taken by the user. The trunk of the tree graph indicates the time stamps of those sets of actions, and the extent of each branch may correlate with the amount of time that is spent on each action type.

In an embodiment that uses time delays as functions, a user is using a database, performing data entry, or analyzing numerical results of a simulation. The primary display content is a spreadsheet into which the user is entering data. The most recent activity is the most recent data entered, so the primary predicted activity, shown in a second layer or extended FoV adjacent to the primary image, is continued data entry. The software may predict what data to enter, or it may show extended regions of the database or spreadsheet. The second most recent activity was opening a document, so software predicts on a secondary display layer an indication to save the database or spreadsheet, anticipating opening a new document or closing the current one. The oldest action was using a different application for generating the data, for example a simulation. The third predicted action would be to re-run the simulation to modify the parameters.

Figure 7B:
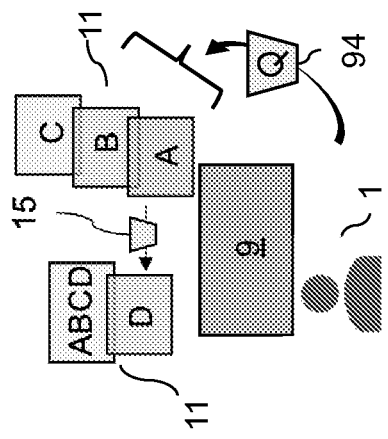

FIG. 7B describes a "Probabilistic predictor" embodiment in which the predictions on different actions and possibilities are displayed according to a weighted time decay or probabilistic factor. In the embodiment, a user is viewing a display image 9, which further comprises past-content display content 9A and future-content display content 9B. The past and present usage is input into a function 15 that uses, e.g., a probability distribution 93 for calculating most likely next actions and displays them accordingly. The most probable future action 91 is displayed centrally and most prominently in the most prominent extended part of the display content. A medium-likely future action 92 is displayed with less prominence in the extended part of the display content of medium prominence, and a least likely future action 93 is displayed least prominently most remotely. In some embodiments, the display content is shown as a multilayer display or hovering graphics, in which the most probable content is brightest or closes to the user.

A user can input information directly through input devices or sensors 13, the data from which might rearrange the actions or change the actions dynamically. In some embodiments, sensors capture information about a user or an environment and relay that information into the display system to assist in predictive capabilities.

The probabilistic method may be formulated as follows. Encode all user actions into a vector space x. This can be for a specific application, or it can be for a set of applications. In some embodiments the non-zero vectors are sparse in the basis, so that new actions can be added. Next, define a probability density function. In some embodiments, it would be a bell curve (Gaussian function), a Lorentzian, or a Cauchy function. These functions can be discretized for discrete sets of actions. In some embodiments, the probability density function is defined by certain constraints, such as maintaining a certain standard deviation, skew, kurtosis, or a set of moments or central moments. Or, instead, a characteristic function, moment generative function, cumulative function is given. In some embodiments, the probability characteristics are defined by the correlations of the various actions x, belonging to the vector space x or by the relative frequencies of the user actions during a period when the system is being calibrated.

In some embodiments, the sequence of actions be stationary in some sense, for example wide sense stationary, strictly stationary, or stationary in increments. In some embodiments, the system is not stationary and depends, for example, on the time of day or other external factors.

A second set of actions is encoded into a second vector space y. In some embodiments, there are more than two sets of actions, for example, 3 or 4 or 9. If a user is using the display system for a particular action $x_i$, the software calculates all the conditional probabilities $$p_{ij}=P(y_j|x_i),$$

for each potential action $y_j$. The conditional probability $P(A|B)$ for two events A and B is the probability that A will occur with the condition or constraint that B has occurred. In is possible to consider the conditional probability as the ratio of the probability P(A and B) of both A and B occurring to the probability P(B) of B occurring:

$$P(A|B)=P(A \text{ and } B)/P(B).$$

The value $p_{ij}$ above determines the action with the maximum probability, the second maximum, or some other metric. The display system then displays those potential actions on the set of secondary virtual displays or display layers. In some embodiments, the method of predicting user actions uses exceedance forecasting, time series analysis or other series analysis.

In some embodiments, as shown in FIG. 7B, a user 1 is interacting with a social media platform. Central display 9 shows a landing page. Based on the user's history, and multiple users' histories with the display system or the application itself, the probabilistic function determines that the user will most likely scroll through a series of updates. The most probable future action 91 is shown centrally and most prominently in the most prominent extended part of the display content. This content may consequently show an extended update or scroll feed. In the next windows, a medium-likely future action 92 is displayed with less prominence in the extended part of the display content of medium prominence Finally, least likely future action 93 is displayed least prominently most remotely. This content may involve clicking on a marketing campaign. As the user interacts with the social media platform, the probability distributions are updated, the display content is rearranged. Various sensors 13 may capture information about the user. The user may bring any suggested content into the window using any input means. In some embodiments, the predicted actions correspond to switching to a different application.

The predictive algorithm uses the data about various possible user actions and events includes metadata about the productivity, success/failure, user satisfaction. For example, it is most probable for a user who first starts navigating a social media site to click on advertisements and purchase items, and the second most probable event is to respond to messages. Let $x_1$ be the navigation to the social media site, let $y_1$ be the clicking of ads, and let $y_2$ be the event responding to messages, such that $p_{11}=0.8$ and $p_{21}=0.5$. In this scenario, the central secondary display would display content about ads, and the second secondary display would display content about responding to messages. However, the metadata about $y_{11}$ indicates that clicking on ads has led to overdraft fees in a budget monitoring app. So, the display system might reduce the value of $p_{11}$ to less than 0.5, for example, 0.4. Or the display system might include in the display content a warning message.

Figure 7C:
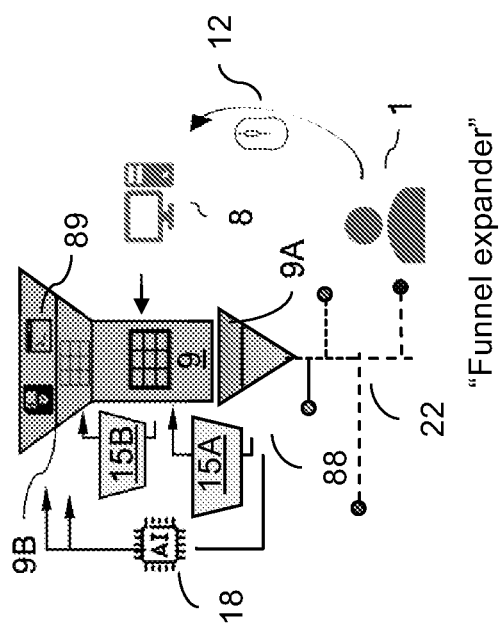

FIG. 7C describes an embodiment, a "Dynamic prioritizer," in which the different options and possibilities are displayed in different layers based on a priority criterion P1, P2, P3 based on user focus, time of day, productivity style, metadata, or environments factors. Content deemed with the highest priority (P1) is displayed in a center main screen 9 for viewing by a user 1, whereas second priority content (P2) is automatically pulled up on a FoV 2D extension 25 as reminders. Some of the priorities may be organized in a multilayer display 11, with the highest priorities close to the user. A suggestion that a user normally does is shown as a third priority (P3) for example as an edge display 53. The distance of the content with respect to the center display is an indication of the priority and/or importance of the content. In some embodiments, this is time-dependent and depends on user history. In some embodiments, sensors 13 capture information about a user 1 or an environment and relay that information into the display system to assist in predictive capabilities. A user has the ability to ignore certain priorities, indicate reminders, or perform the recommended task by inputting information directly into a controlling function. A priority-based embodiment may be generated by identifying or comparing items that are listed on a calendar or digital list. Or, if the embodiment includes user input and time of day, the embodiment may keep track, for example, of the duration a task takes at different times of day under different user conditions and suggest a task at a time when it was historically completed the fastest.

In some embodiments, the display system content is configured for productivity. The user 1 is interacting with the display system at a certain time of day, and the main priority action, displayed on the central display 9, is answering emails. Based on the time of day, the software senses that a second action P2 is high priority because of the user's productivity levels with that second action at that time. In some embodiments, the next priority P2 is based on deadlines enumerated in a calendar and is displayed as an FoV 2D extension 25. A third priority P3 is to monitor personal finances such as bills, investment accounts, taxes, which all show up as a potential action on an edge display 53. In some embodiments a priority P3 is a secondary layer in a multilayer display 11, such that a user can be reminded of it without having to focus his eyes on it directly, i.e., to be able to keep it in a peripheral location.

In some embodiments, the different priorities may all be related to a single task. For example, the central priority my involving making important financial trades; the second priority might monitor cash flow for consequences of those trades, such that a software program suggests modifications or other trades; and a third priority might display a set of long-term financial goals, such as savings growth for a down payment to a home, retirement activities, or travel plans.

The display system may also arrange tangential activities in different dimensions. For example, the financial-related priorities may all be displayed in lateral extensions. A display image involving mortgage payments for a home might also have several depth layers with annotations about home renovations, repairs that are needed, or important weather warnings. The arrangement may change dynamically based on user input or sensory data.

In some embodiments the priorities P1, P2, . . . are recommendations based on a recommendation engine that takes as input the user profile and outputs various recommended activities. The recommended actions may be within a single software application (e.g., displaying all the possible digital library books that are related to a user's reading history), or they may span multiple apps (e.g., based on a user's history of using a chat feature in a specific social media app, the engine recommends multiple chat streams across different social media platforms).

Figure 7D:
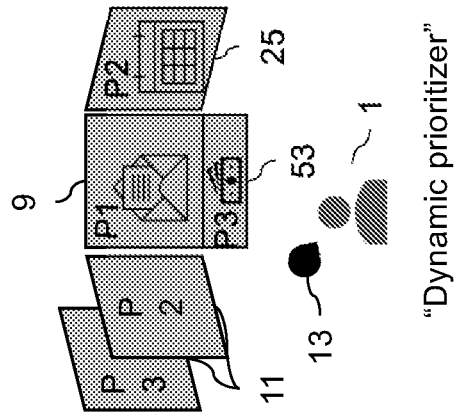

FIG. 7D describes an embodiment, a "Parallel search recommender," in which predictions and recommendations can be made within an application, or across multiple applications. In some embodiments, predictions and recommendations can be based on vertical search engines functions. A user 1 views a central display image 9, and based on the current actions, or based on user queries, a plurality of vertical search engines is produced in a plurality of display images. For example, a user inputs a query into a vertical search engine function 94. In some embodiments, the display images are arranged in a multilayer display 11 or as a column a vertically extended FoV. As a search progresses in one column, it dynamically updates based on the user's current actions or queries, but it also attends to other potential searches that may be of use and presents those results in another set of display images. The data retrieved in the first search is then input into a function 15 that attends to keywords, e.g., by using a self-attention mechanism, and then uses that information as new queries to a second search, which may be displayed in a second multilayer display 11. The functional relationship that one search engine uses to produce another search engine may be a transformer that attends to correlations in the various sections or the first search.

In some embodiments, a user is performing a literature search about a research topic. The primary search is initiated by the user with keywords A, B, and C. A vertical search appears in the first set of virtual display images. A software mechanism actively scans the search results and discovers a new keyword D. A second set of virtual display images then reports search results for only D, or for the combination of A through D. In some embodiments the user limited the search parameters to scientific sources and journals, but the software detects phrases that indicate a patent history of the initial keywords and displays prior art in a second search. After analysis of the figures of the first two vertical searches, a third search might display various downloadable executable files that can assist in numerical simulation or quantitative analysis of the desired research topic.

The vertical search engine may use a standard vertical search algorithm (e.g., crawling, indexing, and ranking), and an object identification algorithm may be used to identify key words or phrases to initiate the next search.

FIG. 7E describes an "Avatar-assisted predictor" embodiment in which a virtual assistant avatar 23 is shown in an FoV 2D extension 25 as it interacts with the user 1, who is viewing a central display image 9, and responds to user commands to accomplish different task functions 15, such as answering emails, drafting sketches or designs, chatting, taking notes, and the like. The different tasks available to the user, predictions and recommendations are shown as commands to be issued to the virtual assistant. In some embodiments, the virtual avatar isn't always directly visible to the user or is called by the user from a voice command.

In an embodiment, the virtual avatar 23 is assisting in secondary tasks to assist the user in completing a primary goal. For example, the user is producing a document, which requires text, figures, and references. The user 1 is producing the main text content and has input into the avatar system basic parameters of the figures: figures size, resolution, format. The avatar proceeds to edit a set of image files accordingly and then has permission to incorporate the files into the image using an API. The avatar also analyzes the image content itself and extract words to describe the image, based on a transformer mechanism. These words become keywords in a web search that are presented to the user as alternative or improved figures, to assist in improving the final product.

In some embodiments, the permissions of the user are defined by an avatar-controlled subsection 23A of the display content, such that the avatar automatically monitors content within a certain window of the display, and the user interacts by dragging elements into or out of those subsections. This serves to give or withdraw the avatar permissions in real-time, and the specific content dynamically asserts which functions the avatar should be prioritizing. In an embodiment, the user may drag images into the subsection, and this indicates that the avatar should be engaging in image processing techniques, whereas if a folder of text documents is dragged into it, the avatar interprets this as performing a literature search to build a bibliography.

In an embodiment, a user is analyzing the results of a simulation, and the avatar function is assisting in the analysis by comparing the results to known results, to dynamic search results, or to the initial input parameters. For example, in a result of a simulation may include graphs or images that the avatar function processes for nonobvious correlations to the input data, and the avatar may suggest the results are physically valid, or that the simulation suffered a technical error. In some embodiments, the avatar assistant may be a terminal for a user to input text or graphics, and the avatar assistant might continually prompt subsequent questions based on the input. For example, a user my input an image of a chair, and the avatar assistant may first produce a question, "What is this?" to display. Then, below this content, it may provide a set of possible answers: "It is a piece of furniture," "It is brown," "It is an object made of wood." Then, below this set of answers is a tree of further questions that rely on the first responses. At any time, the user may interrupt, direct, or guide the avatar-generated question-and-answer. The question-and-answer development may depend on user history or user settings.

In an embodiment, a plurality of avatar assistants may be impacting derivative content in parallel. For example, they might be chat bots for a help center, and the user is monitoring the avatar assistant's messaging and can influence the results real-time.

FIG. 7F describes an "Event-triggered predictor" embodiment in which the different predictions and recommendations are shown in different event layers E1, E2, E3 based on user's event clicking or onstream clicking through a user input 12 like a mouse click, dynamically pulling up the different predictions and possibilities. The events can be automatically generated by a trigger in a video or in another software application, or the events may be triggered when a certain combinations of software applications are used in a certain way.

For example, in some embodiments, a user 1 starts to perform image processing of a video in a while watching a video tutorial of a painting technique in a central display image 9. During the tutorial, a certain brush stroke is detected by a multi-output function 15 as the user replays that portion of the video, the user clicking being input into the function, and a similar tutorial about that brush stroke is found in another tutorial E1; the user may click on the image of the brush such that ads for similar graphics design products show shown in E2; and while the user pauses the video to view the end-result of the tutorial, upcoming venues for showing a finished product are shown with contact information or an online form for follow-up questions to the tutor are shown in E3. The events may be shown in a FoV 2D extension 25. Or the events may be displayed in multi-layer display. In some embodiments, a machine learning algorithm may show in other display images various alternative techniques or methods for achieving similar effects.

In another embodiment, the user is playing a video game. The user navigates the game and reaches certain milestones, and a first event E1 may be a choice of what task to complete in the next step of the game. A second event could be the user scrolling over a certain region in the video game environment, which triggers display event E2, hidden features of the game. Finally, the third event could be triggered as the user pauses the game or clicks on a link, and E3 display content is a marketing add for bonus features, game sequels, or other entertainment options. In any embodiment, the event-based display content can be influenced by the user history.

In the various embodiments, the display content can be arranged in an arbitrary way. In an embodiment, the display content can be arranged laterally, for example, to create a visual scroll or visual belt. A user may provide input via eye gaze or gesture, such that the visual scroll can be dynamically rotated: the user focuses on the display content of interest, and that display content is moved to a central viewing location; the other display contents are shifted sequentially. For example, an event-based predictive display may show three extended displays of events E1, E2, and E3, such that E1 is located to the left, E2 is in the center, and E3 is located on the right. If the user focuses his eye gaze on E1, then E1 is shifted rightward to the center, E2 is shifted rightward to the right, and E3 is moved to the left position. The visual scroll may be configured to display a single event or action at various past or future time instants. This is a "temporal scroll." For example, the visual scroll may have a series of potential time-dependent actions. The visual scroll may be spatially separated, such that various aspects of an action or different actions for a given application are displayed separately. The visual scroll might be spatio-temporally separated, such that the possible content may be a combination of temporally scrolled actions or spatially separated content.

FIG. 7G describes a "Parametric visualizer" embodiment that considers a parametric visualization mechanism such that a virtual continuum of possibilities can be seen simultaneously or easily. An example of this embodiment is as follows. A user 1 watching a movie in a central display image 9. The content of the movie is fed into a neural network 77 and/or AI module 18 which generates annotations or alternative outcomes of the current scene and displays them in extended portions of an extended display system.

The user also inputs information using a generic input device 12 into a parametrizer function 15, which may also take as input a library 45. This parametrizer allows the user to input preferences, user history or profile, quantity, and scope of annotations, or other constraints, into the AI and ML functions. The output P is the set of parameters to tune the AI/ML functions.

In this embodiment, for example, one of the parametrizations results in Profile A, which generates sets of multi-layer display content 11 of the movie, in which the first set describes annotations about the visual content, with detailed and larger annotations and visual content. The second set is more muted, smaller, and has only minor information about the associated soundtrack. A second format, Profile B, might have the relative importance of visual information to sound reversed. The soundtrack information is displayed prominently, with annotations as a hovering graphic 24, and some basic information about visual content is shown as an edge display 53.

In another example, a first user may be interested in the scientific details of the movie and have set a "light" setting parameter for the display content, such that the possible annotations all show the scientific or technical details of a few of the objects or motions in the movie. A second user may be an interior designer and sets the display parameters to "strong," such that whenever the movie scenes are of a room in a house, annotations of all the furniture, housewares, and other goods in the scene include salability, prices, availability, or vendor locations. This may be described as a "display equalizer" function, where the output display is balanced according to various settings.

FIG. 8A through 8D describe different processes to predict future user actions in some of the embodiments described in FIG. 7A to FIG. 7G.

FIG. 8A describes a process related to the embodiment in FIG. 7A. A user input 95 comprising the user history and the user's current action 97 are input into a predictor function 96, which produces a display result 99 of predicted or possible actions. The user then makes a decision 98 about what action to take, which results in a next action 100. The current action 97 then is incorporated into the user history for a next prediction. FIG. 8B describes a process related to the embodiment in FIG. 7B. A user input 95, the user history, and the current action 97 are input into a probabilistic correlation predictor 96, which produces a display result 99 of possible or predicted actions. The user makes a decision 98 to take a next action 100. The current action 97 then is incorporated into the user history for a next prediction.

FIG. 8C describes a process related to the embodiment in FIG. 7C. In it, a user input 95 is the user history, which is input into a priority ranking function 101, then is fed into the priority correlator 102. The possible actions are ranked based on priority and a display result 99 shows the prioritized actions. The user makes a decision 98 about what should be the next action 100 current action. In some embodiments, the priority correlator is a neural network of any kind, including a feedforward network, RNN, LSTM, attention-based transformer, of combinations thereof.

FIG. 8D describes a process related to the embodiment in FIG. 7D. A user input 95 is a search query that is fed into a first vertical search engine 103A. The results are displayed in a first display 99A. The data from the first search are also input into a transformer 104, which attends to and identifies key words to input into a second vertical search engine 103B. The output of this second search is displayed as a second display result 99B. In some embodiments, more than two vertical search engines are used. In some embodiments, the output of a later search may be used to modify an earlier search.

FIG. 8E describes a process of the embodiment in FIG. 7E, configured to have an avatar assistant. The avatar with permissions 105A generatively displays a display result 106 corresponding to possible or predicted actions. The given permissions allow the avatar to execute the actions as a user moves from a current action 97 to a next action 100. The next action may modify the permissions 105B of the avatar assistant and impact the next iteration of tasks completed by it.

FIG. 8F describes a process of the embodiment in FIG. 7F. A user's current action 97 is detected by an event-based trigger 107 which produces a display result 99 corresponding to various actions or other content. The user makes a decision 98 about what the next action should be 100.

Last, FIG. 8G shows a process of the embodiment in FIG. 7G. A user input 95, parameter settings, is input into a parametrizer 108 that produces parameters P that determines the strength and content of an AI module 18 or neural network 77. The generative output results in a display result 98 corresponding to annotation layers.

FIGS. 9A and 9B depict various machine-learning algorithms and methods for assisting in the predictive and generative software in this disclosure.

FIG. 9A shows a generic neural network pipeline: input 109 is the user history and input, plus a potential bag of actions serve as input into a machine learning architecture, like a neural network. The neural network 110 outputs a set of potential actions 111. The neural network can include training data that is derived from a single user's long-term history, multiple users on the display system, or combinations thereof.

In some embodiments, the neural network uses a dictionary that is learned on training data. The training data may come from the local display system and work environment and a unique set of users. In some embodiments, the dictionary and learning occur based on training data from distributed users.

FIG. 9B shows a more specific example of a recurrent neural network, configured as a long-term short-term memory (LSTM) neural network. In this figure, the user input, history, and a bag of actions are input 109 into the LSTM. This input is fed into an LSTM 110 with activation functions g1, g2, g3, g4, and g5. The input and output value from the previous cell are sent through neural network layers with activation functions g1, g2, g3. Then they are combined with the previous cell state through multiplication and addition operation. A potential action is produced 111A. The cell state is acted on with neural network and activation layer g5 and combined with current action and user input after neural network with activation function g4. The activation functions can be anything. In some embodiments, they are a sigmoid or tanh functions. The result is fed into the next cell iteration 113A of the LSTM, along with hidden layer information 114A, which produces a second potential action 111B output in the sequence and is fed into a next cell iteration 113B along with updated hidden layer information 114B. A third action 111C is produced, and so on. In some embodiments, a user avatar has permission for an execution 112A, 112B, 112C of the predicted actions or a subset of them. The activation functions can be standard sigmoid or tan functions. In some embodiments, they are user-defined.

In some embodiments, different neural networks are implemented, including a conventional neural network, simplified RNN, GRU, CNN, especially for image/object detection recommendations, which also use user input in various applications. In some embodiments, the architecture is one-to-one, one-to-many, many-to-one (such as in a classifier), or many-to-many.

Figures 10A, 10B:
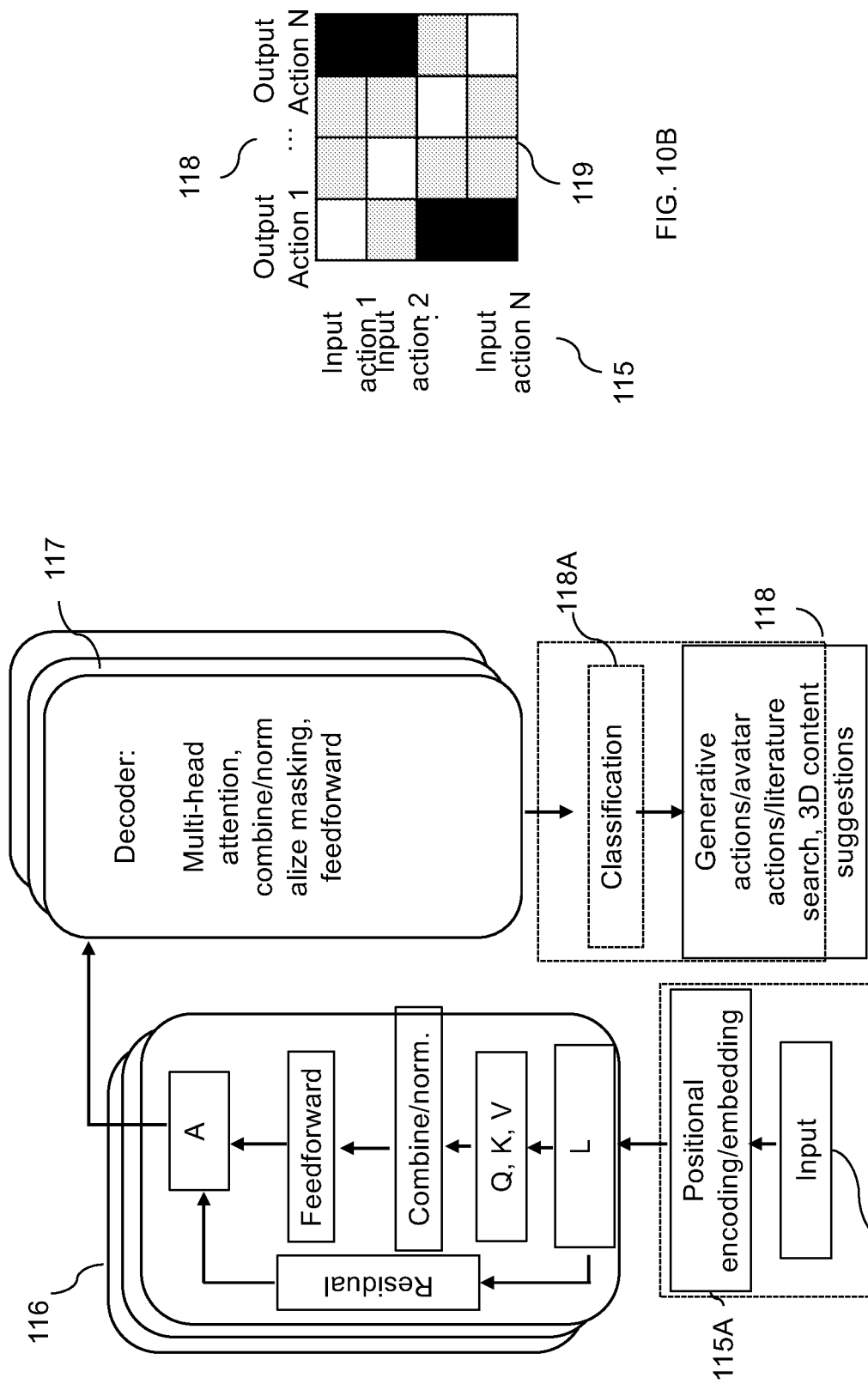
FIGS. 10A and 10B depict block diagrams depicting self-attention mechanisms for use in predicting alternative actions within extended, virtual, or multilayer display systems.

FIGS. 10A and 10B illustrate the use of attention in a transformer architecture to derive predicted actions, classify past actions, or transform a set of actions into a new set of actions, configured for other applications. In FIG. 10A, user actions and history are input 115 into the pipeline and are transformed through positional (sequential) embedding 115A and input into an encoder block 116. The input data are operated on by linear layers to produce query Q, key K, and value V. The encoding block combines Q, K, V and normalizes them, via, e.g., SoftMax. A feedforward layer acts on the data to produce attention matrix A. In some embodiments, residual data bypass elements in the encoding block. In some embodiments, multiple encoding blocks act in parallel. The data is then sent to a decoding block 117, which includes a multi-head attention block, combining and normalizing data matrices, and acting on the data with feedforward layers. In some embodiments, there are residual elements or masking blocks. The output 118 is a set of generative actions/avatar reactions/search results for potential actions. In some embodiments, a classification block 118A identifies the types of actions that are currently being used. In some embodiments, the actions are automatically executed by a user avatar.

In some embodiments, there are multiple transformer heads or multiple stages of attention, or multiple stacks of decoders and encoders. Feedback mechanisms, masks, and positional encoders can all be included in any embodiment.

An example of an attention matrix 119 is shown in FIG. 10B. Each row corresponds to an input (actions from the user history) 115, and each column corresponds to a potential output action 118. The grayscale value corresponds to the correlation between the input action and the output action. For example, Input action 1 correlates very strongly to output action 1 (white shading), of medium strength to output actions 2 and 3 (gray shading), and very weakly to output action N (black shading). In this way, the set of output actions is determined by both the set of input actions and the ordering in which those actions occurred.

FIGS. 11A through 11G describe several embodiments of novel single user use cases.

FIG. 11A depicts an example display system, an "Intelligent expander," that includes an extended FoV and hovering graphics, configured for use in active content generation. In this embodiment, the user experiences dynamic referencing of a text with predictive features. The central display 9A at time t1 shows a text. An object detector function 81 analyzer detects key words and phrases in the text to identify equations and figures and displays those in a separate display image in a 2D extension 25A. The separate display image may be part of a multilayer display, or it can be an extended field-of-view image. The separate display content is updated automatically, such that at time t2, when different content is shown in the primary display image 9B, different secondary content is identified in the secondary 2D extension 25B. In both cases, a hovering graphic 24 displays content from earlier times. For example, the primary display may include the text, "as shown in FIG. 1," and the hovering graphics automatically display the portion of the primary text that involves the picture "FIG. 1." A separate annotation function 17 may annotate or add more information about the content shown in the extended windows. For example, it may show related figures or mathematical deductions made from the shown figures and equations.

In an embodiment, the functions may highlight portions of the central display or annotate the extended display content to emphasize the relationships among those various contents.

FIG. 11B depicts a variant of the display of FIG. 11A, a "Logic deduction expander." A primary display layer 9 shows primary content, such as text. In the text are various statements that are automatically detected by the software as logical statements. A secondary display image, which is an FoV 2D extension 25, or multilayer display in some embodiments, shows the logical consequence of the detected statements, as produced by a logic function 74. For example, if the primary text states "plug Eq 1 into Eq 2," both equations 1 and 2 are displayed on the secondary image, and so is the generated result of the substitution of eq 1 into eq. 2. The logic function that controls the secondary display panel has preprogrammed mathematical logical structures to compute the results.

In some embodiments, the logical consequences are user directed. A user, for example, may query the text, using an audio input, various commands, or questions, including, "Can Equation 10 be proved?" or "Are Equations 11 and 12 simultaneously true, i.e., mutually consistent?" or "What are the differentiable properties of the expression on the left-hand side of Equation 9?" An AI program can answer the questions based on various mathematical libraries that are stored in the AI program. For example, the AI program may then parse an Equation 9 to identify the desired expression on its left-hand side, and analyze its connectedness, smoothness, differentiability, or other geometric or topological features, and output the result in a secondary hovering graphics or as an annotation overlay.

In FIG. 11C, the depicted embodiment is a "Smart formatting integrator," and it acts as an application merger, configured for editing or creating content. The user is producing content, which is a text document in some embodiments. At time t1, the user has produced some text information in the primary display 9A, and some source information, used, for example, for reference, is displayed in a second display as an FoV 2D extension 25A. In some embodiments, it is a hovering graphic or part of a multilayer display image. At time t1, the user performs an action to merge the content from the two windows with a merge function 72. Based on learned understanding of the two contents, the software automatically formats the source information of the secondary image and produces a formatted bibliography in the primary display image. In some embodiments, the user action involves clicking and dragging a mouse, a keystroke, a voice command, or a gesture. In some embodiments, the merging is suggested by a predictive model, and the user confirms or rejects the suggestion. In some embodiments, the merging is done automatically based on user permissions of a predictive avatar. The result is that the main display image 9B at time t2 is modified with the source information integrated. The FoV 2D extension 25B at time t2 may be unchanged.

In some embodiments, other suggestions for source material are made based on a library and on analysis of what text is written. In an embodiment, the suggestions may be a set of thesis statements, hypotheses, or outstanding questions based on the input texts.

FIG. 11D depicts an embodiment, an "Intelligent programming recommender," which is user-context sensitive. A user is producing content, which is a computer program in some embodiments. In some embodiments the content is a multimedia product or an artistic or entertainment product. The central display 9 is the user's primary workspace, and the display system produces two virtual side images as FoV 2D extensions 54. In some embodiments, the side images are hovering graphics or an edge display image. The left display image displays user actions. The right image displays suggested actions based on user history and performed by an AI module. A camera 14 is optionally available to function as a gesture sensor. In some embodiments, the suggested display content are alternative methods of producing the same result as the user is attempting to produce. In some embodiments, the suggested content is an optimized version of the user-produced content. The user inputs information for desired results by gesture recognition through a camera. In some embodiments, the user uses a keyboard or mouse or voice commands. This software application may be used in a variety of ways, including programming, artistic, or a/v or multimedia generation, architecture, 3d design and engineering, game design.

An AI software mechanism may display other alternatives. For example, in a game design module, a user creates a game character generated by speaking or typing text into a prompt. The AI software generates that character and suggests a narrative for that character, other features, or characteristics that character may need to fulfil the narrative, and side characters that may interact with it.

FIG. 11E illustrates a "Posture encoder with AI feedback" embodiment in which a user uses the display system with a camera. The software application is a chatbot, natural language processing, predictive text, or chat prompts using a generative pre-trained transformer, in some embodiments. A user 1 inputs data into the workstation, and the virtual system displays the resulting content in a central display image 9A at time t1. A camera 9 captures gestures, micro gestures, facial expressions, and postures about the user and the resulting display 9A incorporates those physical features into the result. In some embodiments the results might show up as annotation information in a hovering graphic 24A. Even with the same requested dialogue, the software uses learned data about postures or facial expressions to produce different results at t2—hovering graphics 2B and main display image content 9B—compared to that at t1. The annotations can explain how the person's physical features were used, and predict alternative results. In the context of teleconferencing software, the display may have other functions to automatically computationally remap poor posture, wandering eye contact, or highlight other adverse social cues for more positive display content.

FIG. 11F depicts an embodiment of the display system, a "Global graphics intelligence profiler," configured as a multilayer display 11 with hovering graphics 25 purposes. In some embodiments, the use case involves medical imaging. A user observes on the multilayer display 11 a set of images of an object derived from different modalities. For example, in some embodiments involving medical imagining, the different layers are a CT scan, MRI, PET scan, X-ray, or photograph. These images are input into a neural network 77 (with dictionary data for all modalities) to produce a final layer. A final layer is an annotation layer that indicates areas of concern or confirmation of objective questions. A secondary hovering image 24 layer takes as input the annotation layer and produces via an AI module 18 a description of the annotations, a diagnosis or prognosis, or other features of the annotations that aren't specifically in the annotation layer.

In some embodiments, the source data is AI generated, configured for training modules. In some embodiments, the display content is geometrically transformed using a neural radiance field, and the AI software suggests different views for interactive training and suggested teaching. In some embodiments, the AI mechanism is controlled by a second user, who serves as the trainer or educator and directs what images or annotations are emphasized based on the goals of the program.

In some embodiments, as shown in FIG. 11G, a "Multilayer geometric warper," the different layers may correspond to a sequence of pose assets of a character in a video game that share a common anchor or target point, and the hovering graphic is a warped version of the assets based on the common anchor. In this embodiment, the function is a geometric transformation function that may warp, for example, the pose or the stride of the character. One of the layers of multilayer image 11, say the back layer, may include a target graphic to which the character's figure must be warped. The target graphic may be a scene or environment with certain landmarks or anchor points, such that the warping is adjusted dynamically based on the anchor points. In some embodiments, a function 15 analyzes the scene and displays a subset of pose assets of a character. Those pose assets are then input into a geometric transformation function 19 to generate a warped pose in a hovering graphic 24. The type of warping is arbitrary. The warping and geometry transformations can be implemented with Generative-Adversarial-Networks (GANs) in which the anchors can play the role of "seeds" for the GANs.

Figure 12:
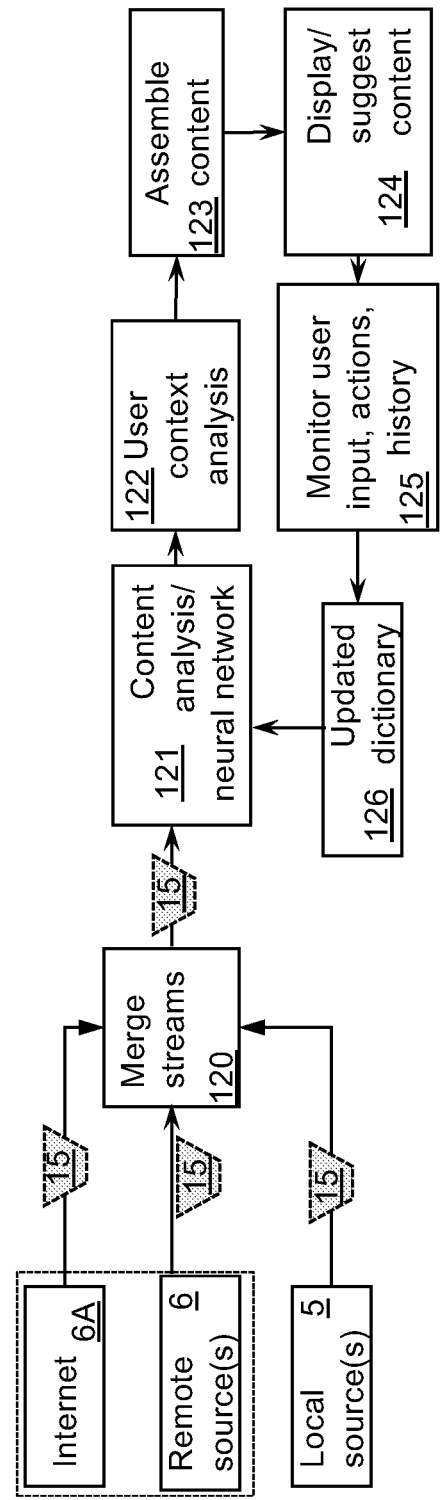
FIG. 12 is a flow chart to describe a mechanism for displaying content from remote and local sources simultaneously.

FIG. 12 shows a flowchart of a software mechanism of tandem computing. Multiple input streams include the internet 6A, local sources 5, and generic remote sources 6. Examples include cloud servers, local workstations, daisy-changed workstations, distributed networks, and edge devices. The data are optionally operated on by various functions 15 and then merged in a merge block 120. The resulting merged data may be operated on by another function 15 and is analyzed by the display system, which can include neural networks, in content analysis block 121. A second content analysis block 122 understands the content in terms of the current context of the user actions or the tasks or applications that are being used. The content is assembled in assemble block 123, and the content is then displayed on display system 124. In some embodiments, predictive actions, or suggestions are included in the content. The user input, actions, and history are monitored in a monitor block 125 and fed back into the analysis unit. The feedback may reside in an updated learning dictionary 126 for a machine learning algorithm before being directed into an analysis block.

In some embodiments, merging is a nonlinear function or multidimensional function of the input streams.

User actions and feedback include time delays for making actions, decision making choices. Suggested content can be automatic depending on permissions given to the software. In some embodiments, the suggestions call a sub-application or autocomplete forms or online data entry requests. In some embodiments, the suggestions impact the health of the user, for example by suggesting taking a break, switch tasks, or maintaining focus, based on a user's health data.

FIGS. 13A through 13I depict various embodiments using tandem computing methods, which include edge computing devices and distributed networks.

Figure 13B:
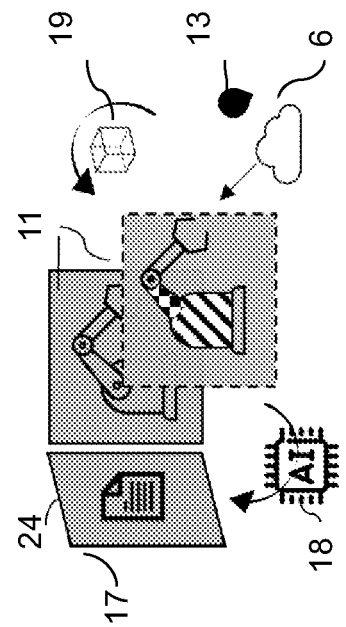
Figure 13D:
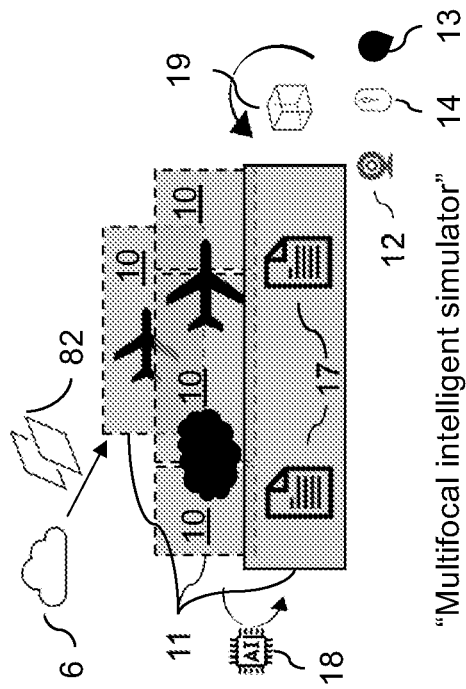
Figure 13A:
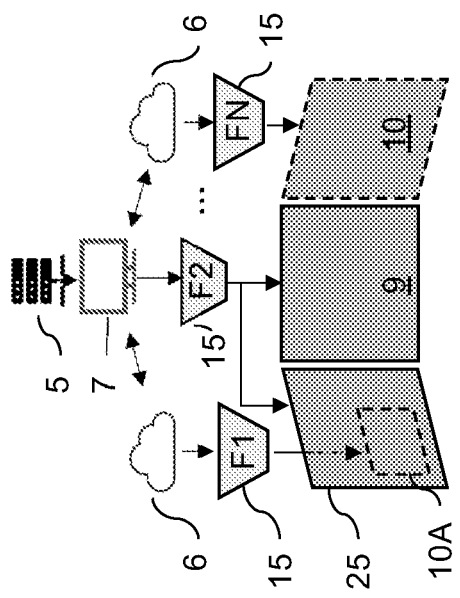

FIG. 13A depicts a general tandem-computing environment, a "Tandem-expanded display system." The display system produces N display images, including a generic central display 9 and an FoV 2D extension 25. In some embodiments, there are more than three panels or fewer than three. In some embodiments, the configuration is a multilayer display panel. In FIG. 13A, there are several sources of display content. One of the sources is a local source 5 connected to a display system 7 and produces the display content on the entire central display image 9. Other sources are remote sources 6 and generate content in the side windows. The right-side window is entirely a remotely sourced 10, that is, that entire display image is due to the remote source. In the left side window, a portion 10A is generated by the remote source, and the original local source produces the rest. In any embodiments, the display content can be operated on with functions 15, e.g., F1, F2, . . . , FN. All sources can communicate with each other, either directly or through various daisy chained configurations.

The embodiment in FIG. 13B illustrates an example tandem computer, an "AI sensory network integrator," configured for use in teleoperations, robotic control, or quality control. One display area of a multilayer display 11 shows a video remote-controlled robot, for example, used in manufacturing, from a remote source 6. An array of distributed remote sensors 13 at the manufacturing site, vendor site, or any other location remotely produces the content for a front layer, which highlights the environment of the robot. In some embodiments, the remote sensors depict information about the robot, like the operating temperature or range limitations. In some embodiments, the remote sensors depict information about the product that the robot manipulates, such as quality-control sensing, random variations, stresses, and strains, or thermal or mechanical stability of the product or robot. The dual layer multilayer display images both are input into a geometric transformation function 19, which is used to overlay the sensory data on the video. For example, the sensory data may be a set of temperature sensors, and the geometric transformation functions uses a backpropagation algorithm to map the temperature profile of the device. A second function is an AI-module, which takes in the sensory data and the video as input and outputs an annotation 17 in a hovering graphic 24. The annotation provides descriptive content about the robot, or it predicts part failure, or it suggests modifications to the operation, or it suggests contacting vendors for support. For example, based on the temperature profile layered on the video, the AI module may generate content indicating that a robotic part is overheating, or that it may overheat in the near future unless an intervention is made.

Figure 13C:
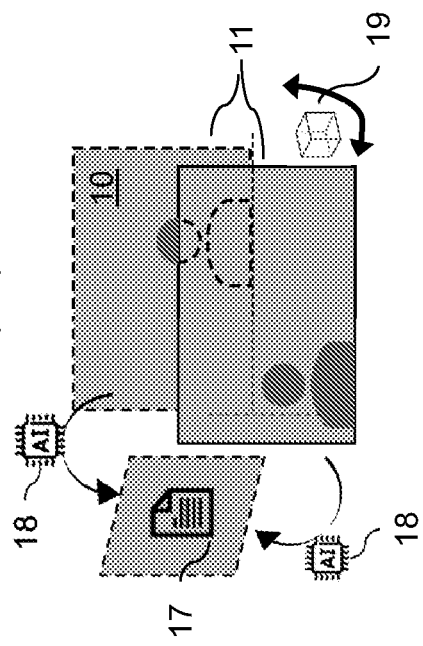

FIG. 13C depicts a tandem computing embodiment, a "Multilayer smart teleconferencer," for teleconferencing in virtual reality environments. A multilayer display 11 displays on each layer a given user in a shared virtual reality environment. One of the layers is a remotely sourced image 10 of a person. A geometric transformation function 19 acts on object and people in the scene are assigned to various depths and positions of the users. For example, an object detection subroutine detects the size of a person in one layer, which would be dependent on the person's position to a camera, and then magnifies or minifies an image of a second person, such that the two are of similar sizes.

In some embodiments, a secondary hovering-graphics layer 55 provides annotations and feedback to each user based on their facial expressions, eye gaze, tone, or head position, so that the user can modify his actions based on the suggested feedback. In some embodiments, AI module 19 assesses the conversation and the multiple users in the conversation to impact the conversation. For example, a facial expression analyzer function may assess the mood of a collaborative user and indicate whether the tone of the conversation should be serious, formal, informal, or light-hearted. Embodiments may be combined together. For example, the "Multilayer smart teleconferencer" may include as part of its operation FIG. 11E, the "Posture encoder with AI feedback."

The embodiment in FIG. 13D illustrates a use case of an extended virtual FoV display with multiple layers tandem computing, configured for use as a flight simulator, gaming experience, training experience, or weather/climate monitor. In this "Multifocal intelligent simulator," several layers of a multilayer display 11 are remotely sourced images 11. These may be images of a flight simulator. The input stream passes through a multilayer optimizer to optimize the content for the display to maximize the depth perception. An AI-module 18 takes in the simulations images and provides annotations 17 on a front layer for a user-trainee to see. The annotations may be suggestions for next actions, dangers in the simulated environment, warnings, predicted alternatives, predicted motion or future dynamics of the environment. The annotation layer may also include images of instrumentation clusters and gauges. In some embodiments, the central viewing area may show the simulation, and the extended displays may show AI-generated predicted outcomes of the choices that a user can make based on the central content.

In some embodiments, the environment is a real-time image, for example, as produced by a camera located on an existing airplane, which is then used for flight simulation or observations. Or it may be a Realtime image of a remotely controlled vehicle, which the user controls in a teleoperations environment. In some embodiments, the annotation layer shows the predicted scene or the predicted motion at a future time, based on a delay that incorporates the latency.

In some embodiments, the extended display of FIG. 13D is configured for use as a virtual tour of an environment, such as a museum, and an annotation layer provides annotations of the items in the environment.

In some embodiments, a sensor array in communication with the display system collects SLAM information about the user to influence or show distinct parts of the visual environment. For example, in a teleoperations center, the SLAM information is input into a function to geometrically change the perspective of the virtual content for angle-accurate perspectives, which are true perspectives without any distortion that would occur from the sensors, cameras, or communication channel. Or, head tracking and eye gaze may be used, for example, to detect where the user is looking and to modify that portion of the display content or zoom in on that area. In some embodiments, the AI-module is replaced by, or is impacted by, a trainer or instructor who may provide instructions as annotations. The instructor may be visible in the periphery of the user, such that the visual environment is immersive, and the instructor and user have a sense of being in the same place. In this embodiment, this immersion allows a user to experience a visual environment with more realism. In some embodiments, the head tracking or eye gaze may be input into a geometric transformation function that modifies the simulation environment, so as to mimic shifts in viewing perspective.

FIG. 13E depicts an embodiment, a "Tandem-intelligent content generator," in which the tandem display system is configured. A multilayer display 11 has main display image 9 that is produced by a local source and depicts, for example, scientific data or graphics. If the local source with display system 6 is a low-bandwidth source, the graphic or data is of low resolution or limited in some other way such as FoV, time resolution, feature depiction, or spatial resolution. The user provides an input, which includes a cursor input to move a cursor location 127 on the display image. The position of the cursor is detected, and the nearby portion of the display content is sent to a remote source 6, which relays more information about the nearby environment. The remote source may use an annotation function 17 to generate desired annotations in the remotely sourced image 10. In some embodiments, the cursor is not used and instead, the content of interested is determined by eye gaze location generated by an eye tracking input device. That extra information is displayed on a secondary display image in the multilayer display 11. It may be a FoV 2D extension display or a hovering graphic. The extra information could be a high-resolution or otherwise enhanced image of the environment. In some embodiments, the extra information is descriptive text, additional drawings or schematics, images of similar objects (as would be used in, e.g., an image web search). In some embodiments the extra information is a graph or simple text that shows up on an edge display image.

In some embodiments, a graphics function 39 produces a dynamic image enhancement or upscaling, rendered from high-power computational sources. In some embodiments, different functional blocks allow a user to select different classes of modification, annotation, description, or suggestion. The annotation function and the graphics function may be parameterized by a user profile or history.

The embodiment in FIG. 13F depicts a use of the tandem computer, a "Time-delayed AI predictor/differentiator," wherein a multilayer display 11 produces multiple frames of a video or a time lapse sequence of images of an object. In the embodiment, it produces a first remotely sourced image 10A and a second remotely sourced image 10B, where the second image is a time delayed version of the first image.

The time delay 128 may be controlled by a user setting, or it may include latency of a video of the objects motion. The delay can be tuned to observe different time scales. For example, it may be tuned to be as small as possible, such that a user may consider very fast changes, or it may be tuned to be larger to consider slow changes.

In some embodiments, this application is used for weather prediction, and the object of interest is a storm or other localized weather effect. Both layers are then input into an AI module 18 that outputs onto a third layer the predicted evolution of the object. The time delay can be included, and the predicted image can show multiple possible trajectories, e.g., 135A and 135B, with different probabilities highlighted, or it can show various outcomes based on different time scales, e.g., local weather patterns for long-term trends in climate history.

In some embodiments, the two images are almost identical, and the predicted image provides information about edges or differences between the two images or two frames of a video. In this way, this embodiment differentiates the visual content in time. In some embodiments, the different images come from different input streams, and the time difference is tunable, to contrast the content on different time scales. The AI module may incorporate any physical laws that describe the motion of the object under study.

In FIG. 13G, a tandem computer is configured for use in building automatic finance trading programs in a "Realtime programmable update predictor." A user views a central display 9 that shows computer code for high-frequency trading operations. Multiple virtual edges 53 are displayed around the central image, all of which are generated by a remote source 6. The edge images include stock market values S1 and trends at various times, and the local workstation automatically compiles the code in real time. The code and the remote source data are input into a function 15 to generate predicted changes in stock prices for display along with the true values on the edge displays S2. In some embodiments, the latency is incorporated in a time delay 128 to assist the function in making predictive suggestions about how the market conditions change and what algorithms might be advantageous in future revisions. The function may be an AI-module, or it may be a statistical model in orthodox econometrics. In some embodiments, the predictive measures may be used to mitigate latency for high-frequency trading located physically farther from the market floor. The function may rely on a dynamic time warping algorithm to compare time series data and optimize matches between them.

Figure 13I:
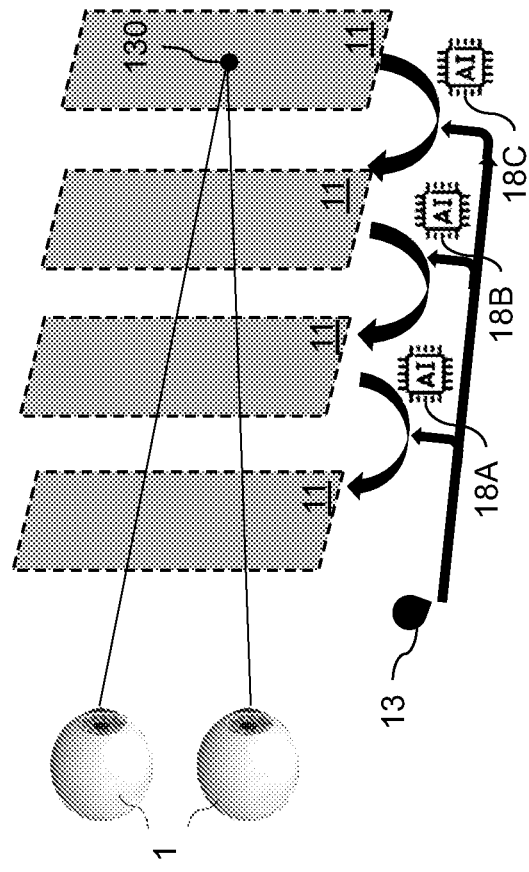
Figure 13H:
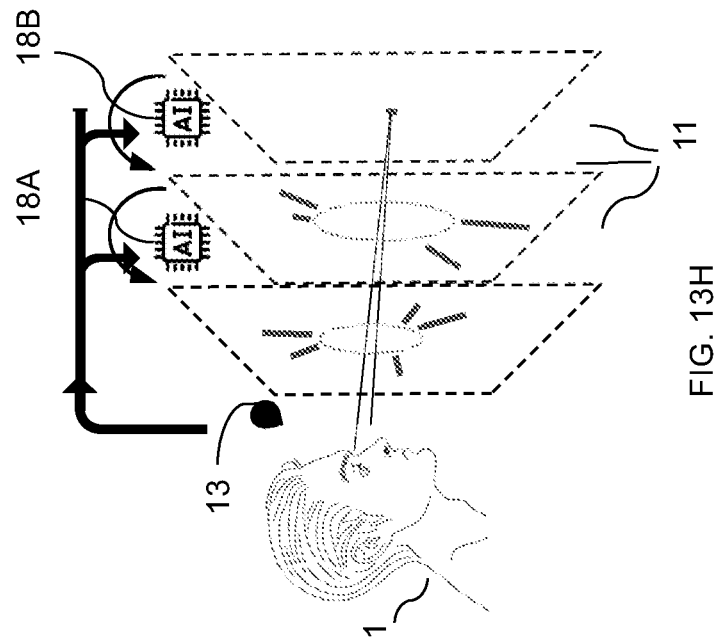

FIGS. 13H and 13I depict an embodiment in which a user is viewing a multilayer display. In FIG. 13H, a multilayer display 11 is viewed by a user 1. Different content is shown on each layer. Each layer corresponds to a different focal depth, for which the users' eyes individually accommodate to. A sensor 13 may detect information about the user, such as eye gaze or geometry. The sensor may be a gesture camera that identifies specific gestures made by the viewer. The sensor may detect information about the environment. The data from the sensor and the content on each layer are input into a set of AI modules 18A and 18B, which may be configured differently, e.g., with different dictionaries, training mechanisms, or architectures. The outputs of the AI modules impact the display content. For example, the user eye gaze may be in the center of the display, and the content of each layer moves radially inward or outward to change where the content is displayed. In this way, the set of AI modules create a network of feedback and communication between the viewer and the different focal planes. FIG. 13I shows a similar setup with four layers in a multilayer display 11 and three different AI modules 18A, 18B, and 18C. The user 1 is focusing on a point 130 in the rear layer, such that both eye lenses accommodate that depth. If the user looked at content on a different layer, the accommodation of the lenses changes. In both cases, the layers may be locally sourced or remotely sourced.

FIG. 14A through 14E shows different embodiments of novel muti-user and collaborative use cases. Collaborative use cases include, but are not limited to, content editing/creation/annotation of applications; exploring content/data; control-room applications; performing processes such as computations/simulations, rendering, mapping; and analyzing trends/patterns or visualizing multi-dimensional data.

FIG. 14A depicts an embodiment, a "Content-aware content sharer," in which two users 2 are engaged in a videoconference. One person, shown on a central display image 9, is transmitting information and explaining and pushing content to a receiving collaborative user 2. In this embodiment, the transmitting user controls some of the aspects of the receiving user's display system. For example, the transmitting user may choose the visual template for optimal presentation of, or interaction with, the content. The transmitting user may decide to push the content into multi-layer displays 11 for the receiving user, where the multilayer display is a set of images for a certain lesson with annotations created by a user. The transmitting user directs the content and the display system configuration through a variety of means, including gestures, keyboard or mouse input, or voice activation. The collaborative user 2 can interact with the display content using generic input devices 12, including a camera 14. In some embodiments, a sensor or sensor array is used to receive input from a user. The roles of explainer and receiver can be dynamically switched based on a configuration of the software, which decides who is the host and who is a guest.

FIG. 14B depicts an embodiment, a "Collaborative task manager," in which two collaborative users 2 are collaborating in a scenario involving a complex task, such as air traffic control. Each user has his own display system and content showing various aspects of the scenario (e.g., air traffic control). In this embodiment, the displays systems both show sets of multilayer images 11. The information processed by each user can be passed back and forth between them and pushed to different streams of the other user using any input device or sensor. For example, in air traffic control, one user monitors the routes of the airplanes 131, while the other user computes different optimized routes or interacts with anticipated trajectories 132. The information of traffic monitored by the first user such as altitude, speed, and heading can be pushed numerically to the second user, which can generate optimized routes using a code function 76 and passed to the first user as alternative routes in a graphical mode. The function that the software uses here is a merge function 72, which merges the information of one user into a form that is useable by the second user. Information display for the user monitoring the traffic may be more graphical in nature whereas information display for the user running the calculations may be more numerical and tabulated in nature. The streams for each user can adjust to the nature of the information being processed. The software may automatically adjust the virtual display content or template, based on the information being sent.

FIG. 14C describes an embodiment, a "Multi-user dynamic content translator," involving an online teaching scenario. A teacher pushes content to an audience (e.g., the students who are the collaborative users 2), which receives a customized version of the content. This is like the application of FIG. 14A, except that each student may receive the content differently based on his/her learning preferences and settings of the display. For example, a first student may be a visual learner—discovered through various calibration, testing, or interviews with that student—and so the content produced on the respective display system is more graphical. A second student may be better with quantitative reasoning, such that the respective display is more text-based, with mathematical equations. The software function then translates, though, e.g., a machine learning algorithm, the original content into a plurality of display contents. For example, the instructor may be reciting information about a physical principle. A voice-to-text program transcripts the statements, and an AI-generator produces visual content based on the text and on web searches that use the text as input. The information is all sent to a student's workstation, and a local analyzer then determines which of the modalities-voice, text, or imagery, or any combination—is optimal, based on student history and input. Each of the users receives content being shared by the teacher through a unique whiteboarding function 70A, 70B, 70C, which incorporates such translation functions.

In some embodiments, the dynamic translation uses data or metadata, and an AI module provides an annotation layer to assist in formulating questions for students. The annotation layer may be displayed for the instructor or for the students.

Figures 14D, 14E:
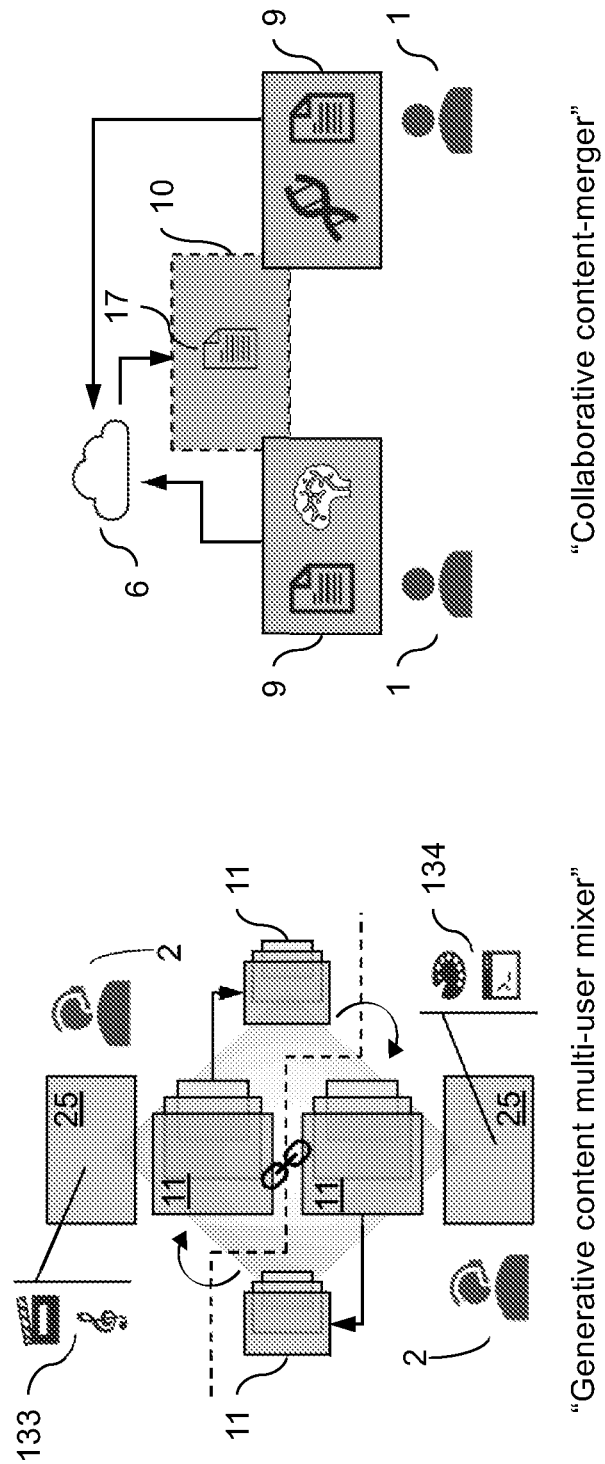

FIG. 14D describes an embodiment of a collaborative scenario, such as generating movie production, or entertainment media, between two users that are in different locations. In this embodiment, a "Generative content multi-user mixer," two users 2 share a multilayer display 11 which contains the common work in progress, shown on their respective display systems. Each user has an FoV 2D extension 25, or multilayer display 11, that can be pushed to the other while discussing different aspects of the work to be done back and forth. For example, the first user can be working on editing frames and soundtracks 133, whereas the second user can be working on improving and adding artificial effects 134 to the clips and soundtracks being edited by the first user. Each user can use their peripheral displays to show to the other user different suggestions to edit and improve the final product. In some embodiments, this configuration is used for web conferencing, multiplayer gaming, or collaborative teleoperations.

In some embodiments, an annotation layer may be AI-generated. An annotation layer for one user might take as input the details of another user, and it may output various app suggestions—such as hyperlinks, advertisements, or chat interfaces—to assist in completing the collaborative task.

FIG. 14E describes an embodiment, a "Collaborative content merger," of a collaborative scenario in which two users 1, which do not necessarily have to be in the same location, are generating multi-dimensional content, for example, in composing a research paper with text and graphics. The first user may be focused on analyzing and reporting medical imaging in a display image 9, while the second user may be focused on analyzing and reporting on the effects of some medications on a second display 9. The results of both reports are sent to a remote source 6, which then merges and live updates the collaborative result, which is then displayed by the display system as, e.g., a layer in a remotely sourced image 10. The images together may form a multilayer display, which may include various overlayed annotations 17. Both users see the same joint project as their work progresses. In some embodiments, the two users are in the same physical location, and the final result is displayed once for both users to view simultaneously in a common display. In some embodiments, various annotations can be made on any layer, by either user for viewing by the other user. In this embodiment, the users may be using different software applications. For example, if both are contributing to text, one user is using a what-you-see-is-what-you-get (WYSIWYG) software, whereas another user is using a plain-text software. As the individual content is generated, it is converted locally into a common format. Both sets of information are uploaded to a remote source 6, which analyzes and integrates or merges them together. The remote source can then send the merged document back to the users' display system for viewing.

Figures 15A, 15B:
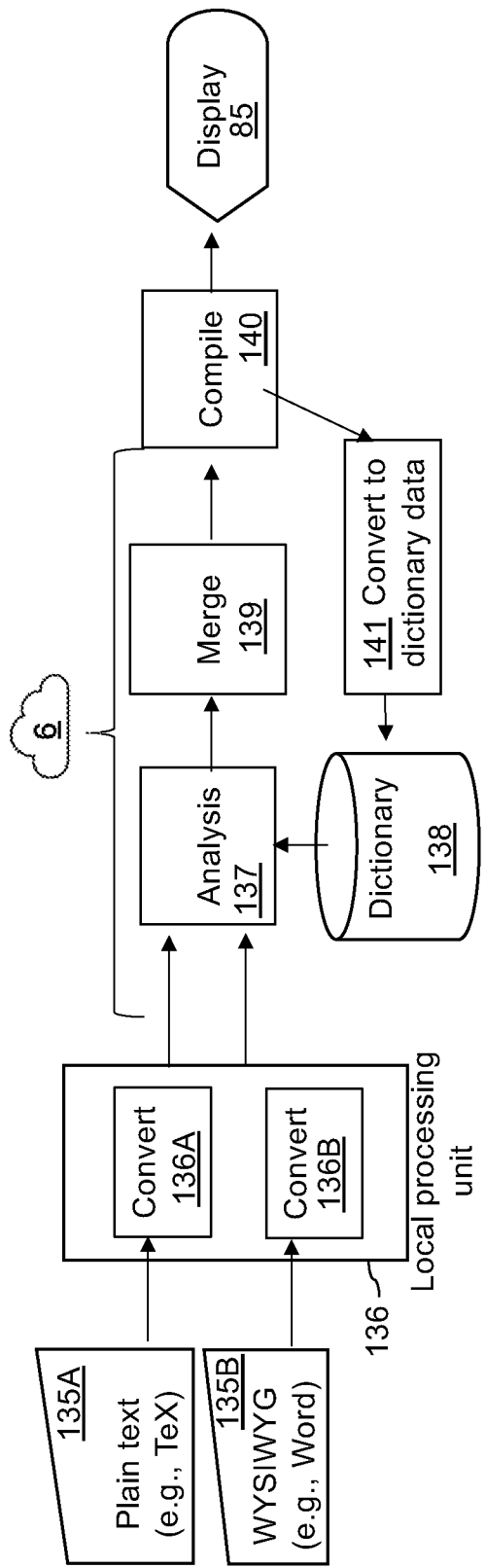
FIGS. 15A and 15B depict a set of flow charts for some of the generative software applications described in this disclosure.

FIGS. 15A and 15B show different flowcharts describing different text and graphical editing modalities in tandem.

FIG. 15A depicts a flowchart of a tandem text editing scenario in which two users are working on the same document. Each user is working with a different text editing tool. For example, one user can be working with a plain text editor 135A, such as TeX, and the other user can be working with WYSIWYG editor 135B, such as Microsoft Word. A local processing unit 136 contains a convert block 136A and a convert block 136B to convert the input data into a common format. The common format may be ASCII-type data. The information is sent to remote source 6, which analyzes the data in analysis block 137. This block also takes in a dictionary 138, configured for use in a neural network. The data is then combined in merge block 139 and compiled in a compile block 140. The remote source then directs the result to the display system for display 85. The compiled data are fed into a convert to dictionary data block 141 to update the analysis dictionary.

FIG. 15B depicts a flowchart in which a 3D image is produced by a remote source 6. In some embodiments, the original data is a 2D image 142 or a set of 2D images. The remote software has an estimation block 143 to estimates depths in the images based on various cues—such as stereo information from multiple cameras, time-of-flight information, depth-from-shading or—shape, projective geometry, or monocular depth estimation—and merges them into a 3D image 144. The remote source 6 then sends the information to the local source, which has a threshold block 145 and thresholds or bins the depth information into a discrete set of depth planes that correspond to the layers of a multilayer display 85. The thresholding optimization may use a neural network that includes in an HVS dictionary 147 with information about the human visual system (HVS), as well as input 146 from a user or SLAM information. The HVS dictionary may include information about visual acuity or depth perception. The depth perception information may include data about the human horopter and Panum's Fusion Area; vergence or accommodation metrics for human populations varying by age; or information about the brain, eyes, and connecting nervous system. In some embodiments, the depth perception information is weighed highly against the other information, such that the algorithm optimizes the depth perception of the image content by a viewer. For example, the image focal plane may be mapped to a shape related to Panum's Fusion Area.

Figure 16C:
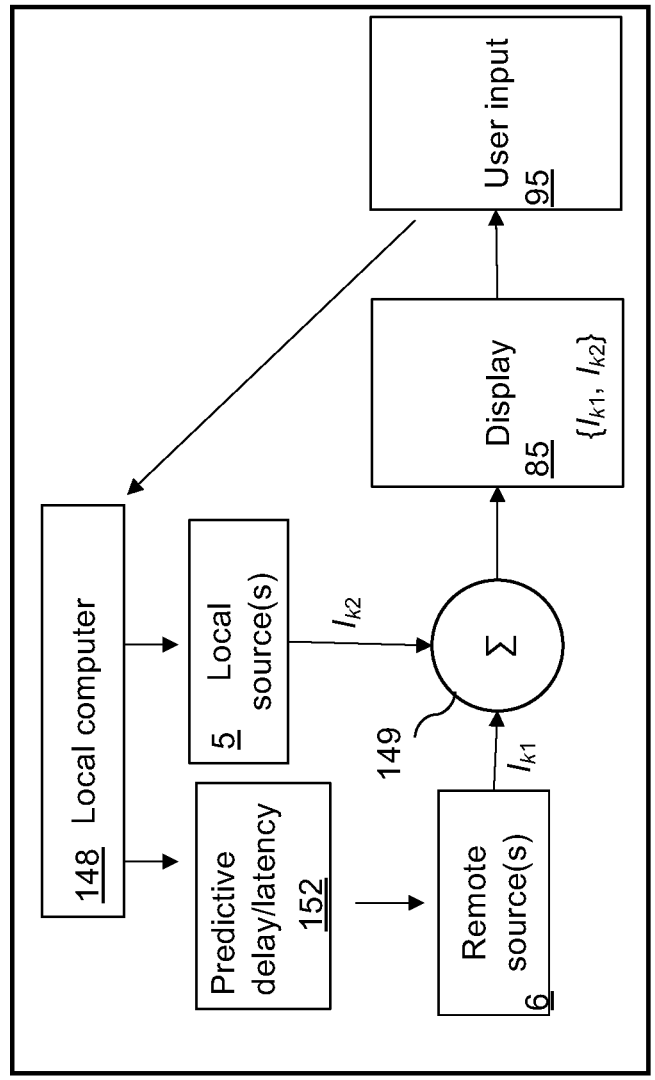

FIGS. 16A through 16C depict a set of pipelines in which both remote and local sources are used to produce display content. In some embodiments, the pipeline is application-independent and is set by the local workstation.

In FIG. 16A, a local computer 148 divides the pixels into two sets $s_j'$ and $s_j$. Pixels $s_i$ are sent to the remote source(s)

6 to be rendered by some operation $R_{ij}$. Pixels $s_j'$ are sent to the local source 5 to be rendered by operation $L_{ij}$. The resulting pixels are added together as a sum 149 to produce pixels $p_i = L_{ij} s_j + R_{ij} s_j'$. These pixels are then shown as a display 85. In some embodiments, user input 95, partly based on the current display content, is fed back to the local computer to change the sets of pixels sent remotely and locally. In some embodiments the sets $s_j$ and $s_j'$ are disjoint. In some embodiments they overlap, such that the intersection represents a set of pixels that receive contributions from both remote and local sources as a weighted superposition.

FIG. 16B illustrates a similar pipeline, in which the content is divided by bandwidth. A content controller unit 150 analyzes the desired display content. The information is sent to a basis optimizer unit 151, which decomposes the content into an appropriate basis. For example, the basis can be a standard Fourier basis, or it can be a sparse basis, or a wavelet basis, or a content-adaptive basis. The basis modes where most of the energy lies (called here the high-bandwidth content) is sent to remote source 6, which then fetches or renders that content. The low-bandwidth content is then fetched or rendered by the local source 6. The two sets of content are then added together as a sum 149, and the sum is sent as display 85. In some embodiments, user input 95 can adjust the content type. For example, a user may wish to process an image, or may wish to use a certain functionality. The user can select the modality, which, in turn, corresponds to a particular image basis. The basis could be a standard Fourier basis, point-sparse basis, edge basis, or a higher-level basis for high-level object detection. An image/can be expressed as a superposition of bases modes $B_m$ with weight $w_m$:

$$I(r_m) = \Sigma_m w_m B_m(r_m).$$

Next, threshold $w_{m'}$ and find the ranges of m' for which $w_{m'}$ is above the threshold. This range corresponds to high-bandwidth portions of the display content. Send that range to the high-bandwidth processer to process and produce pixel values. Combine the rest with a low-bandwidth processer; add the result and send to the display system.

In some embodiments, the content is separated based on a feature type. For example, display content involving sharp edges is produced by the remote source, and display content involving broad features is produced by the local source. Or, in some embodiments, information about human subjects is produced by the remote source, and information about scenery is produced by the remote source. The basis chosen may depend on the specific software application, or it can be created dynamically. In this way, the separation is a form of foveated rendering.

In FIG. 16C, the content of a multilayer graphical display is analyzed by a local computer 148. Some of the layer information is sent to a local source 5 for display generation. The result is sent to remote source 6. The results of the local and remote display content generation are added together as a sum 149 and shown as display 85. User input 95 allows for changing the local computer analysis of the desired content. In some embodiments, information about the latency of the remote source is combined into a time delay block 152 with predictive modeling capabilities to impact the remote display content.

FIGS. 17A through 17D depict some auxiliary embodiments involving the infographic display of various events that span in time and space.

Figure 17A:
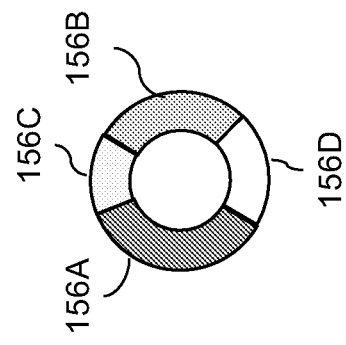
FIGS. 17A through 17D depict auxiliary embodiments showing methods of graphically displaying information and events that follow a sequence and that can branch out from a central event that occurs in a generative software application.

FIG. 17A depicts a "time-span" embodiment in which a central display 9 shows information and events relevant to the present time, whereas a display below the central display a past-content graphic 155 as bars to show past events in a sequence that leads to the present. On the other hand, a screen on top of the central screen shows a future-content graphic 154 displays a stack of future possible options and events in a way that events/options more likely in the near future are highlighted than events/options likely compared to a distant-future graphic 153. In some embodiments, widths of bars indicate activity likelihood, and positions indicate recommendations based on other factors (like productivity or time of day). Bubbles indicate the least certainty in the distant future.

Figure 17B:
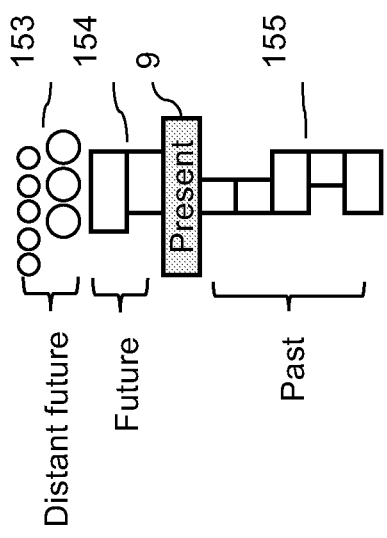

FIG. 17B depicts a "space-span" embodiment in which depicted events 156A, 156B, 156C, and 156D in the past are displayed in a way in which the size of the possible event in the near future is related to the likelihood that the user will activate such an event. In some embodiments, shading or color of the different pieces indicates future recommended actions.

Figure 17C:
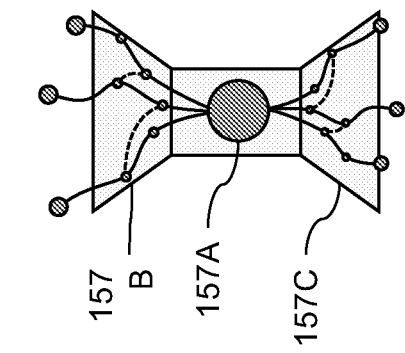

FIG. 17C depicts a "tree-span" embodiment in which an event of interest 157A is connected to preceding events 157C being displayed by a screen below a central screen and possible event 157B derived from the event of interest are displayed by a screen above the central screen. Nodes in the graph correspond to various past, present, or future actions. The connections are determined by correlations between the actions. In some embodiments, there are multiple components, such that each component is a graph, the nodes of one component are not connected to the nodes of any other component.

Figure 17D:
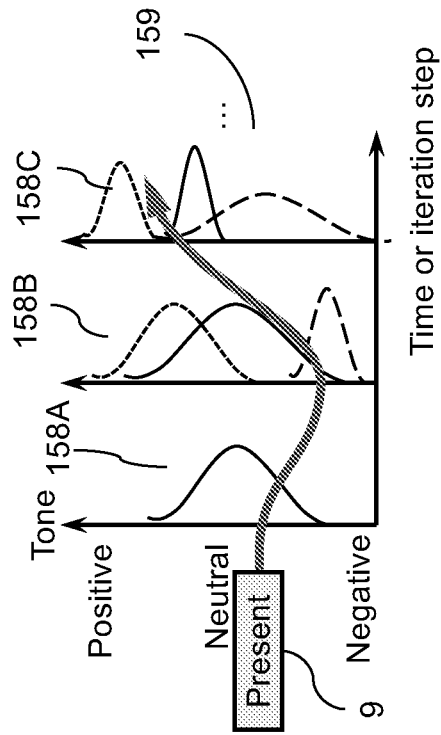

FIG. 17D depicts an embodiment infographic in which the tone of suggested words in writing, for example, an email change dynamically as a function of the current input of the user. The tone can vary between positive, negative, or neutral tones. The present display 9 may show an image of an email environment for a user to compose an email. At the start, the user is presented with initial suggested words that are organized vertically based on the tone. The first distribution 158A is centered on neutral tones. As the user progresses through word choice 159, he chooses a slightly negative tone, and so the next distribution 158B shows different sets of words based on the tone chosen. A third distribution 158C follows the from a user change tone from negative to positive.

What is claimed is:

1. An extended display experience station comprising:
    an extended display system having a main part and an extended part for displaying content, the main part being fed directly by an input stream among a plurality of input streams, the input stream having a local source;
    at least one processor operably connected to the extended display system; and
    a non-transitory, computer-readable storage medium having encoded thereon instructions executable by the at least one processor, the instructions including:
        a plurality of functions to receive the input stream from among a plurality of input streams, and
        a software application to generate a second display content for display on the extended part of the extended display system using a selected function from the plurality of functions, such that a first display content on the main part of the extended display system interacts with the second display content on the extended part.

2. The extended display experience station of claim 1, further comprising at least one sensor to capture information about a user and to input the information into the selected function, the selected function outputting a dynamic modification of the at least one of the first and second display content on the extended display system.

3. The extended display experience station of claim 1, wherein an extended portion of the extended display system is shown at a virtual depth different from a virtual depth of the main part.

4. The extended display experience station of claim 1, wherein at least part of the at least one processor is part of a remote source in communication with the extended display system, the remote source to run the software application.

5. The extended display experience station of claim 1, wherein at least part of the at least one processor is part of the extended display system and the instructions executable by the at least one processor are at least partially run thereon.

6. The extended display experience station of claim 1, wherein the software application is further to communicate with a remote source and to receive therefrom assistance with the second display content shown in the extended part of the extended display system.

7. The extended display experience station of claim 1, further comprising an input device to capture information from a user, and wherein the software application is for a training experience, such that the plurality of functions provides a plurality interactive auxiliary image portions.

8. The extended display experience station of claim 7, wherein the user is a first user, and the software application updates the training experience for a second user based on a usage of the training experience by the first user.

9. The extended display experience station of claim 1, wherein the software application is a video application, and wherein a feature of a video is impacted by an AI module.

10. The extended display experience station of claim 9, further comprising a user input device, wherein the video is a clickable video and based on an input to the user input device the AI function generates one of (i) information about an object in the clickable video, (ii) new frames of the clickable video, and (iii) additional content related to the clickable video.

11. The extended display experience station of claim 9, wherein the video is a real-time video or a remote environment, and the AI module is to detect a person or an action of the person in the real-time video and to display a sequence of the actions simultaneously with a display of the real-time video.

12. The extended display experience station of claim 1, wherein one of the plurality of functions is a computer-vision function to detect a feature of one of the plurality of input streams and output a visually modified feature on the extended display system.

13. The extended display experience station of claim 12, wherein the computer-vision function is to detect a content of a first image displayed on the main part of the extended display system and generate a second content to display on the extended part of the extended display system, the second content being identified by reference in the first content.

14. The extended display experience station of claim 1 for use in a collaborative application, wherein a plurality of users interacts with a plurality of extended display systems, each of the extended display systems displaying a portion of a visually shared environment.

15. The extended display experience station of claim 1, wherein the extended display system is communicatively coupled to a portion of the extended display experience station on a mobile device, tablet, smartphone, smartwatch, or headset.

16. The extended display experience station of claim 1, wherein the first display content shows a video of a user of a teleconferencing application, the selected function generates a suggestion based on the video.

17. The extended display experience station of claim 16, wherein the selected function is an artificial intelligence (AI) function.

18. The extended display experience station of claim 1, wherein the selected function is an artificial intelligence (AI) function.

19. The extended display experience station of claim 1, wherein the main part of the extended display system constitutes a first focal plane, and the extended part of the extended display system constitutes one or more second focal planes, the first focal plane and the one or more second focal planes together forming a plurality of focal planes.

20. The extended display experience station of claim 19, wherein the second display content is a generative content for display on the one or more second focal planes.

21. The extended display experience station of claim 20, wherein the generative content is an annotation.

22. The extended display experience station of claim 20, wherein a subset of the plurality of focal planes shows a plurality of images from the input stream, and another focal plane among the one or more second focal planes shows the generative content, the generative content being a difference between the plurality of images.

23. The extended display experience station of claim 19, wherein the first display content is a display content from a teleconferencing application, and the second display content is an annotation layer.

24. The extended display experience station of claim 1, wherein the selected function is a geometric transformation function.

25. The extended display experience station of claim 24, further comprising a camera to capture an image of a user, wherein the second display content is a modified image of the user, and wherein the first display content is a virtual reality environment.

26. The extended display experience station of claim 24, wherein the input stream is an input stream of a video game.

27. The extended display experience station of claim 24, wherein the input stream is a video.

* * * * *